United States Patent
Calderon et al.

(10) Patent No.: US 12,471,937 B2
(45) Date of Patent: Nov. 18, 2025

(54) ASPIRATION THROMBECTOMY SYSTEMS AND METHODS FOR THROMBUS REMOVAL WITH ASPIRATION CATHETER

(71) Applicant: SYNTHEON PV, LLC, Miami, FL (US)

(72) Inventors: Alejandro N. Calderon, Miami, FL (US); Matthew A. Palmer, Coral Gables, FL (US); Derek Dee Deville, Coral Gables, FL (US); William T. Bales, Miami, FL (US); M. Sean McBrayer, Coral Gables, FL (US); Eric Petersen, Homestead, FL (US); Richard Cartledge, Boca Raton, FL (US); Thomas O. Bales, Jr., Miami, FL (US); Carlos Rivera, Cooper City, FL (US); Carlos Rivera, III, Cooper City, FL (US)

(73) Assignee: SYNTHEON PV, LLC, Miami, FL (US)

( * ) Notice: Subject to any disclaimer, the term of this patent is extended or adjusted under 35 U.S.C. 154(b) by 124 days.

(21) Appl. No.: 18/420,094

(22) Filed: Jan. 23, 2024

(65) Prior Publication Data
US 2024/0245414 A1 Jul. 25, 2024

Related U.S. Application Data

(60) Provisional application No. 63/462,305, filed on Apr. 27, 2023, provisional application No. 63/481,528, filed on Jan. 25, 2023.

(51) Int. Cl.
*A61B 17/22* (2006.01)
*A61B 17/00* (2006.01)

(52) U.S. Cl.
CPC .... *A61B 17/22* (2013.01); *A61B 2017/00022* (2013.01); *A61B 2017/00154* (2013.01);
(Continued)

(58) Field of Classification Search
CPC .......... A61B 17/22; A61B 2017/00022; A61B 2017/00154; A61B 2017/00292;
(Continued)

(56) References Cited

U.S. PATENT DOCUMENTS

| 2,623,520 | A | 12/1952 | Bamford et al. |
| 3,042,042 | A | 7/1962 | Joachim |

(Continued)

FOREIGN PATENT DOCUMENTS

| CN | 101027004 A | 8/2007 |
| EP | 1639951 A1 | 3/2006 |

(Continued)

OTHER PUBLICATIONS

International Search Report and Written Opinion from corresponding International Application No. PCT/US2024/012700 dated May 17, 2024.

*Primary Examiner* — Julian W Woo
(74) *Attorney, Agent, or Firm* — Lando & Anastasi, LLP

(57) ABSTRACT

An aspiration thrombectomy system includes a thrombectomy catheter assembly that maintains pulsatile energy of cyclic aspiration while the catheter is occluded. A system configuration includes a catheter, vacuum and vent fluid sources respectively connected to vacuum and vent valves, a vent catheter valve connecting a catheter lumen to the vent fluid source, a manifold connected to the catheter and vacuum and vent valves, a pressure sensor upstream of the vacuum valve, and a controller configured to operate the vacuum, vent, and vent catheter valves, receive sensor pressure data, control the vent catheter valve dependent (Continued)

upon the data. An operable lumen of the system includes a volume of the catheter lumen and an interior of the manifold up to an input of the vacuum valve input and an output of the vent valve.

25 Claims, 18 Drawing Sheets

(52) U.S. Cl.
CPC ............... *A61B 2017/00292* (2013.01); *A61B 2017/00544* (2013.01); *A61B 2017/22079* (2013.01)

(58) Field of Classification Search
CPC .... A61B 17/00544; A61B 2017/22079; A61B 17/3207; A61B 2217/005
See application file for complete search history.

(56) References Cited

U.S. PATENT DOCUMENTS

| | | |
|---|---|---|
| 3,086,528 A | 4/1963 | Eichelman et al. |
| 3,612,050 A | 10/1971 | Sheridan |
| 3,631,848 A | 1/1972 | Muller |
| 3,659,605 A | 5/1972 | Sielaff |
| 3,955,574 A | 5/1976 | Rubinstein |
| 4,013,080 A | 3/1977 | Froning |
| 4,164,223 A | 8/1979 | Munib |
| 4,315,506 A | 2/1982 | Kayser et al. |
| 4,406,656 A | 9/1983 | Hattler et al. |
| 4,458,877 A | 7/1984 | Holmes |
| 4,634,435 A | 1/1987 | Ingraham |
| 4,662,871 A | 5/1987 | Rafelson |
| 4,696,669 A | 9/1987 | Menhusen |
| 4,767,403 A | 8/1988 | Hodge |
| 4,902,276 A | 2/1990 | Zakko |
| 4,911,399 A | 3/1990 | Green |
| 4,935,005 A | 6/1990 | Haines |
| 4,946,443 A | 8/1990 | Hauser et al. |
| 5,094,961 A | 3/1992 | del Valle et al. |
| 5,207,648 A | 5/1993 | Gross |
| 5,254,085 A | 10/1993 | Cleveland, Jr. |
| 5,267,960 A | 12/1993 | Hayman et al. |
| 5,318,546 A | 6/1994 | Bierman |
| 5,338,300 A | 8/1994 | Cox |
| 5,370,623 A | 12/1994 | Kreamer |
| 5,385,562 A | 1/1995 | Adams et al. |
| 5,484,407 A | 1/1996 | Osypka |
| 5,496,267 A | 3/1996 | Drasler et al. |
| 5,527,292 A | 6/1996 | Adams et al. |
| 5,536,242 A | 7/1996 | Willard et al. |
| 5,591,194 A | 1/1997 | Berthiaume |
| 5,658,309 A | 8/1997 | Berthiaume et al. |
| 5,704,584 A | 1/1998 | Winterer et al. |
| 5,776,141 A | 7/1998 | Klein et al. |
| 5,997,523 A | 12/1999 | Jang |
| 6,027,490 A | 2/2000 | Radford et al. |
| 6,120,480 A | 9/2000 | Zhang et al. |
| 6,193,732 B1 | 2/2001 | Frantzen et al. |
| 6,200,276 B1 | 3/2001 | Biesel et al. |
| 6,206,014 B1 | 3/2001 | Cameron et al. |
| 6,226,843 B1 | 5/2001 | Crainich |
| 6,238,430 B1 | 5/2001 | Klumb et al. |
| 6,261,283 B1 | 7/2001 | Morgan et al. |
| 6,280,429 B1 | 8/2001 | Lewis et al. |
| 6,423,027 B1 | 7/2002 | Gonon |
| 6,423,028 B1 | 7/2002 | Gonon |
| 6,471,683 B2 | 10/2002 | Drasler et al. |
| 6,533,792 B2 | 3/2003 | Menne et al. |
| 6,605,074 B2 | 8/2003 | Zadno-Azizi et al. |
| 6,676,637 B1 | 1/2004 | Bonnette et al. |
| 6,689,109 B2 | 2/2004 | Lynn |
| 6,692,473 B2 | 2/2004 | St. Cyr et al. |
| 6,740,104 B1 | 5/2004 | Solar et al. |
| 6,755,803 B1 | 6/2004 | Le et al. |
| 6,887,220 B2 | 5/2005 | Hogendijk |
| 6,960,189 B2 | 11/2005 | Bates et al. |
| 7,004,931 B2 | 2/2006 | Hogendijk |
| 7,033,325 B1 | 4/2006 | Sullivan |
| 7,033,336 B2 | 4/2006 | Hogendijk |
| 7,178,699 B2 | 2/2007 | Spray et al. |
| 7,232,452 B2 | 6/2007 | Adams et al. |
| 7,316,678 B2 | 1/2008 | Nash et al. |
| 7,374,560 B2 | 5/2008 | Ressemann et al. |
| 7,472,882 B2 | 1/2009 | Spray et al. |
| 7,530,976 B2 | 5/2009 | MacMahon et al. |
| 7,604,612 B2 | 10/2009 | Ressemann et al. |
| 7,641,170 B2 | 1/2010 | Spray et al. |
| 7,713,276 B2 | 5/2010 | Dennis |
| 7,717,853 B2 | 5/2010 | Nita |
| 7,736,355 B2 | 6/2010 | Itou et al. |
| 7,842,010 B2 | 11/2010 | Bonnette et al. |
| 7,846,126 B2 | 12/2010 | Steen et al. |
| 7,850,654 B2 | 12/2010 | Belhe et al. |
| 7,854,746 B2 | 12/2010 | Dorn et al. |
| 7,901,374 B2 | 3/2011 | Seto et al. |
| 7,918,822 B2 | 4/2011 | Kumar et al. |
| 7,931,659 B2 | 4/2011 | Bose et al. |
| 7,955,318 B1 | 6/2011 | Schultz et al. |
| 7,967,789 B2 | 6/2011 | Solar et al. |
| 7,972,294 B2 | 7/2011 | Nash et al. |
| 7,976,515 B2 | 7/2011 | Murphy et al. |
| 7,998,168 B2 | 8/2011 | Kleimann, Sr. |
| 8,021,351 B2 | 9/2011 | Boldenow et al. |
| 8,048,032 B2 | 11/2011 | Root et al. |
| 8,142,413 B2 | 3/2012 | Root et al. |
| 8,157,760 B2 | 4/2012 | Criado et al. |
| 8,172,831 B2 | 5/2012 | Webler, Jr. |
| 8,206,374 B2 | 6/2012 | Duane et al. |
| 8,251,978 B2 | 8/2012 | Nash et al. |
| 8,287,654 B2 | 10/2012 | Shaffer |
| 8,292,850 B2 | 10/2012 | Root et al. |
| 8,333,796 B2 | 12/2012 | Tompkins et al. |
| 8,337,452 B2 | 12/2012 | Seto et al. |
| 8,366,726 B2 | 2/2013 | Dennis |
| 8,366,735 B2 | 2/2013 | Bose et al. |
| 8,388,570 B2 | 3/2013 | Kumar et al. |
| 8,425,549 B2 | 4/2013 | Lenker et al. |
| 8,435,225 B2 | 5/2013 | Courtney et al. |
| 8,460,312 B2 | 6/2013 | Bose et al. |
| 8,465,439 B2 | 6/2013 | Parks |
| 8,465,456 B2 | 6/2013 | Stivland |
| 8,465,507 B2 | 6/2013 | Cosgrove et al. |
| 8,518,017 B2 | 8/2013 | Caluori |
| 8,523,801 B2 | 9/2013 | Nash et al. |
| 8,568,370 B2 | 10/2013 | Chew |
| 8,591,464 B2 | 11/2013 | Kumar et al. |
| 8,617,106 B2 | 12/2013 | Zacharias |
| 8,636,754 B2 | 1/2014 | Hughett, Sr. et al. |
| 8,647,294 B2 | 2/2014 | Bonnette et al. |
| 8,652,091 B2 | 2/2014 | Seto et al. |
| 8,681,882 B2 | 3/2014 | Yamasaki |
| 8,690,907 B1 | 4/2014 | Janardhan et al. |
| 8,708,954 B2 | 4/2014 | Webler |
| 8,715,314 B1 | 5/2014 | Janardhan et al. |
| 8,721,595 B2 | 5/2014 | Stiehl et al. |
| 8,758,325 B2 | 6/2014 | Webster et al. |
| 8,770,542 B2 | 7/2014 | Loth et al. |
| 8,814,778 B2 | 8/2014 | Kiser et al. |
| 8,814,821 B2 | 8/2014 | Steen et al. |
| 8,852,218 B2 | 10/2014 | Hughett, Sr. et al. |
| 8,911,487 B2 | 12/2014 | Bennett et al. |
| 8,932,321 B1 | 1/2015 | Janardhan et al. |
| RE45,380 E | 2/2015 | Root et al. |
| 8,996,095 B2 | 3/2015 | Anderson et al. |
| 9,017,349 B2 | 4/2015 | Privitera et al. |
| 9,034,007 B2 | 5/2015 | Janardhan |
| 9,073,069 B2 | 7/2015 | Seto et al. |
| 9,095,326 B2 | 8/2015 | Ritchie et al. |
| 9,119,656 B2 | 9/2015 | Bose et al. |
| 9,144,662 B2 | 9/2015 | Di Caprio et al. |
| RE45,760 E | 10/2015 | Root et al. |
| RE45,776 E | 10/2015 | Root et al. |

(56) References Cited

U.S. PATENT DOCUMENTS

| | | |
|---|---|---|
| 9,186,151 B2 | 11/2015 | Tompkins et al. |
| 9,220,485 B2 | 12/2015 | Parks |
| 9,241,699 B1 | 1/2016 | Kume et al. |
| 9,248,228 B2 | 2/2016 | Bono et al. |
| 9,254,144 B2 | 2/2016 | Nguyen et al. |
| 9,265,512 B2 | 2/2016 | Garrison et al. |
| 9,370,611 B2 | 6/2016 | Ross et al. |
| 9,402,757 B2 | 8/2016 | Kassab et al. |
| 9,402,985 B2 | 8/2016 | Caluori |
| 9,492,598 B2 | 11/2016 | Nour |
| 9,510,854 B2 | 12/2016 | Mallaby |
| 9,526,864 B2 | 12/2016 | Quick |
| 9,526,865 B2 | 12/2016 | Quick |
| 9,545,334 B2 | 1/2017 | Steen et al. |
| 9,549,850 B2 | 1/2017 | Sorensen et al. |
| 9,554,805 B2 | 1/2017 | Tompkins et al. |
| 9,561,129 B2 | 2/2017 | Ross et al. |
| 9,572,933 B2 | 2/2017 | Grannell et al. |
| 9,597,108 B2 | 3/2017 | Ahn |
| 9,615,832 B2 | 4/2017 | Bose et al. |
| 9,615,951 B2 | 4/2017 | Bennett et al. |
| 9,623,230 B2 | 4/2017 | Kim et al. |
| 9,655,633 B2 | 5/2017 | Leynov et al. |
| 9,681,882 B2 | 6/2017 | Garrison et al. |
| 9,737,309 B1 | 8/2017 | Ad |
| 9,775,621 B2 | 10/2017 | Tompkins et al. |
| 9,820,761 B2 | 11/2017 | Garrison et al. |
| 9,883,863 B2 | 2/2018 | Hughett, Sr. et al. |
| 9,883,885 B2 | 2/2018 | Hendrick et al. |
| 9,889,289 B2 | 2/2018 | Howlett et al. |
| 9,901,351 B2 | 2/2018 | Winkler et al. |
| 9,901,352 B2 | 2/2018 | Fago et al. |
| 9,937,287 B2 | 4/2018 | Nour |
| 9,943,321 B2 | 4/2018 | Nita |
| 9,980,841 B2 | 5/2018 | Kassab et al. |
| 9,999,710 B2 | 6/2018 | Ross et al. |
| 10,166,024 B2 | 1/2019 | Williamson, IV et al. |
| 10,188,409 B2 | 1/2019 | Smalling |
| 10,219,940 B2 | 3/2019 | Raney et al. |
| 10,251,739 B2 | 4/2019 | Janardhan et al. |
| 10,258,354 B2 | 4/2019 | Turjman et al. |
| 10,299,947 B2 | 5/2019 | Bennett et al. |
| 10,314,953 B2 | 6/2019 | Ovchinnikov et al. |
| 10,335,260 B2 | 7/2019 | Janardhan et al. |
| 10,342,655 B2 | 7/2019 | Janardhan et al. |
| 10,390,926 B2 | 8/2019 | Janardhan et al. |
| 10,531,883 B1 | 1/2020 | Deville et al. |
| 10,722,253 B2 | 7/2020 | Deville et al. |
| 11,096,712 B2 | 8/2021 | Teigen et al. |
| 11,123,483 B2 | 9/2021 | Panotopoulos |
| 11,197,683 B1 | 12/2021 | Teigen et al. |
| 11,337,712 B2 | 5/2022 | Teigen et al. |
| 11,406,402 B2 | 8/2022 | Deville et al. |
| 11,547,426 B2 | 1/2023 | Deville et al. |
| 11,678,896 B2 | 6/2023 | Look et al. |
| 11,679,196 B2 | 6/2023 | Luxon et al. |
| 11,759,219 B2 | 9/2023 | Teigen et al. |
| 11,793,972 B2 | 10/2023 | Garrison et al. |
| 11,918,240 B2 | 3/2024 | Deville et al. |
| 11,944,328 B2 | 4/2024 | Teigen et al. |
| 2001/0051811 A1 | 12/2001 | Bonnette et al. |
| 2002/0058904 A1 | 5/2002 | Boock et al. |
| 2002/0091407 A1 | 7/2002 | Zadno-Azizi et al. |
| 2002/0173785 A1 | 11/2002 | Spear et al. |
| 2003/0023263 A1 | 1/2003 | Krolik et al. |
| 2003/0050600 A1 | 3/2003 | Ressemann et al. |
| 2003/0229368 A1 | 12/2003 | Viola |
| 2004/0024360 A1 | 2/2004 | Greter et al. |
| 2004/0102716 A1 | 5/2004 | Mobbs et al. |
| 2004/0267305 A1 | 12/2004 | Borgman |
| 2005/0149068 A1 | 7/2005 | Williams et al. |
| 2005/0182432 A1 | 8/2005 | Fanton et al. |
| 2005/0197640 A1 | 9/2005 | Say |
| 2005/0209585 A1 | 9/2005 | Nord et al. |
| 2005/0256447 A1 | 11/2005 | Richardson et al. |
| 2005/0273122 A1 | 12/2005 | Theroux et al. |
| 2006/0025794 A1 | 2/2006 | Fanton et al. |
| 2006/0058837 A1 | 3/2006 | Bose et al. |
| 2006/0200191 A1 | 9/2006 | Zadno-Azizi |
| 2006/0259063 A1 | 11/2006 | Bates et al. |
| 2006/0264995 A1 | 11/2006 | Fanton et al. |
| 2007/0060888 A1 | 3/2007 | Goff et al. |
| 2007/0100276 A1 | 5/2007 | Fanton et al. |
| 2007/0129652 A1 | 6/2007 | Nita |
| 2007/0129679 A1 | 6/2007 | Bonnette et al. |
| 2007/0161963 A1 | 7/2007 | Smalling |
| 2007/0239261 A1 | 10/2007 | Bose et al. |
| 2008/0015478 A1 | 1/2008 | Bose |
| 2008/0125695 A1 | 5/2008 | Hopkins et al. |
| 2008/0154184 A1 | 6/2008 | Blight et al. |
| 2008/0163731 A1 | 7/2008 | Lewis |
| 2008/0208324 A1 | 8/2008 | Glithero et al. |
| 2008/0243153 A1 | 10/2008 | Nguyen et al. |
| 2008/0319355 A1 | 12/2008 | Nita |
| 2009/0012545 A1 | 1/2009 | Williamson, IV et al. |
| 2009/0030400 A1 | 1/2009 | Bose et al. |
| 2009/0120957 A1 | 5/2009 | Phillips |
| 2009/0124962 A1 | 5/2009 | Hopkins et al. |
| 2009/0171368 A1 | 7/2009 | Pearce et al. |
| 2009/0187198 A1 | 7/2009 | Weitzner |
| 2009/0264865 A1 | 10/2009 | Kawai |
| 2009/0281379 A1 | 11/2009 | Binmoeller et al. |
| 2010/0076370 A1 | 3/2010 | Howlett et al. |
| 2010/0204672 A1 | 8/2010 | Lockhart et al. |
| 2010/0217276 A1 | 8/2010 | Garrison et al. |
| 2010/0268029 A1 | 10/2010 | Phan et al. |
| 2011/0160621 A1 | 6/2011 | Nita |
| 2011/0160683 A1 | 6/2011 | Pinotti Barbosa et al. |
| 2011/0184454 A1 | 7/2011 | Barry et al. |
| 2011/0238147 A1 | 9/2011 | Bennett et al. |
| 2011/0313328 A1 | 12/2011 | Nita |
| 2011/0314977 A1 | 12/2011 | Lewis |
| 2011/0319927 A1 | 12/2011 | Nita |
| 2012/0041360 A1 | 2/2012 | Gerg et al. |
| 2012/0078140 A1 | 3/2012 | Nita |
| 2012/0078285 A1 | 3/2012 | Griffin |
| 2012/0089080 A1 | 4/2012 | Ross et al. |
| 2012/0095485 A1 | 4/2012 | Cully et al. |
| 2012/0138833 A1 | 6/2012 | Matteo |
| 2012/0150147 A1 | 6/2012 | Leynov et al. |
| 2012/0171055 A1 | 7/2012 | Wisniewski |
| 2012/0289892 A1 | 11/2012 | Shtul et al. |
| 2012/0330196 A1 | 12/2012 | Nita |
| 2013/0110087 A1 | 5/2013 | Kane |
| 2013/0116701 A1 | 5/2013 | Wang et al. |
| 2013/0261730 A1 | 10/2013 | Bose et al. |
| 2013/0299032 A1 | 11/2013 | Caluori |
| 2014/0025043 A1 | 1/2014 | Wang et al. |
| 2014/0128907 A1 | 5/2014 | Hui et al. |
| 2014/0180377 A1 | 6/2014 | Bose et al. |
| 2014/0296868 A1 | 10/2014 | Garrison et al. |
| 2014/0358175 A1 | 12/2014 | Tompkins et al. |
| 2014/0358178 A1 | 12/2014 | Hewitt et al. |
| 2015/0073524 A1 | 3/2015 | Bennett et al. |
| 2015/0157378 A1 | 6/2015 | Loebl et al. |
| 2015/0157772 A1 | 6/2015 | Li et al. |
| 2015/0173767 A1 | 6/2015 | Monti et al. |
| 2015/0173782 A1 | 6/2015 | Garrison et al. |
| 2015/0174368 A1 | 6/2015 | Garrison et al. |
| 2015/0196304 A1 | 7/2015 | Rabkin et al. |
| 2015/0223813 A1 | 8/2015 | Williamson, IV et al. |
| 2015/0283309 A1 | 10/2015 | Look et al. |
| 2015/0327875 A1 | 11/2015 | Look et al. |
| 2015/0342682 A1 | 12/2015 | Bowe |
| 2015/0359949 A1 | 12/2015 | Yeager et al. |
| 2015/0374380 A1 | 12/2015 | Miller et al. |
| 2016/0008001 A1 | 1/2016 | Winkler et al. |
| 2016/0058614 A1 | 3/2016 | Ross et al. |
| 2016/0095746 A1 | 4/2016 | Raney et al. |
| 2016/0095747 A1 | 4/2016 | Raney et al. |
| 2016/0095748 A1 | 4/2016 | Raney et al. |
| 2016/0095749 A1 | 4/2016 | Raney et al. |
| 2016/0095750 A1 | 4/2016 | Raney et al. |
| 2016/0166265 A1 | 6/2016 | Nita |

(56) References Cited

U.S. PATENT DOCUMENTS

| | | |
|---|---|---|
| 2016/0166266 A1 | 6/2016 | Nita |
| 2016/0220741 A1 | 8/2016 | Garrison et al. |
| 2016/0220807 A1 | 8/2016 | Bono et al. |
| 2016/0278895 A1 | 9/2016 | Caluori |
| 2016/0367272 A1 | 12/2016 | Garrison et al. |
| 2017/0027730 A1 | 2/2017 | Kassab et al. |
| 2017/0049470 A1 | 2/2017 | Mallaby |
| 2017/0056032 A1 | 3/2017 | Look et al. |
| 2017/0095259 A1 | 4/2017 | Tompkins et al. |
| 2017/0105743 A1 | 4/2017 | Vale et al. |
| 2017/0120039 A1 | 5/2017 | Childs et al. |
| 2017/0135700 A1 | 5/2017 | Rogowski et al. |
| 2017/0136209 A1 | 5/2017 | Burnett et al. |
| 2017/0143938 A1 | 5/2017 | Ogle et al. |
| 2017/0147765 A1 | 5/2017 | Mehta |
| 2017/0151032 A1 | 6/2017 | Loisel |
| 2017/0169374 A1 | 6/2017 | Harris et al. |
| 2017/0172581 A1 | 6/2017 | Bose et al. |
| 2017/0181760 A1 | 6/2017 | Look et al. |
| 2017/0188796 A1 | 7/2017 | Olden et al. |
| 2017/0215890 A1 | 8/2017 | Turjman et al. |
| 2017/0215902 A1 | 8/2017 | Leynov et al. |
| 2017/0238950 A1 | 8/2017 | Yang et al. |
| 2017/0238951 A1 | 8/2017 | Yang et al. |
| 2017/0238953 A1 | 8/2017 | Yang et al. |
| 2017/0239440 A1 | 8/2017 | Yang et al. |
| 2017/0239441 A1 | 8/2017 | Yang et al. |
| 2017/0239447 A1 | 8/2017 | Yang et al. |
| 2017/0252051 A1 | 9/2017 | Wan et al. |
| 2017/0252536 A1 | 9/2017 | Yang et al. |
| 2017/0266046 A1 | 9/2017 | Steen et al. |
| 2017/0290598 A1 | 10/2017 | Culbert et al. |
| 2017/0296195 A1 | 10/2017 | Pleil et al. |
| 2017/0333170 A1 | 11/2017 | Caluori |
| 2017/0340797 A1 | 11/2017 | Raman et al. |
| 2017/0354777 A1 | 12/2017 | Ofek et al. |
| 2017/0360450 A1 | 12/2017 | Tompkins et al. |
| 2017/0367857 A1 | 12/2017 | Bennett et al. |
| 2018/0014840 A1 | 1/2018 | Panian |
| 2018/0015244 A1 | 1/2018 | Isaza |
| 2018/0021098 A1 | 1/2018 | Hemphill |
| 2018/0024022 A1 | 1/2018 | Beden |
| 2018/0042623 A1 | 2/2018 | Batiste |
| 2018/0064453 A1 | 3/2018 | Garrison et al. |
| 2018/0064578 A1 | 3/2018 | Clauson et al. |
| 2018/0116684 A1 | 5/2018 | Garrison et al. |
| 2018/0132857 A1 | 5/2018 | Fago et al. |
| 2018/0154063 A1 | 6/2018 | Criado et al. |
| 2018/0193042 A1 | 7/2018 | Wilson et al. |
| 2018/0197633 A1 | 7/2018 | Mehta |
| 2018/0199944 A1 | 7/2018 | Hughett, Sr. et al. |
| 2018/0221029 A1 | 8/2018 | Menn |
| 2018/0228502 A1 | 8/2018 | Shaffer et al. |
| 2018/0242989 A1 | 8/2018 | Nita |
| 2018/0263642 A1 | 9/2018 | Nita |
| 2018/0263646 A1 | 9/2018 | Loisel |
| 2018/0271686 A1 | 9/2018 | Kassab et al. |
| 2018/0317922 A1 | 11/2018 | Winkler et al. |
| 2018/0353194 A1 | 12/2018 | Shaffer et al. |
| 2018/0368965 A1 | 12/2018 | Janardhan et al. |
| 2019/0008626 A1 | 1/2019 | Janardhan et al. |
| 2019/0038300 A1 | 2/2019 | Savastano et al. |
| 2019/0059703 A1 | 2/2019 | Ting |
| 2019/0126006 A1 | 5/2019 | Rehm et al. |
| 2019/0133747 A1 | 5/2019 | Janardhan et al. |
| 2019/0142452 A1 | 5/2019 | Trosper et al. |
| 2019/0142568 A1 | 5/2019 | Janardhan et al. |
| 2019/0150959 A1 | 5/2019 | Cox et al. |
| 2019/0167406 A1 | 6/2019 | Janardhan et al. |
| 2019/0175184 A1 | 6/2019 | Hui et al. |
| 2019/0216476 A1 | 7/2019 | Barry et al. |
| 2019/0239910 A1 | 8/2019 | Brady et al. |
| 2020/0009301 A1 | 1/2020 | Yee |
| 2020/0093503 A1 | 3/2020 | Deville et al. |
| 2020/0297362 A1 | 9/2020 | Deville et al. |
| 2020/0367917 A1 | 11/2020 | Teigen et al. |
| 2021/0128182 A1 | 5/2021 | Teigen et al. |
| 2022/0062588 A1 | 3/2022 | Mintz |
| 2022/0168002 A1 | 6/2022 | Naglreiter et al. |
| 2022/0218366 A1 | 7/2022 | Deville et al. |
| 2022/0280171 A1 | 9/2022 | Teigen et al. |
| 2023/0026412 A1 | 1/2023 | Teigen et al. |
| 2024/0000469 A1 | 1/2024 | Teigen et al. |

FOREIGN PATENT DOCUMENTS

| | | |
|---|---|---|
| EP | 1799128 B1 | 3/2010 |
| JP | 2009506817 A | 2/2009 |
| JP | 2016030119 A | 3/2016 |
| JP | 2017510346 A | 4/2017 |
| JP | 2017532074 A | 11/2017 |
| JP | 2018508270 A | 3/2018 |
| WO | 9421312 A3 | 11/1994 |
| WO | 2005084130 A2 | 9/2005 |
| WO | 2010089368 A2 | 8/2010 |
| WO | 2013184595 A1 | 12/2013 |
| WO | 2014008489 A1 | 1/2014 |
| WO | 2014151209 A1 | 9/2014 |
| WO | 2015100178 A1 | 7/2015 |
| WO | 2015157330 A1 | 10/2015 |
| WO | 2016054051 A1 | 4/2016 |
| WO | 2016126974 A1 | 8/2016 |
| WO | 2017142874 A2 | 8/2017 |
| WO | 2017147493 A1 | 8/2017 |
| WO | 2017155994 A1 | 9/2017 |
| WO | 2018019829 A1 | 2/2018 |
| WO | 2019115809 A1 | 6/2019 |
| WO | 2020018880 A1 | 1/2020 |
| WO | 2020023541 A1 | 1/2020 |

ASPIRATION THROMBECTOMY SYSTEMS AND METHODS FOR THROMBUS REMOVAL WITH ASPIRATION CATHETER

CROSS-REFERENCE TO RELATED APPLICATIONS

This application claims priority under 35 U.S.C. § 119(e) to U.S. Provisional Patent Application Ser. No. 63/481,528, titled "ASPIRATION THROMBECTOMY SYSTEMS AND METHODS FOR THROMBUS REMOVAL WITH ASPIRATION CATHETER," filed Jan. 25, 2023, and to Application Ser. No. 63/462,305, titled "ASPIRATION THROMBECTOMY SYSTEMS AND METHODS FOR THROMBUS REMOVAL WITH ASPIRATION CATHETER," filed Apr. 27, 2023, the contents of which are incorporated herein by reference for all purposes in their entirety.

FIELD OF THE INVENTION

The present systems, apparatuses, and methods lie in the field of thrombus removal. The present disclosure relates to aspiration thrombectomy systems and methods for thrombus removal with aspiration catheter.

BACKGROUND OF THE INVENTION

Stroke is a significant cause of disability and death, and a growing problem for global healthcare. More than 700,000 people in the United States alone suffer a stroke each year, and of these, more than 150,000 people die. Of those who survive a stroke, roughly 90% will suffer long term impairment of movement, sensation, memory, or reasoning, ranging from mild to severe. The total cost to the U.S. healthcare system is estimated to be over $50 billion per year.

Stroke may be caused by a blockage in a cerebral artery resulting from a thromboembolism (referred to as an "ischemic stroke"), or by a rupture of a cerebral artery (referred to as a "hemorrhagic stroke"). Hemorrhagic stroke results in bleeding within the skull, limiting blood supply to brain cells, and placing harmful pressure on delicate brain tissue. Blood loss, swelling, herniation of brain tissue, and pooling of blood that results in formation of clot mass inside the skull all rapidly destroy brain tissue. Hemorrhagic stroke is a life-threatening medical emergency with limited treatment options.

Aside from cerebral stroke, thromboembolism throughout the vasculature, in both arterial and venous circulation, is characteristic of numerous common, life-threatening conditions. Examples of potentially fatal diseases resulting from thrombotic occlusion include pulmonary embolism, deep vein thrombosis, and acute limb ischemia. Acute pulmonary embolism is a significant cause of death in the United States, with roughly 300,000 patients dying each year. Pulmonary embolism can be a complication from deep vein thrombosis ("DVT"), which has an annual incidence of 1% in patients 60 years and older.

In cases of stroke, a relatively small (e.g., less than 10 mm long) clot becomes lodged in a relatively small diameter vessel (2 mm to 4 mm) in the brain. The clot is removed using a small diameter (approximately 2 mm internal diameter) catheter. The catheter is advanced to the clot until it is in contact with the clot prior to applying aspiration. Because of the close fit of the catheter to the internal diameter of the cerebral vessel, typically, the entire clot is removed at once. This results in a very small amount of blood loss and is not typically a procedural concern. In the case of peripheral vascular disease, where the vessel is larger, the clot burden is also much larger. FIG. 3, for example, shows an example of DVT, where the clot can be greater than 20 cm long and up to 15 mm in diameter. The catheter 18 used to remove the clot is also larger than those used in brain procedures (e.g., approximately 3 mm internal diameter), but it still is relatively much smaller than the internal diameter of a peripheral vessel. This means that, to remove the clot in its entirety from the larger vessel, the surgeon must move the catheter through the clot multiple times. This exposes the tip of the catheter, unimpeded, to healthy, clot-free blood and, through the course of the thrombectomy, can result in excessive loss of blood.

DVTs tend to be long and voluminous. It is not uncommon for the entire length of the femoral vein from the knee to the groin to be occluded. Catheter based aspiration thrombectomy can be effective in removing these clots, but in the process, a large volume of blood is also removed. The aspiration source is constantly pulling blood from the patient when the catheter is not in contact with the clot. Because these clots are so large, it can take an hour, on average, to remove them satisfactorily. If a threshold volume of blood is removed from the patient during the procedure, the surgeon may decide to stop the procedure, whether complete or not, to avoid transfusing the patient. The threshold volume is patient dependent, but typically does not exceed about 450 ml. Transfusions are to be avoided due to the many complications that can arise from them. A blood loss mitigation method is mandatory for a catheter-based aspiration thrombectomy system to be successful. The aforementioned diseases are examples of conditions in which treatment may include aspiration or evacuation of clot and/or blood.

Clot aspiration using the prior art mechanical thrombectomy systems or other similar vacuum-assisted thrombectomy systems must sometimes be terminated due to the risk of excessive blood loss by the patient, especially when using large aspiration catheters. During aspiration thrombectomy, when the catheter tip falls out of contact with the thrombus or other occlusive material, the tip is exposed to healthy blood and full flow ensues. Under such conditions, the blood loss rate is rapid and excessive, and in some cases, may result in premature termination of the procedure. In one example, during a procedure when the catheter enters healthy blood and full flow ensues, the blood loss rate is in the range of 20 to 25 cc per second with an 8-French size catheter. With a maximum tolerable blood loss of 300 mL to 1000 mL, the catheter cannot run in unrestricted mode for more than approximately 20 to 50 seconds. When a surgeon operates the system manually, the aggregate blood loss may reach an unacceptable level before sufficient clot material is removed.

Catheter clogging is a significant problem in current state of the art large clot aspiration such as DVT. Because large volumes of thrombus matter are being removed during the procedure, especially in the peripheral vasculature, it is possible for the aspiration system to become clogged. This is not only a nuisance to the surgeon but also jeopardizes patient safety by extending the procedure and increasing the risk of vessel damage. Presently, to unclog a catheter, the catheter must be removed from the patient and manually cleared by the surgeon or surgical staff. Removal and re-insertion of the catheter is detrimental for many reasons including contamination and extending procedure time/cost, to name a few.

SUMMARY OF THE INVENTION

The systems, apparatuses, and methods described herein provide aspiration thrombectomy systems and methods for thrombus removal with an aspiration catheter that overcome the above-mentioned disadvantages of the heretofore-known devices and methods of this general type and that provide such features with a minimal to no loss of patient blood during the thrombectomy. The instant application provides improved methods and apparatuses for controlling the aspiration of thrombus and clot using aspiration catheters in combination with pumping consoles. The instant application provides systems and methods that limit blood loss during such aspiration procedures such as by automatically stopping, or reducing, aspiration while the aspiration catheter is not in contact with clot or thrombus. Additionally, the instant application provides systems and methods which optimize system performance, and procedures for removal of occlusive material. At least some of these objectives will be met by the embodiments described herein below. In other clot aspiration procedures using prior art systems, such as, for example, neurovascular procedures for treatment of ischemic stroke, excessive removal of blood is less of a risk, nonetheless, the primary focus of the procedure is maximization of removal of occlusive material. Still, optimizing both technique and aspiration control are of utmost importance for successful removal of occlusive material.

Embodiments of a catheter system can be configured specifically to mitigate intra-procedure blood loss and to mitigate the possibility of clogging.

With the foregoing and other objects in view, there is provided an aspiration thrombectomy system comprising a thrombectomy catheter assembly that maintains pulsatile energy of cyclic aspiration while the catheter is occluded, cyclic aspiration including, for example, pulsed or pulsatile aspiration.

With the objects in view, there is also provided an aspiration thrombectomy system comprising a thrombectomy catheter comprising a catheter lumen having a proximal end, a vacuum source, a vent fluid source containing vent fluid, a vacuum valve comprising a vacuum valve output fluidically connected to the vacuum source and a vacuum valve input, a vent valve comprising a manifold vent valve input fluidically connected to the vent fluid source and a manifold vent valve output, a vent catheter valve comprising a vent catheter valve input fluidically connected to the vent fluid source and a vent catheter valve output fluidically connected to the catheter lumen, a manifold comprising, an interior, a catheter manifold input fluidically connected to the proximal end, a vacuum manifold output fluidically connected to the vacuum valve input, and a vent manifold input fluidically connected to the manifold vent valve output, an operable lumen defined as a volume of the catheter lumen and the manifold interior up to the vacuum valve input and to the manifold vent valve output, at least one sensor disposed in the operable lumen upstream of the vacuum valve input and configured to sense a pressure waveform within the operable lumen and output the pressure waveform, and a controller configured to open and close the vacuum valve, open and close the vent valve, at least open the vent catheter valve, receive the pressure waveform from the at least one sensor, and determine that an amplitude of the pressure waveform is decreasing and, upon making that determination, to open the vent catheter valve.

With the objects in view, there is also provided an extension line comprising a lumen having an input fluidically connected to the proximal end of the catheter lumen at a junction and an output fluidically connected to the catheter manifold input.

In accordance with another feature, the at least one sensor is disposed in the operable lumen at the junction.

In accordance with a further feature, the at least one sensor is disposed in the lumen of the extension line.

In accordance with an added feature, the at least one sensor is disposed in the catheter lumen.

In accordance with an additional feature, the controller is configured to automatically open the vent catheter valve.

In accordance with yet another feature, the controller is configured to signal to a user to manually open the vent catheter valve.

In accordance with a still another feature, the vent fluid is non-degassed fluid.

In accordance with a concomitant feature, the vent fluid is non-degassed, non-compliant fluid.

In accordance with an aspect of the present disclosure, an aspiration thrombectomy system is provided. The aspiration thrombectomy system comprises a vacuum source, a catheter including a catheter lumen having a proximal end and a distal end, a manifold having a manifold input fluidically connected to the proximal end of the catheter lumen and a manifold output, a sensor to detect flow through the manifold and produce a signal indicative of the detected flow, a vacuum valve having a vacuum valve input fluidically connected to the manifold output and a vacuum valve output fluidically connected to the vacuum source, and a controller. The controller is configured to receive the signal indicative of the detected flow and modulate the vacuum valve based on the signal. The controller has a plurality of states including an idle state in which the vacuum valve is held only partially open for a period of time and at least one aspiration state in which the vacuum valve is fully open. The controller is in the idle state in response to the signal indicating the detected flow is open flow, and the controller transitions from the idle state to an aspiration state of the at least one aspiration states in response to the signal indicating a clot or thrombus is detected.

In one example, the period of time in which the vacuum valve is held only partially open comprises a duration of the idle state. In one example, a first of the at least one aspiration states includes a pulsed aspiration state in which the vacuum valve is pulsed fully open and closed. In accordance with this example, the controller transitions from the idle state to the first aspiration state in response to the signal indicating that a hard clot or thrombus is detected.

In another example, a first of the at least one aspiration states includes a standard aspiration state in which the vacuum valve is held fully open. In accordance with this example, the controller transitions from the idle state to the first aspiration state in response to the signal indicating that a soft clot or thrombus is detected. In a further example, a second of the at least one aspiration states includes a pulsed aspiration state in which the vacuum valve is pulsed fully open and closed, wherein the controller transitions from the idle state to the second aspiration state in response to the signal indicating that a hard clot or thrombus is detected. In a further example, the aspiration thrombectomy system further comprises a vent source and a vent valve having a vent valve input fluidically coupled to the vent source and a vent valve output fluidically coupled to the catheter at a position distal of the manifold. In accordance with one example, during the pulsed aspiration state, the vent valve is at least partially open to prolong an energy of pulsed aspiration and the energy of pulsed aspiration is maintained for greater than 30 seconds. In other examples, the energy of pulsed aspiration is maintained for approximately 60 seconds.

In some examples, the plurality of states further includes a clogged state in which the controller initiates an unclogging routine, wherein the controller transitions from the pulsed aspiration state to the clogged state in response to the signal indicating the clot or thrombus has not been cleared. In one example, during the unclogging routine, between 100 microliters and 200 microliters of fluid in the catheter is displaced distally. In another example, responsive to the signal indicating the detected clot or thrombus is cleared, the controller transitions from the one of the first or second aspiration states back to the idle state.

In accordance with some examples, during the idle state, the vacuum valve is at least 5% open. In other examples, during the idle state, the vacuum valve is between at least 5% open and 20% open. In some examples, during the idle state, a flow of fluid through the manifold is less than 10 cc/min.

In accordance with some examples, the sensor is a pressure sensor. In at least one example, the sensor is a single pressure sensor disposed in the manifold distal of the vacuum valve. In at least some examples, the signal indicating the detected flow is open flow is a pressure greater than approximately 11 PSI absolute and the signal indicating the clot or thrombus is detected is a pressure less than approximately 11 PSI absolute.

In accordance with various examples, the aspiration thrombectomy system further comprises a vent source and a vent valve having a vent valve input fluidically coupled to the vent source and a vent valve output fluidically coupled to the catheter at a position distal of the manifold. In accordance with some examples, the plurality of states includes a clogged state in which the controller initiates an unclogging routine wherein between 100 microliters and 200 microliters of fluid in the catheter is displaced distally. In some examples, the aspiration thrombectomy system further comprising an extension line having a proximal end fluidly coupled to the manifold inlet and a distal end fluidly coupled to the proximal end of the catheter, wherein the vent valve output is disposed at a coupling between the proximal end of the catheter and the distal end of the extension line. In some examples, during the idle state, the vent valve is at least partially open. In further examples, during the idle state, the vent valve is at least partially open for the duration of the idle state. In some examples, during the idle state, a flow of fluid through the manifold is less than 10 cc/min. In at least one example, during the idle state, a majority of the flow of fluid through the manifold is from the vent source.

In accordance with another aspect of the present disclosure, an aspiration thrombectomy system is provided. The aspiration thrombectomy system comprises a thrombectomy catheter assembly having a proximal portion and a distal end, and a vent fluid system having a first vent input to the catheter assembly and a second vent input to the catheter assembly located between the first vent input and the distal end. The vent fluid is controlled through the first and second vent inputs such that at least half a volume of fluid in the thrombectomy catheter assembly is continuously replenished to maintain pulsatile energy of cyclic aspiration while the thrombectomy catheter assembly is occluded.

In one example, the thrombectomy catheter assembly maintains the pulsatile energy of cyclic aspiration while the thrombectomy catheter assembly is occluded by replenishing at least 70% of a volume of fluid in the thrombectomy catheter assembly.

In another example, the thrombectomy catheter assembly maintains the pulsatile energy of cyclic aspiration for a period of time exceeding 20 seconds, and in some examples, the thrombectomy catheter assembly maintains the pulsatile energy of cyclic aspiration for approximately one minute.

In accordance with another aspect of the present disclosure, an aspiration thrombectomy system is provided comprising a thrombectomy catheter assembly having a proximal portion and a distal end and a vent fluid system. The vent fluid system has a vent input to the catheter assembly located between the proximal portion and the distal end. Vent fluid is controlled through the vent input such that at least half a volume of fluid in the thrombectomy catheter assembly is continuously replenished to maintain pulsatile energy of cyclic aspiration while the thrombectomy catheter assembly is occluded.

In some examples, the thrombectomy catheter assembly maintains the pulsatile energy of cyclic aspiration while the thrombectomy catheter assembly is occluded by replenishing at least 70% of a volume of fluid in the thrombectomy catheter assembly. In further examples, the thrombectomy catheter assembly maintains the pulsatile energy of cyclic aspiration for a period of time exceeding 20 seconds, and in some examples, the thrombectomy catheter assembly maintains the pulsatile energy of cyclic aspiration for approximately one minute.

In accordance with another aspect of the present disclosure an aspiration thrombectomy system is provided. The aspiration thrombectomy system comprises a catheter assembly including a catheter lumen fluidically connected to an extension line, a manifold having a manifold input fluidically connected to a proximal end of the catheter assembly and a manifold output, a vacuum valve having a vacuum valve input fluidically connected to the manifold output and a vacuum valve output fluidically connected to a vacuum source, and a vent valve having a vent valve input fluidically connected to a vent fluid source and a vent valve output fluidically connected to the catheter assembly. A volume of an operable lumen is defined as a volume of the catheter assembly, a volume a volume of the vent valve output to the catheter assembly, and a volume of the manifold to the vacuum valve input, and a non-degassed fluid volume is defined as the volume of the vent valve output to the catheter assembly, a volume of the catheter assembly proximal of the vent valve output, and the volume of the manifold to the vacuum valve input. In accordance with this aspect, a ratio of the non-degassed fluid volume to the volume of the operable lumen is greater than 0.5.

In some examples, the ratio of the non-degassed fluid volume to the volume of the operable lumen is greater than 0.7.

According to some examples, the catheter lumen and the extension line each has a proximal end and a distal end, the distal end of the extension line being fluidically connected to the proximal end of the catheter lumen, the distal end of the extension line being fluidically connected to the manifold input, and the vent valve output being fluidically connected to the catheter lumen proximate the distal end of the catheter lumen.

In some examples, the catheter lumen and the extension line each has a proximal end and a distal end, the distal end of the extension line being fluidically connected to the proximal end of the catheter lumen, the distal end of the extension line being fluidically connected to the manifold input, and the vent valve output being fluidically connected to the extension line between the proximal and distal ends of the extension line.

In other examples, the catheter lumen and the extension line each has a proximal end and a distal end, the distal end of the extension line being fluidically connected to the proximal end of the catheter lumen, the distal end of the extension line being fluidically connected to the manifold input, and the vent valve output being fluidically connected to the catheter lumen and the extension line at a junction of the proximal end of the catheter lumen and the distal end of the extension line.

In some examples, the aspiration thrombectomy system further comprises a sensor to detect flow through the manifold and produce a signal indicative of the detected flow, and a controller to receive the signal indicative of the detected flow and modulate the vacuum valve based on the signal. The controller has a plurality of states including an idle state in which the vacuum valve is only partially open and at least one aspiration state in which the vacuum valve is fully open. The controller is in the idle state in response to the signal indicating the detected flow is open flow and the controller transitions from the idle state to an aspiration state of the at least one aspiration states in response to the signal indicating a clot or thrombus is detected.

In some examples, a first of the at least one aspiration states includes a pulsed aspiration state in which the vacuum valve is pulsed fully open and closed. In these examples, the controller transitions from the idle state to the first aspiration state in response to the signal indicating that a hard clot or thrombus is detected.

In other examples, a first of the at least one aspiration states includes a standard aspiration state in which the vacuum valve is held fully open. In these examples, the controller transitions from the idle state to the first aspiration state in response to the signal indicating that a soft clot or thrombus is detected. In some examples, a second of the at least one aspiration states includes a pulsed aspiration state in which the vacuum valve is pulsed fully open and closed and the controller transitions from the idle state to the second aspiration state in response to the signal indicating that a hard clot or thrombus is detected. In at least one example, during the pulsed aspiration state, the vent valve is at least partially open to prolong an energy of pulsed aspiration. In some examples, during the pulsed aspiration state, the energy of pulsed aspiration is maintained for greater than 30 seconds, and in other examples, the energy of pulsed aspiration is maintained for approximately 60 seconds.

In some examples, a second of the at least one aspiration states includes a pulsed aspiration state in which the vacuum valve is pulsed fully open and closed. In at least one example, the plurality of states further includes a clogged state in which the controller initiates an unclogging routine, and the controller transitions from the pulsed aspiration state to the clogged state in response to the signal indicating the clot or thrombus has not been cleared. In accordance with one example, during the unclogging routine, between 100 microliters and 200 microliters of fluid in the catheter is displaced distally. In another example, responsive to the signal indicating the detected clot or thrombus is cleared, the controller transitions from the one of the first or second aspiration states back to the idle state.

In at least one example, during the idle state, the vacuum valve is at least 5% open. In some examples, during the idle state, the vacuum valve is between at least 5% open and 20% open. In other examples, during the idle state, a flow of fluid through the manifold is approximately 10 cc/min.

In at least one example, the sensor is a pressure sensor, and in some examples, the sensor is a single pressure sensor disposed in the manifold distal of the vacuum valve. In some examples, the signal indicating the detected flow is open flow is a pressure greater than approximately 11 PSI absolute, and the signal indicating the clot or thrombus is detected is a pressure less than approximately 11 PSI absolute.

In at least some examples, during the idle state, the vent valve is at least partially open. In at least one example, during the idle state, a flow of fluid through the manifold is approximately 10 cc/min, and in some examples, a majority of the flow of fluid through the manifold is from the vent source.

In some examples, the aspiration thrombectomy system further comprises a manifold vent valve having a manifold vent valve output fluidically connected to the manifold and a manifold vent valve input fluidically coupled to the vent fluid source.

In other examples, the vent fluid source comprises a first vent fluid source, and the aspiration thrombectomy system further comprises a manifold vent valve having a manifold vent valve output fluidically connected to the manifold and a manifold vent valve input fluidically coupled to a second vent fluid source. In some examples, the first vent fluid source and second vent fluid source are the same.

In accordance with a further aspect of the present disclosure, an aspiration thrombectomy system comprises a catheter assembly, a manifold, a manifold vent valve, a vacuum valve, and a catheter assembly vent valve. The catheter assembly includes a catheter lumen fluidically connected to an extension line. The manifold has a manifold input fluidically connected to a proximal end of the catheter assembly and a manifold output. The manifold vent valve is disposed in the manifold and fluidically connected to a first vent fluid source, and the vacuum valve has a vacuum valve input fluidically connected to the manifold output and a vacuum valve output fluidically connected to a vacuum source. The catheter assembly vent valve has a catheter assembly vent valve input fluidically connected to a second vent fluid source and a catheter assembly vent valve output fluidically connected to the catheter assembly distally of the manifold vent valve. The first vent fluid source and the second vent fluid source may be the same source, or different.

Although the systems, apparatuses, and methods are illustrated and described herein as embodied in aspiration thrombectomy systems and methods for thrombus removal with aspiration catheters, it is, nevertheless, not intended to be limited to the details shown because various modifications and structural changes may be made therein without departing from the spirit of the invention and within the scope and range of equivalents of the claims. Additionally, well-known elements of exemplary embodiments will not be described in detail or will be omitted so as not to obscure the relevant details of the systems, apparatuses, and methods.

Additional advantages and other features characteristic of the systems, apparatuses, and methods will be set forth in the detailed description that follows and may be apparent from the detailed description or may be learned by practice of exemplary embodiments. Still other advantages of the systems, apparatuses, and methods may be realized by any of the instrumentalities, methods, or combinations particularly pointed out in the claims.

Other features that are considered as characteristic for the systems, apparatuses, and methods are set forth in the appended claims. As required, detailed embodiments of the systems, apparatuses, and methods are disclosed herein; however, it is to be understood that the disclosed embodiments are merely exemplary of the systems, apparatuses, and methods, which can be embodied in various forms. Therefore, specific structural and functional details disclosed herein are not to be interpreted as limiting, but merely as a basis for the claims and as a representative basis for teaching one of ordinary skill in the art to variously employ the systems, apparatuses, and methods in virtually any appropriately detailed structure. Further, the terms and phrases used herein are not intended to be limiting; but rather, to provide an understandable description of the systems, apparatuses, and methods. While the specification concludes with claims defining the systems, apparatuses, and methods of the invention that are regarded as novel, it is believed that the systems, apparatuses, and methods will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the systems, apparatuses, and methods. Advantages of embodiments of the systems, apparatuses, and methods will be apparent from the following detailed description of the exemplary embodiments thereof, which description should be considered in conjunction with the accompanying drawings in which.

DETAILED DESCRIPTION

Figure 1:
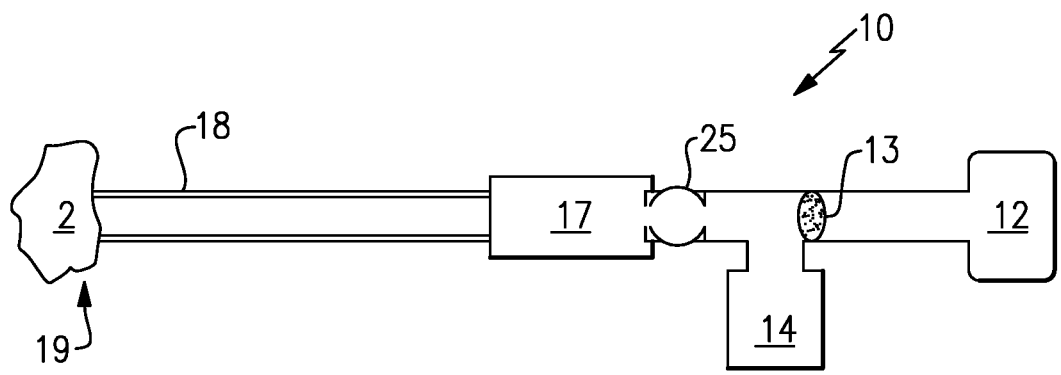
FIG. 1 is a partially cross-sectional view of a prior art aspiration thrombectomy system.

As required, detailed embodiments of the systems, apparatuses, and methods are disclosed herein; however, it is to be understood that the disclosed embodiments are merely exemplary of the systems, apparatuses, and methods, which can be embodied in various forms. Therefore, specific structural and functional details disclosed herein are not to be interpreted as limiting, but merely as a basis for the claims and as a representative basis for teaching one skilled in the art to variously employ the systems, apparatuses, and methods in virtually any appropriately detailed structure. Further, the terms and phrases used herein are not intended to be limiting; but rather, to provide an understandable description of the systems, apparatuses, and methods. While the specification concludes with claims defining the features of the systems, apparatuses, and methods that are regarded as novel, it is believed that the systems, apparatuses, and methods will be better understood from a consideration of the following description in conjunction with the drawing figures, in which like reference numerals are carried forward.

In the following detailed description, reference is made to the accompanying drawings which form a part hereof, and in which are shown by way of illustration embodiments that may be practiced. It is to be understood that other embodiments may be utilized, and structural or logical changes may be made, without departing from the scope. Therefore, the following detailed description is not to be taken in a limiting sense, and the scope of embodiments is defined by the appended claims and their equivalents.

Alternate embodiments may be devised without departing from the spirit or the scope of the invention. Additionally, well-known elements of exemplary embodiments of the systems, apparatuses, and methods will not be described in detail or will be omitted so as not to obscure the relevant details of the systems, apparatuses, and methods.

Before the systems, apparatuses, and methods are disclosed and described, it is to be understood that the terminology used herein is for the purpose of describing particular embodiments only and is not intended to be limiting. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element. The terms "including" and/or "having," as used herein, are defined as comprising (i.e., open language). The terms "a" or "an", as used herein, are defined as one or more than one. The term "plurality," as used herein, is defined as two or more than two. The term "another," as used herein, is defined as at least a second or more. The description may use the terms "embodiment" or "embodiments," which may each refer to one or more of the same or different embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact (e.g., directly coupled). However, "coupled" may also mean that two or more elements are not in direct contact with each other, but yet still cooperate or interact with each other (e.g., indirectly coupled).

For the purposes of the description, a phrase in the form "A/B" or in the form "A and/or B" or in the form "at least one of A and B" means (A), (B), or (A and B), where A and B are variables indicating a particular object or attribute. When used, this phrase is intended to and is hereby defined as a choice of A or B or both A and B, which is similar to the phrase "and/or". Where more than two variables are present in such a phrase, this phrase is hereby defined as including only one of the variables, any one of the variables, any combination of any of the variables, and all of the variables, for example, a phrase in the form "at least one of A, B, and C" means (A), (B), (C), (A and B), (A and C), (B and C), or (A, B and C).

Relational terms such as first and second, top and bottom, and the like may be used solely to distinguish one entity or action from another entity or action without necessarily requiring or implying any actual such relationship or order between such entities or actions. The description may use perspective-based descriptions such as up/down, back/front, top/bottom, and proximal/distal. Such descriptions are merely used to facilitate the discussion and are not intended to restrict the application of disclosed embodiments. Various operations may be described as multiple discrete operations in turn, in a manner that may be helpful in understanding embodiments; however, the order of description should not be construed to imply that these operations are order dependent.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. As used herein, the terms "substantial" and "substantially" means, when comparing various parts to one another, that the parts being compared are equal to or are so close enough in dimension that one skill in the art would consider them as being the same. Substantial and substantially, as used herein, are not limited to a single dimension and specifically include a range of values for those parts being compared. The range of values, both above and below (e.g., "+/−" or greater/lesser or larger/smaller), includes a variance that one skilled in the art would know to be a reasonable tolerance for the parts mentioned.

It will be appreciated that embodiments of the systems, apparatuses, and methods described herein may be comprised of one or more conventional processors and unique stored program instructions that control the one or more processors to implement, in conjunction with certain non-processor circuits and other elements, some, most, or all of the functions of the systems, apparatuses, and methods described herein. The non-processor circuits may include, but are not limited to, signal drivers, clock circuits, power source circuits, and user input and output elements. Alternatively, some or all functions could be implemented by a state machine that has no stored program instructions, or in one or more application specific integrated circuits (ASICs) or field-programmable gate arrays (FPGA), in which each function or some combinations of certain of the functions are implemented as custom logic. Of course, a combination of these approaches could also be used. Thus, methods and means for these functions have been described herein.

The terms "program," "software," "software application," and the like as used herein, are defined as a sequence of instructions designed for execution on a computer system or programmable device. A "program," "software," "application," "computer program," or "software application" may include a subroutine, a function, a procedure, an object method, an object implementation, an executable application, an applet, a servlet, a source code, an object code, any computer language logic, a shared library/dynamic load library and/or other sequence of instructions designed for execution on a computer system.

Herein various embodiments of the systems, apparatuses, and methods are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition. In various instances, the phrases exemplary embodiment, further embodiment, and the like are used herein. Each of these embodiments are not to be taken as being solely mutually exclusive and, instead, should be understood to be able to be combined in any way with any alternative configurations without expressly detailing the various possible combinations and alternatives.

Figure 2:
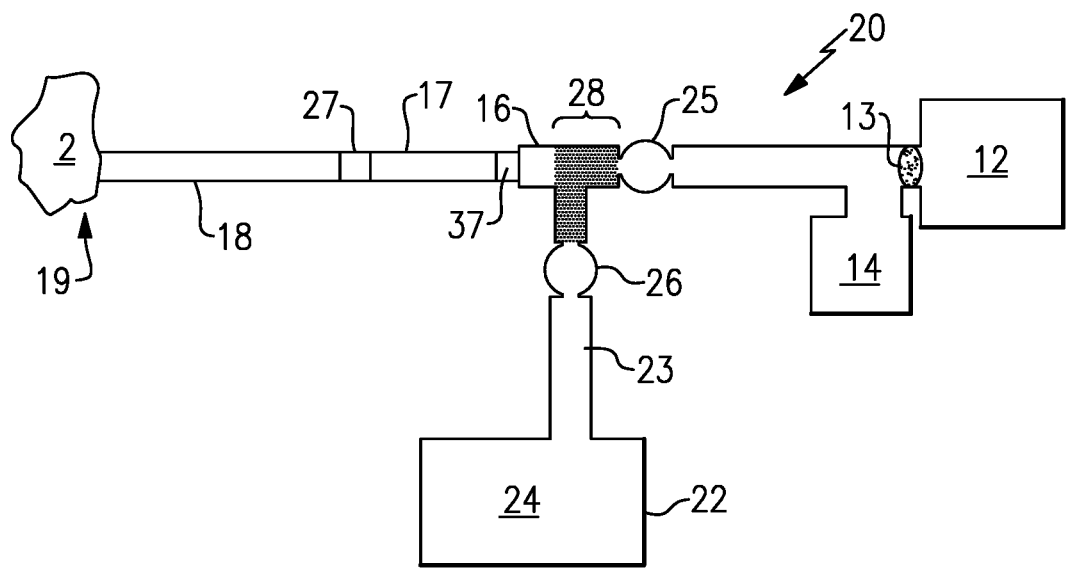
FIG. 2 is a partially cross-sectional view of a prior art aspiration thrombectomy system.

Current methods for thrombus removal cause some amount of blood loss, with many, depending on the clot burden, causing a significant amount of blood loss. Standard thrombectomy systems 10, a diagrammatic representation of which is depicted in FIG. 1, comprise a vacuum source or pump 12, a collection canister 14, a vacuum tube or extension line 17, and a catheter 18 for removal of a thrombus 2. The extension line 17 has a proximal side fluidically connected to both the collection canister 14 and the vacuum source 12. The distal side of the extension line 17 is fluidically connected to the proximal end of the catheter 18. Another thrombectomy system 20 is depicted in FIG. 2, where a pulsed aspiration cycle is utilized with a vacuum source 12, a manifold 16, a vacuum tube or extension line 17, a catheter 18 for removal of a thrombus 2, a vacuum valve 25, a vent valve 26, a vent fluid source 22, and a vent fluid 24. A collection canister 14 is included in FIG. 2 for completeness. The proximal side of the vacuum valve 25 (downstream) is connected fluidically to the vacuum source 12 (and to the collection canister 14). The distal side of the vacuum valve 25 (upstream) is connected fluidically to the manifold 16. A first side of the vent valve 26 is connected fluidically to the vent fluid source 22 through a vent line 23 and a second side of the vent valve 26 is connected fluidically to the manifold 16. Thus, when both the vacuum and vent valves 25, 26 are open and the vacuum source 12 is operating to supply vacuum, the vent fluid 24 is drawn through the vent line 23, the vent valve 26, the manifold 16, and the vacuum valve 25. The distal connection of the manifold 16 (upstream) is connected fluidically to a hub 37 of an extension line 17 and the distal end of the extension line 17 is connected fluidically to a hub 27 of the catheter 18. In one embodiment, the hub 27 of the catheter may be a female luer fitting that connects with a male luer fitting at a distal end of the extension line 17, although other fluid-tight connection fittings may be used.

In these exemplary embodiments, the proximal end can be closest to the vacuum source or vent source along the longitudinal extent of the system 10, 20 and the distal end or tip 19 can be furthest away from the vacuum source or vent source. In this way, vacuum applied to the extension line 17 by the vacuum source 12 causes fluid to be drawn into the distal end 19 of the catheter 18 when vacuum is applied. When placed against a thrombus 2 (e.g., see FIG. 3), this vacuum pressure pulls at least a portion of the thrombus 2 against the distal end 19 of the catheter 18 and, with time and sufficient vacuum, at least a portion of the thrombus 2 is loosened from its site and pulled through the catheter 18 and the extension line 17 and into the collection canister 14 (whether in a single piece or multiple pieces). To ensure that the blood and/or the thrombus 2 is not drawn into the vacuum pump 12, a deflector 13 (e.g., a filter) can be placed downstream of the entrance to the collection canister 14 in the vacuum conduit leading to the vacuum pump 12.

Ideally, the entirety of the thrombus 2 is removed all at once. However, in the peripheral vasculature, these thrombi are large and, to capture all of the material, the thrombi can be removed with a significant amount of catheter movement back-and-forth. This means that the dwell time of the catheter within the blood vessel 1 is relatively long. As the thrombus 2 is lodged within a blood vessel 1, any vacuum applied to the catheter 18 while the distal end 19 of the catheter 18 is open within a blood vessel 1 will cause the system 10, 20 to draw in blood from the patient. Coupled with the larger size of the catheter 18 (as compared to cerebral thrombi catheters), the result is a large volume of blood loss in a short amount of time, which approaches a maximum loss value fairly quickly.

There is only so much blood that a patient can tolerate being drawn into the thrombectomy system 10, 20, and surgeons routinely meet or exceed that limit (around 400 ml to 500 ml). Although aspirated blood can be reintroduced into the patient, this requires filtering and careful management of the blood. For example, reintroducing blood to the patient can be problematic because it increases overall procedural time (requires more steps, such as filtering and re-introducing). It would be preferable to mitigate blood loss. Current methods for such transfusion include using a 60 mL syringe to push blood and clot through a filter and back into the patient. This likely requires multiple "injections," the filtering of the blood, and the additional surgical process and time that patient is under anesthesia. Transfusion from other sources, while possible, introduce risks to the patient that are not typically acceptable to the physician. Removing and reintroducing a catheter also comes with risk, such as the possibilities of losing sterility, damaging the entry site, and causing trauma to vasculature.

Described now are exemplary embodiments.

Figure 4A:
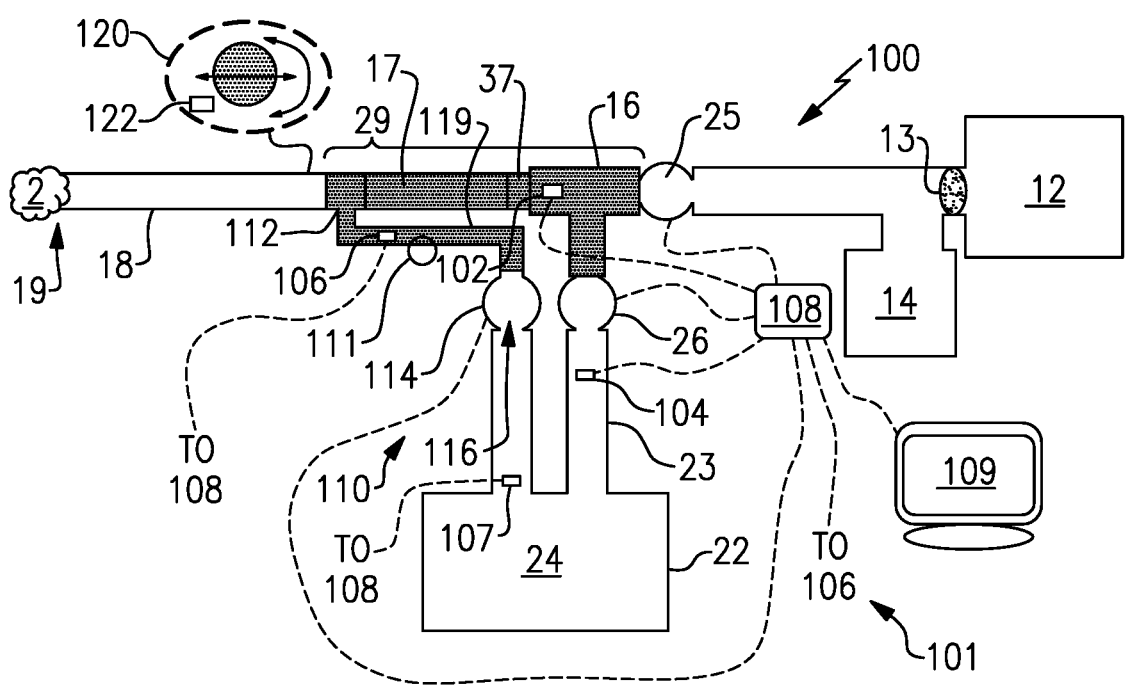
FIG. 4A is a partially cross-sectional view of another exemplary embodiment of an aspiration thrombectomy system having an aspiration control blood-loss mitigation assembly with a secondary vent at the catheter proximal end.

Although several of the embodiments are described below in the context of treating pulmonary embolisms or deep vein thromboses using aspiration in peripheral blood vessels (e.g., pulmonary arteries or deep veins in the legs), the embodiments described herein are equally applicable to treating ischemic stroke and other cerebral applications. FIG. 4A, by comparison, depicts an exemplary aspiration thrombectomy system 100 comprising a thrombectomy catheter 18 having a catheter lumen with a hub at a proximal end thereof, a vacuum source 12, a vent fluid source 22 containing vent fluid 24, a vacuum valve 25 comprising a vacuum valve output fluidically connected to the vacuum source 12 and a vacuum valve input, a vent valve 26 comprising a manifold vent valve input fluidically connected to the vent fluid source 22, 24 and a manifold vent valve output, a vent catheter valve 114 comprising a vent catheter valve input fluidically connected to the vent fluid source 22 and a vent catheter valve output fluidically connected to the catheter lumen at a catheter-extension line junction 112, a hollow manifold 16 comprising an interior, a catheter extension line output fluidically connected to the hub of the catheter 18 at the junction 112, a vacuum manifold output fluidically connected to the vacuum valve input, and a vent manifold input fluidically connected to the manifold vent valve output. In the exemplary configuration, the system has a primary vent source that comprises the vent valve 26 that fluidically connects and controls the input of the vent fluid 24 from the vent fluid source 22 to the interior of the manifold, and a secondary vent source that includes the vent catheter valve 114 which fluidically connects and controls input of the vent fluid 24 from the vent fluid source 22 to the catheter lumen at a catheter-extension line junction 112. Several aspects of operating the system 100 illustrated in FIG. 4A can be carried out with the systems described in U.S. patent application Ser. No. 18/056,683, filed on Nov. 17, 2022, to Deville et al. (hereinafter "Deville 683"), which is herein incorporated by reference in its entirety. In a configuration such as that shown in FIG. 2, an operable lumen is defined as a volume of the catheter lumen and the interior of the manifold up to the vacuum valve input and up to the manifold vent valve output. Returning to FIG. 4A, one or more sensors 102 is/are disposed in the operable lumen upstream of the vacuum valve input and is/are configured to sense a pressure waveform within the operable lumen and output the pressure waveform. A controller 108 is configured to open and close the vacuum valve 25, to open and close the vent valve 26, to open and close the vent catheter valve 114, to receive the pressure waveform from the sensor(s) 102, and to determine that an amplitude of the pressure waveform is decreasing. Upon making that determination, the controller 108 is configured to open the vent catheter valve 114 to supply secondary vent fluid 116 to the operable lumen. In the configuration of FIG. 4A, the vent catheter valve 114 supplies secondary vent fluid 116 to the operable lumen at the catheter-extension line junction 112. In some embodiments, the controller 108 operates the vacuum and vent valves 25, 26 to apply a pulsed aspiration cycle from the vacuum source 12 upon the lumen of the catheter 18. As explained herein, the secondary vent fluid source 110 is operated by the controller 108 by controlling the second vent valve 114 to perform various functions, for example, blood loss mitigation and unclogging. Exemplary functions are explained in further detail herein. It is understood that, in some embodiments, the controller 108 can signal the user of the aspiration thrombectomy system 100 to manually operate the second vent valve 114 or the user can manually operate the second vent valve 114 as desired separate from the controller 108.

Utilizing some embodiments of the exemplary aspiration thrombectomy systems 100 with the sensors 102, 104, 107, it is possible to determine that oscillations in pressure associated with pulsed action are effective for approximately 15 to 20 seconds. After about 20 seconds, pressure oscillations become damped and either minimally contribute or no longer contribute to improved cyclic aspiration. In such a situation, repeatedly cycling to significant vacuum levels forms gas bubbles in the liquid column ("degassing") between the vacuum valve 25 and the thrombus 2. Degassing of the liquid column acted upon by the vacuum source 12 increases compliance in the system and thereby reduces distal and proximal movement of the liquid column within the catheter 18. As a result, the gas bubbles in the fluid column dampen pressure wave propagation and significantly reduce the effect of cyclic aspiration.

An intensity of cyclic aspiration is governed by two major factors: compliance of the system and velocity of the fluid in the system. When the fluid in the system is moving (has a velocity) and then is suddenly stopped (e.g., by the closing of a valve (vacuum and/or vent)), pressure waves are created and transmitted through the fluid. After closing, when the valve re-opens, the fluid accelerates and creates pressure waves in the fluid column. This oscillation of non-degassed (e.g., a non-compliant fluid with little or no gas bubbles) fluid creates the energetic pressure pulses that help to break up the clot and allow the clot to be aspirated.

A volume of the operable lumen that is replenished with non-degassed fluid (e.g., fresh fluid) is influential on the duration of cyclic aspiration. Prior aspiration thrombectomy systems (e.g., system 20 shown in FIG. 2) replace degassed fluid with a relatively small amount of non-degassed fluid during cyclic aspiration. Referring to FIG. 2, a non-degassed fluid replacement volume 28 is defined within the manifold between the manifold vent valve output and the vacuum valve input (shown as a darkened volume within the manifold 16). In some embodiments herein, for example, in the systems 100 of FIGS. 4A-C and 5, a volume of degassed fluid that can be replaced with fresh secondary vent fluid 116 is significantly increased as compared to the prior art and, with this increase, the cyclic aspiration action is prolonged substantially, at least to approximately sixty (60) seconds.

When the fluid in the system has a threshold level of bubbles, it becomes more compliant and, therefore, loses its ability to transmit pressure waves. Therefore, a longer length of a non-degassed fluid replacement volume means that there is more non-compliant mass moving in the system, which equates to a greater pulsing force when a valve (e.g., the vacuum valve 25) is opened and closed. FIG. 4A illustrates an embodiment in which a significant percentage of the fluid volume in the operable lumen is non-degassed liquid, which enhances cyclic aspiration due to a greater change in momentum. Calculating volume using the equation for a volume of a cylinder ($V=\pi \cdot r^2 \cdot h$), an example where the extension line 17 is three meters (3 m) long with an inner diameter of 3.175 mm, a volume of fresh fluid in the non-degassed fluid replacement volume 29 is 24 mL. In comparison, where the extension line 17 is one meter (1 m) long with an inner diameter of 6.35 mm, the volume of fresh fluid in the non-degassed fluid replacement volume 29 is 31.67 mL.

Figure 4B:
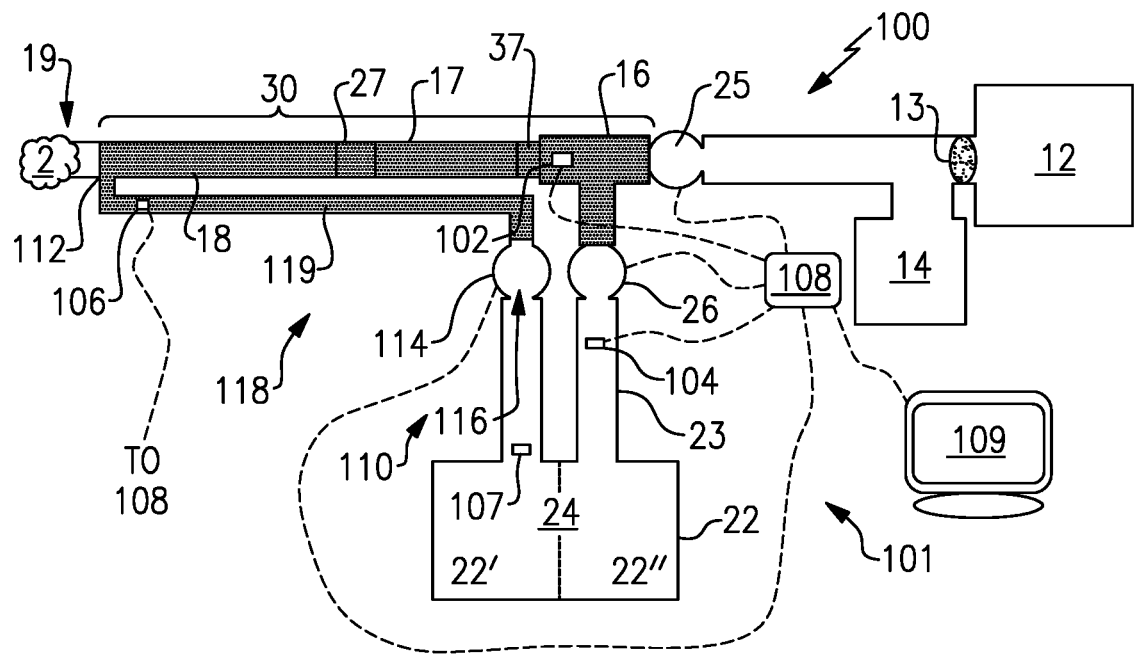
FIG. 4B is a partially cross-sectional view of a further exemplary embodiment of an aspiration thrombectomy system having an aspiration control blood-loss mitigation assembly with a secondary vent at the catheter distal end.

An exemplary embodiment of another vent configuration is shown in the aspiration thrombectomy system 100 of FIG. 4B. The aspiration thrombectomy system 100 has a non-degassed fluid replacement volume 30, in which almost an entire length of the fluid column from the distal end 19 of the catheter 18 to the vacuum valve 25 can be replenished. Here, the secondary vent fluid 116 is introduced at junction 112 at or near the distal end 19 of the catheter 18. Such a configuration can be achieved, for example, by incorporating an extra lumen in the aspiration catheter 18. Even in a fully occluded state, with this configuration, the action from pulsed aspiration will remain effective because the volume of at least nearly the entire operable lumen can be replaced whenever pulsed aspiration begins to damp. Thus, the volume of the degassed fluid replaced with fresh secondary vent fluid 116 is increased to a maximum. With initial damping detection of the cyclic aspiration action by the controller 108, the blood-loss mitigation assembly 101 can allow for continuous non-damped pulsed aspiration.

It should be appreciated that while fluid displacement with a degassed fluid is preferred, replacement with any additional fluid (degassed or non-degassed) will still result in an increase in pulsed aspiration. This is simply because the introduction of fluid (degassed or not) serves to maintain movement of the fluid in the volume 30 as long as the vacuum valve 25 is at least partially open. This is the second factor affecting the intensity of cyclic aspiration mentioned above, namely the velocity component of the fluid in the system. Upon closure of the vacuum valve 25 or the vent valves 26 and 114, a reactive pressure pulse results, allowing pulsed aspiration to continue without damping.

Figure 4C:
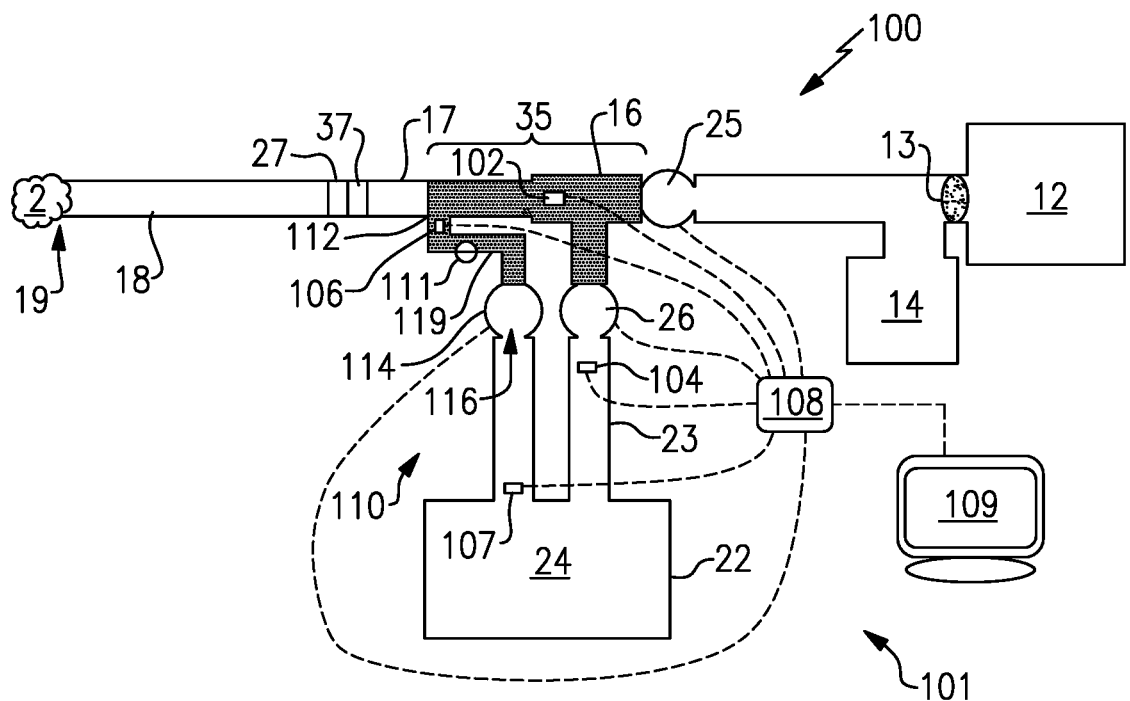
FIG. 4C is a partially cross-sectional view of another exemplary embodiment of an aspiration thrombectomy system having an aspiration control blood-loss mitigation assembly with a secondary vent positioned proximal to the system of FIG. 4A.

An exemplary embodiment of another vent configuration is shown in the aspiration thrombectomy system 100 of FIG. 4C. The aspiration thrombectomy system 100 has a non-degassed fluid replacement volume 35 which spans approximately the length of the manifold 16 from the distal end of the vacuum valve 25 to the junction 112 at roughly a mid-point of the extension line 17. Although the volume of non-degassed fluid provided in this embodiment is considerably less than that of the embodiments of FIG. 4A and FIG. 4B, it is greater than system 20 in FIG. 2, and the velocity component of the fluid is still increased relative to the system 20 of FIG. 2, such that the closing of either the vent valve 26, vent valve 114, the vacuum valve 25, or one or more of the above vent valves 26, 114, or vacuum valve 25 results in a pressure wave allowing pulsed aspiration to continue. It should be appreciated that in any of the embodiments shown in FIGS. 4A-4C, the placement of the junction 112 may be anywhere along the length of the catheter system from the distal end 19 of the catheter to just distally of the outlet from the vent valve 26. Nonetheless, to increase the efficacy of pulsed aspiration, it is desirable to increase the distance of the junction 112 from the vent valve 26 as much as possible to increase both the volume of the non-degassed fluid (e.g., fresh secondary vent fluid) to replace degassed fluid as well as the velocity of fluid in the column. Given that an interior diameter of the extension line is typically greater than an interior diameter of the catheter, any movement of the junction 112 distal of the fluid outlet from the vent valve 26 will significantly increase the volume of non-degassed fluid provided.

An advantage of the embodiments of FIGS. 4A and 4C is that while they are not capable of supplying as great a volume of non-degassed fluid as the embodiment of FIG. 4B, the placement of the junction 112 on the extension line 17 rather than toward a distal end of the catheter 18 may permit the junction 112 and the secondary vent source 110 to be entirely outside the patient, and potentially even outside a sterile field of the patient. Such placement also simplifies the construction of the catheter as there is no need to include an additional lumen in the catheter.

Applicant has appreciated that in certain embodiments, the primary vent source and the secondary vent source may be combined into a single vent source while still achieving prolonged cyclic aspiration. Such an embodiment is now described with respect to FIG. 5.

Figure 5:
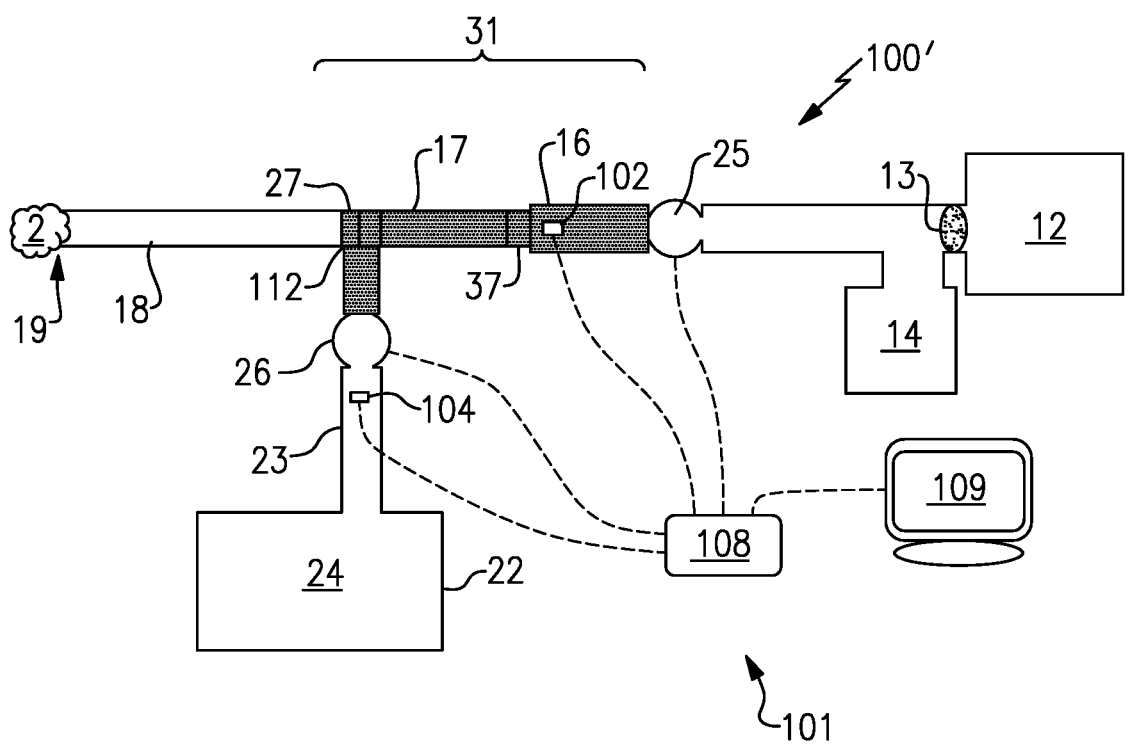
FIG. 5 is a partially cross-sectional view of a further exemplary embodiment of an aspiration thrombectomy system having an aspiration control blood-loss mitigation assembly using only a primary vent.

As shown in FIG. 5, an exemplary aspiration thrombectomy system 100' comprises a thrombectomy catheter 18 having a catheter lumen with a hub 27 at a proximal end thereof, a vacuum source 12, a vent fluid source 22 containing vent fluid 24, a vacuum valve 25 comprising a vacuum valve output fluidically connected to the vacuum source 12 and a vacuum valve input, a vent valve 26 comprising a vent valve input fluidically connected to the vent fluid source 22, 24, a vent valve output fluidically connected to the catheter lumen at a catheter-extension line junction 112, a hollow manifold 16 comprising an interior, a vacuum manifold output fluidically connected to the vacuum valve input, and a catheter extension line 17 having a distal end fluidically connected to the hub 27 of the catheter 18 at the junction 112, and a proximal end coupled to a distal end of the manifold 16 at a hub 37.

Several aspects of operating the system 100' illustrated in FIG. 5 can be carried out with the systems described in Deville 683." In the configuration depicted in FIG. 5, an operable lumen is defined as a volume of the catheter lumen and the interior of the extension line and the manifold up to the vacuum valve input and including the vent valve output. One or more sensors 102 is/are disposed in the operable lumen upstream of the vacuum valve input and is/are configured to sense a pressure waveform within the operable lumen and output the pressure waveform. A controller 108 is configured to open and close the vacuum valve 25, to open and close the vent valve 26, to receive the pressure waveform from the sensor(s) 102, and to determine that an amplitude of the pressure waveform is decreasing. Upon making that determination, the controller 108 is configured to open the vent valve 26 to supply vent fluid 24 to the operable lumen. In the configuration of FIG. 5, the vent valve 26 supplies vent fluid 24 to the operable lumen at the catheter-extension line junction 112, rather than at the manifold 16 as shown in FIG. 2. By moving the supply of vent fluid to the vent fluid outlet from the manifold 16 as shown in FIG. 2 to the junction 112 of the distal end of the extension line 17 and the proximal end of the catheter 18, the volume of non-degassed fluid 31 that can replace degassed fluid is increased as is the velocity of the fluid in the system. Further, this positioning anywhere along a length of the extension line still permits the vent supply and the vent fluid outlet to be outside of the patient, and depending on location, outside the sterile field of the patient.

Applicant has determined that whether the systems described here use a single vent fluid supply such as depicted in FIG. 5, or multiple vent fluid supplies as shown in FIGS. 4A-4C, it is the positioning of the vent fluid outlet (or vent fluid outlets) that has the greatest effect on prolonging cyclic aspiration. Specifically, Applicant has empirically determined that it is a ratio of a volume of non-degassed fresh vent fluid relative to the volume of the operable lumen that has the greatest impact on prolonging the duration of cyclic aspiration. While the greater the ratio of the volume of non-degassed fresh vent fluid to the volume of the operable lumen (e.g., from the distal end of the catheter 18 to the vacuum valve 25 positioned distally of the manifold 16 and including the vent valve 26 output), the longer the duration of cyclic aspiration may be maintained, there are limits. In preferred embodiments, a ratio of the volume of non-degassed fluid capable of being provided relative to the volume of the operable lumen is approximately at least 0.5, more preferably at least 0.6, more preferably at least 0.7, and even more preferably at least 0.8.

In one exemplary embodiment similar to that depicted in FIG. 5, a catheter 18 having a length of 115 cm and an inner diameter of 2.235 mm (0.088 inches) was used with an extension line 17 having a length of 3 m and an inner diameter of 3.175 mm (0.125 inches). With a single vent fluid supply disposed at a junction 112 of the extension line and the catheter (and ignoring the volume of the 2 inch long, 0.125 inch internal diameter manifold), a ratio of the volume of non-degassed fresh vent fluid to the volume of the operable lumen was approximately 0.84. With the single vent fluid supply disposed approximately half-way along the extension line 17, the ratio of the volume of non-degassed fresh vent fluid to the volume of the operable lumen was approximately 0.42. A typical range for the internal diameter of the catheter 18 may be about 0.082 inches to about 0.142 inches for typical peripheral vascular (PV) catheters.

Blood Loss Mitigation

To mitigate blood loss during a procedure, manual controls can be implemented. A technician can watch the vacuum canister 14 for clear blood flow and manually close a valve to stop the vacuum source to the catheter until the surgeon requests that the vacuum be restored. Another method is automatic control, which is illustrated in the systems 100 and 100' of FIGS. 4A-4C and 5. In some exemplary embodiments, a sensor in the vacuum line, just distal of the vacuum valve (e.g., sensor 102), can be used to detect whether the catheter tip is in open flow or is on the clot. In some embodiments, the sensor 102 can be integrated into the manifold (e.g., the T-manifold 16 of FIGS. 4A-4C). Exemplary embodiments of the sensors herein include, a pressure transducer (e.g., strain gauge, capacitive), a flow meter (e.g., capacitive, inductive, mechanical, ultrasonic), image recognition/optical (e.g., analog/digital camera and software). Pressure is one measurement described to be undertaken by a sensor. Some exemplary embodiments of a pressure transducer include an analog absolute pressure transducer type manufactured by TE Connectivity. Pressure is being described herein in various exemplary embodiments. By using the term sensor herein, however, it is envisioned that a measurement being done by a particular sensor may be something other than pressure; any sensor usable for that purpose will have its own particular measurement type.

Figure 3:
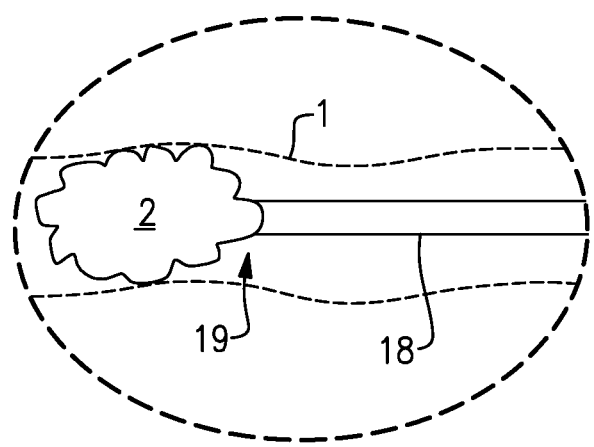
FIG. 3 is a fragmentary, enlarged, cross-sectional view of distal end of a catheter of any of the aspiration thrombectomy systems of the instant application.

Open flow is defined herein as the at least partially open catheter tip being disposed in the blood-filled vessel (e.g., the tip is not lodged against structure that would impede free flow of blood through the catheter). Being "on the clot" is when the catheter tip is in contact with the clot material. FIG. 3 illustrates a catheter 18 in a peripheral vessel 1 on the clot 2, which is occluding the vessel 1 and in the process of being removed. When the catheter 18 is in the open-flow state, the sensor (e.g., sensor 102, 104, 106) detects a relatively high pressure (e.g., little to no vacuum). When the catheter 18 is on the clot 2, the sensor detects a relatively low pressure (e.g., a significant vacuum). In some exemplary embodiments, a vacuum controller 108 is employed to act on these conditions and either apply the vacuum when the catheter 18 is on a clot 2 or close the vacuum source 12 when the catheter 18 is in open flow.

Some exemplary embodiments of cyclic aspiration (e.g., pulsed aspiration) for effective thrombus ingestion include rapidly turning the vacuum on and off several times a second to achieve a more energetic vacuum action against a thrombus 2. The resulting pressure waveform of the pulsed aspiration in open flow is markedly different than the pressure waveform when the catheter 18 is on a clot. This difference can be detected by the controller 108 (e.g., microprocessor) using waveform analysis techniques, thus further decreasing blood loss during the procedure. Various exemplary embodiments for repeatedly turning off the vacuum source 12 are described, for example, in Deville 683, in which lumen pressure vacuum and venting are placed in a series of states using vacuum and vent valves.

Figure 11:
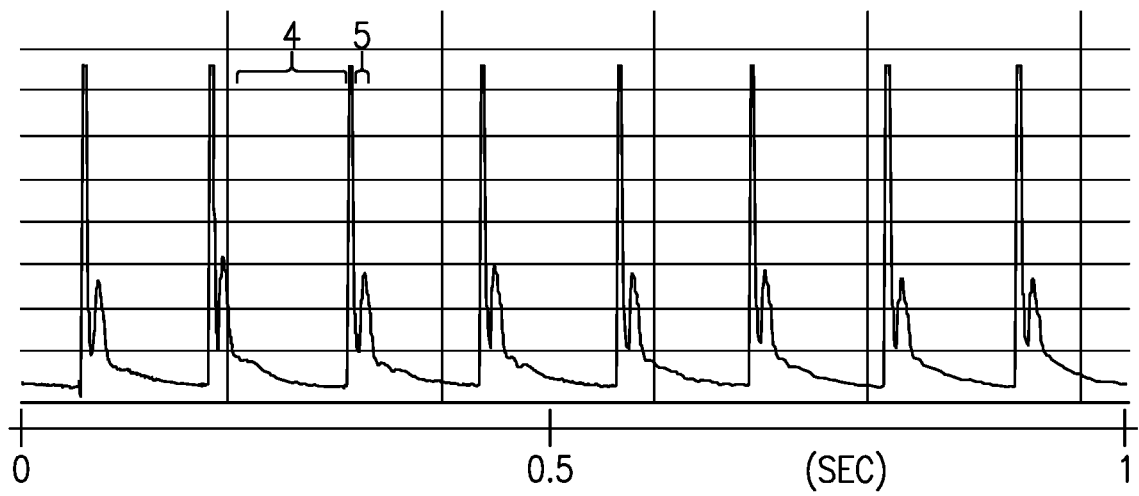
FIG. 11 is a graphical representation of a waveform of one second worth of pressure oscillations transmitted to clot in an occluded state.

The rapid change from low vacuum (little to no vacuum) to significant vacuum during pulsed aspiration causes a rapid start and stop of flow within the lumen of the catheter 18. Depending on several factors, such as compliance in the system, pressure of the vent fluid, size of the orifice through which the vent fluid is introduced and other factors, the rapid stopping of flow at the vacuum valve causes a pressure wave to be generated within the catheter fluid column and, subsequently, a fluid separation at the clot interface can occur in some instances when a clot at least substantially occludes the catheter lumen at the distal end 19. This separation can cause a near perfect local vacuum to form at the clot interface, imparting enough energy to the clot to tear it apart. FIG. 11, for example, illustrates a waveform of one second worth of pressure oscillations transmitted to a clot in an occluded state.

To keep this shuttling flow going, and to prevent the catheter 18 from pumping down to static vacuum, the fluid vent valve 26 and/or the second vent valve 114 is/are used and allows an amount of vent fluid 24 to enter the operable lumen and, thus, raise the relative pressure within the lumen of the catheter 18. In some embodiments of blood loss mitigation utilizing the aspiration thrombectomy systems 100 of FIGS. 4A-4C and 5, the controller 108 is programmed to detect when the catheter 18 is engaged with the clot 2 utilizing a pressure change. As soon as the controller 108 detects the open-flow state, the program changes the cycle to an idle state. An idle state is defined as a state during the procedure when the tip of the catheter is in open flow and the system 100, in sensing open flow, enters a low-blood-loss control algorithm. Some exemplary embodiments for implementing an idle state utilize, for example, a pulsed aspiration cycle having the following control states:

open the vacuum valve;
wait a period of time;
close the vacuum valve;
wait a period of time;
take a pressure measurement; and
determine a state of the catheter (on the clot/open flow) and either:
  1. repeat the idle state; or
  2. change to clot removal cycle using cyclic aspiration; monitor the clot removal cycle for a decrease in cyclic aspiration effectiveness; and open second vent valve when decrease is detected.

In some embodiments to achieve the idle state in the aspiration thrombectomy systems 100, instead of opening the vacuum valve 25 completely, the vacuum valve 25 is opened to an intermediate point (or alternatively, as described herein, a "partially open state"), which limits the flow rate. The vacuum valve 25 can be opened in percentage increments, for example, to 5% open, 10% open, 12.5% open, 15% open, 16.667% open, 20% open, 25% open, 33.33%, 37.5% open, 50% open, 62.5% open, 66.66% open, 75% open, 87.5% open, and so on up to 90% open. In some embodiments, the vacuum valve 25 is held only partially open for a period of time during the idle state (e.g., between about 5% to about 25% open), while in other embodiments, the vacuum valve 25 may be held only partially open for an entire duration of the idle state.

In some embodiments of the aspiration thrombectomy systems 100, the idle state includes pulsing the vacuum valve 25 open and closed while determining the state of the catheter 18. By including this pulsing of the opened vacuum valve open and closed, a duty cycle of the opened vacuum valve is decreased. For instance, if the vacuum valve pulse frequency is 10 Hz, the total cycle time is 100 ms. However, if the vacuum valve 25 is open for 50 ms during a cycle, the duty cycle becomes 50% and the flow is decreased by at least 50% while the controller 108 (e.g., microprocessor) determines a state of the catheter 18. This method can be further improved by combining with other processes, in particular, with the previous process, which opens the vacuum valve to an intermediate percentage while the pulsing occurs.

In some embodiments, the wait state can be eliminated before taking the pressure measurement. In this manner, the pressure waveform is continuously monitored and acted upon in real time to mitigate blood loss.

Traditionally, the surgeon or surgical staff will look at the collection canister 14 to evaluate how much blood the patient has lost in a procedure. Acceptable blood loss varies from patient to patient. In some embodiments, vent fluid is introduced (i.e., normal saline) during clot removal and mixes with the blood and clot material in the collection canister 14. A combination of blood and vent fluid in the canister 14 can be misleading when determining blood loss. Current systems are manual—the collection canister 14 is graduated (e.g., in ml) and the blood loss is read visually by the surgical staff or surgeon. In another example of manual calculation, the amount of vent fluid 24 used (e.g., read from graduations on the vent fluid source 22) is subtracted from a total amount of fluid (blood plus vent fluid 24) in the collection canister 14. In some exemplary embodiments of the aspiration thrombectomy systems 100, blood loss is mitigated by having the user input to the controller 108 how much blood loss is acceptable prior to carrying out the thrombectomy. The controller 108 measures blood loss periodically and stops the procedure automatically once the prescribed blood loss amount is met. This limit can change due to the variability in a given patient's health and size. Higher risk patients simply cannot lose as much blood as lower risk patients before becoming critically ill, merely because of the blood loss. Larger people can tolerate more blood loss in general than smaller people. Thus, the volume limit can be individually tailored to a given patient in a given procedure. In an improvement to user function, the controller 108 notifies a user through auditory, visual, and/or haptic feedback when certain checkpoints in the procedure are met. These checkpoints can include, for example, a notification when half of the allowed amount of blood loss is reached or when the maximum allotted blood loss is approaching or is met. In some embodiments, a counter (e.g., a digital numerical display, a color-changing display, and/or a graphical gauge) is connected to the controller 108, which increments in real time the amount (e.g., ml) of blood that has been removed from the patient. In some controller 108 embodiments, blood loss is calculated by an algorithm and displayed to the users (e.g., on a user display 109, an example of which is depicted in FIG. 4A).

In configurations where there is a mixture of blood and vent fluid 24 in the collection canister 14, it is more difficult to calculate the amount of blood actually lost in the procedure. If vent fluid 24 is included in the thrombectomy aspiration system, then, in some exemplary embodiments utilizing the controller 108, the controller 108 is connected to a measuring device associated with the vent fluid source 22 (e.g., dispenser/container). As the procedure progresses, the controller 108 can be programmed to subtract out the amount of vent fluid 24 from the volume of liquid that is measured when passing into the collection canister 14; this volume measurement can be by a flow meter or by weight, as examples. In some exemplary configurations, flow totalizers are included in the aspiration thrombectomy system 100. Using data from flow totalizers, the controller 108 indicates accurate blood loss volume. When cyclic aspiration is used in the aspiration thrombectomy systems 100, the controller 108 can be programmed to know, for a particular catheter (identified by connection to the aspiration system through, for example, RFID, magnetic, and/or optical measures), how much blood is lost for any amount of time that the catheter is run with vacuum (both in an idle mode and in a pulsing mode). Then, the checkpoint user interface indicates to a user a blood loss amount that is calculated by the controller 108. In some embodiments, the weight of the collection canister 14 can also be monitored, and the weight of the vent fluid 24 that is used is subtracted from the total weight of liquid in the collection canister 14 to give an actual value of blood loss. In such configurations, the controller 108 sets a vent fluid scale based on the tare weight of the vent fluid container 22 once a volume of vent fluid 24 is added to the vent fluid source 22. The empty collection canister 14 and the vent fluid source 22 are read as zero. The controller 108 communicates the blood loss value to a user throughout the procedure, displaying actual blood loss by converting a weight measurement to a volume measurement. The controller 108 handles this task and displays the result on a visual display 109, for example. Alternatively, a flow meter is used to measure the volume of aspirant that enters the collection canister 14 and the controller 108 subtracts the volume of the vent fluid 24 and displays the actual blood loss.

Vent Configurations

FIGS. 4A-4C and 5 show embodiments of aspiration thrombectomy systems 100 and 100' having a vacuum valve 25 and a vent valve 26 with an exemplary embodiment of intelligent blood loss reduction, referred to herein as the COBRA™ System. In a blood-loss mitigation assembly 101, a first sensor 102 (e.g., a pressure transducer) is disposed in the manifold 16, in the hub of the catheter 18, and/or in the extension line 17, and a second sensor 104 (e.g., a pressure transducer) is disposed between the vent fluid source 22 and the vent valve 26, the latter controlling vent fluid 24 supplied from the vent fluid source 22. Herein, the operable lumen is defined as a fluid column defined by the combined volumes of the catheter 18, the extension line 17, and the manifold 16 up to the manifold side of each of the vacuum and vent valve 26 or vent valves 25, 26. FIGS. 4A-4C and 5 show the thrombectomy system 100 or 100' in an occluded state (e.g., on the clot). In addition to the blood-loss mitigation assembly 101, the systems 100 of FIGS. 4A-4C also include a secondary vent source 110 that provides prolonged effective pressure oscillations for enhancing the efficacy of the pulsed aspiration phase.

FIGS. 4A-4C and 5 depict exemplary embodiments of the aspiration thrombectomy systems 100 with the blood-loss mitigation assembly 101 where the catheter 18 is occluded and the vacuum valve 25 and the vent valve 26 are both open. Replacement of the degassed fluid with the non-degassed vent fluid 24 is brought about by the controller 108 (e.g., a microprocessor) analyzing pressure data from at least one of the sensors 102, 104, 106, 107 (through communication lines indicated by dashed lines in FIGS. 4A-4C to 5). These communication lines can take any form, both wired and wireless, and they can be integral connections where various components are combined together in a single physical package. The amount of fresh vent fluid 24 (e.g., non-degassed fluid) introduced back into the aspiration thrombectomy systems 100 and 100' has a direct correlation with how well pressure waves propagate to the thrombus 2.

Figure 12:
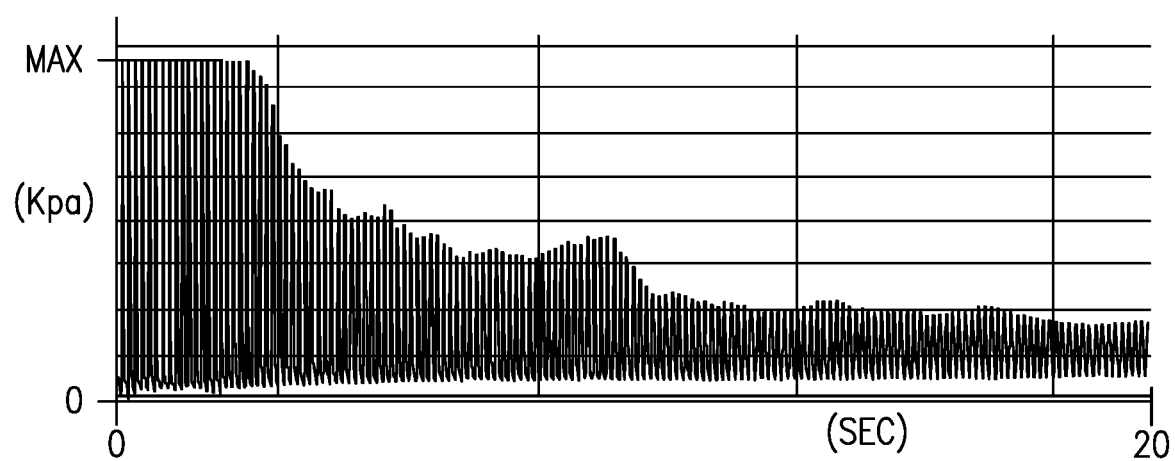
FIG. 12 is a graphical representation of a pressure waveform indicating how ROAR cyclic aspiration action becomes damped over time.

In systems without the secondary vent source 110, or in systems where the vent outlet is not disposed a sufficient distance distally from the vent valve 25, the amount of degassed fluid that can be replaced with non-degassed vent fluid is limited to the replacement volume within the manifold. As a result, once degassing starts to occur, effective pulsed aspiration can continue for only a few pulses before damping again occurs because most of the degassed fluid is in the extension line or the catheter. The stasis and degassing of the fluid column can be visualized by looking at the pressure waveform from the time that cyclic aspiration starts (in this case pulsed aspiration) for a given time period. The waveform of FIG. 12 shows the pressure waveform over the first twenty (20) seconds of pulsed aspiration after the catheter becomes occluded and during that catheter-occluded state. As can be seen in FIG. 12, the magnitude of pressure oscillations associated with effective clot ingestion (Y-axis) become less profound as fluid column begins to degass over time (X-axis). In FIGS. 4A-4C, the secondary vent fluid source 110 introduces fresh fluid 24 at a junction 112 between the extension line 17 and the catheter 18 (FIG. 4A), at the distal end 19 of the catheter 18 (FIG. 4B), or at a position along the extension line 17 (FIG. 4C). This secondary vent fluid source 110 is operated similarly through the controller 108 by controlling the second vent valve 114 (or manually, by the use of a manual valve switch operated by the operator as they see fit or as indicated by the controller 108). In such exemplary configurations, a volume of the degassed fluid replaced with fresh secondary vent fluid 116 is significantly increased in the non-degassed fluid replacement volume 29, 30, and 35 and, with this increase, the cyclic aspiration action is prolonged even further, to approximately at least sixty (60) seconds and longer. A similar effect is provided in the embodiment of FIG. 5 having only a single vent fluid source having a vent fluid outlet disposed a sufficient distance distally from the vacuum valve 25.

In addition to or in an alternative to replenishing the length of the fluid column by inserting non-degassed fluid further and further distal of the vacuum valve 25, in some embodiments, a duration that the vent valve 26 remains open can be increased in real-time. In particular, during a given cycle, e.g., within the pulsed aspiration cycle, the time that the vent valve 26 remains open is extended. In this way, when a decrease in cyclic aspiration effectiveness is detected by the controller 108, the time that the vent valve 26 remains open within the pulsed aspiration cycle is increased to counter that degradation and, thereby, prolong pulsed aspiration effectiveness. For clot removal, for example, the frequency can be between 1 Hz and 50 Hz with a vacuum valve open time of between 10 ms and 620 ms, with vent valve open times of between 4 ms and 210 ms, and with a double valve off time of between 1 ms and 80 ms. In another clot removal example, the frequency can be between 5 Hz and 15 Hz with a vacuum valve open time of between 40 ms and 125 ms, with a vent valve open time of between 10 ms and 45 ms, and with a double valve off time of between 3 ms and 15 ms. In another clot removal example, the frequency can be between 7 Hz and 14 Hz with a vacuum valve open time of between 44 ms and 88 ms, with a vent valve open time of between 12 ms and 30 ms, and with a double valve off time of between 5 ms and 11 ms. In particular, a frequency for clot removal is in the ranges between 7 Hz and 9 Hz and between 12 Hz and 15 Hz. For fluid replenishing, for example, the vacuum and vent valve double on time is between 100 ms and 2000 ms, in particular, between 200 ms and 350 ms.

The states of the aspiration thrombectomy systems 100 and 100' described herein are engaged by analyzing pressure data from the sensors 102, 104, 106, 107 located in the aspiration thrombectomy system 100 or 100' (as shown or located elsewhere associated with the fluid column of the operable lumen). In some exemplary embodiments, the first sensor 102 is configured distal of the vacuum valve 25 (upstream in the operable lumen). The second sensor 104 is configured to analyze pressure data in the vent fluid 24 from the vent fluid source 22 (outside the operable lumen). Sensors 106 and 107 in the embodiments of FIGS. 4A-4C are configured in the secondary vent source line, sensor 106 being distal of the secondary vent valve 114 and sensor 107 being proximal of the secondary vent valve 114. The controller 108 analyzes data from each of the sensors 102, 104, 106, 107 and determines a quality of the pulsed aspiration action. The controller 108 may use one or a combination of the sensors 102, 104, 106, 107 to determine the state of the aspiration thrombectomy system 100 and the quality of pulsed aspiration.

The vent fluid source 22 is illustrated in FIGS. 4A-4C and 5 as a single unit. In some embodiments, such as those depicted in FIGS. 4A-4C, this source 22 can be split into two separate sources 22' and 22" (indicated with dashed lines in FIG. 4B), one of the sources 22" supplying the vent valve 26 and the other of the sources 22' supplying the second vent valve 114.

The controller 108 optimizes pulsed aspiration action effectiveness by entering one of the described system states. An exemplary embodiment of controller logic includes, but is not limited to:
  the controller 108 determining, from pressure measurement data, that the aspiration thrombectomy system 100 is fully occluded and that pulsed aspiration action is becoming damped and, therefore, to stop pulsed aspiration;
  to open the vacuum and venting sources for a prescribed period; and
  to resume pulsed aspiration and continue monitoring.

Figure 13:
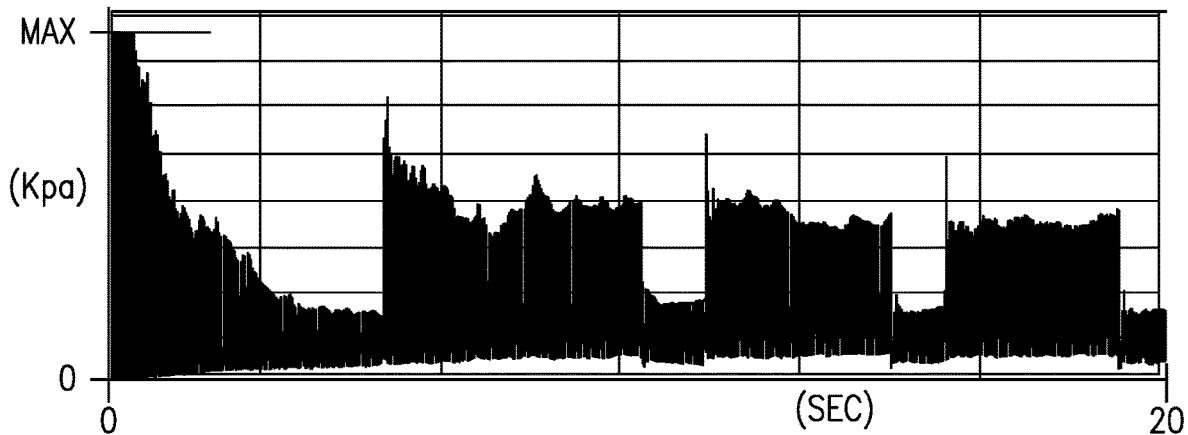
FIG. 13 is a graphical representation of a pressure waveform when cyclically opening the secondary or supplementary vent valve to prolong ROAR cyclic aspiration effectiveness in a clogged state in the configuration of the system of FIG. 4.

In some exemplary embodiments, as the controller 108 determines that pulsed aspiration action is becoming damped, the controller 108 cyclically opens the secondary vent source 110 until the controller 108 determines that the secondary vent fluid 116 is no longer needed using the pressure maximum values with the controller 108 performing real time monitoring of clot removal pressure waveforms; if the maximum pressure value approaches or falls bellow hemodynamic pressure, the secondary vent fluid 116 is introduced. With such control, the pulsed aspiration action is extended, thereby improving thrombus ingestion. The waveform in FIG. 13 depicts cyclically opening the secondary vent valve 114 to prolong pulsed effectiveness in a clogged state in the exemplary configuration of FIG. 4A—where the vent fluid 24 is introduced at the junction 112 of the catheter 18 and the extension line 17. From this waveform, it becomes evident that pulsed aspiration action can be recovered or partially recovered after having damped in an occluded state if the secondary vent source 110 introduces the secondary vent fluid 116 at the junction 112. An advantageous benefit of this exemplary embodiment is for removal of a thrombus causing a clog in the aspiration thrombectomy system 100. If the aspiration thrombectomy system 100 is clogged by an ingested thrombus, introducing the secondary vent fluid 116 provides the energy needed to ingest an extremely hard clot and/or a heavy clot burden. The benefit that this provides results in shorter procedure times because, when clogs cannot be cleared in situ, they need to be cleared by using a guidewire or another mechanical device or by removing the catheter 18 from the patient. Using an external device risks loosening clot and allowing it to flow downstream. Removing the catheter risks damage to the vessel and the entry site. Each of these methods lengthen the procedure and cause user frustration.

Figure 14:
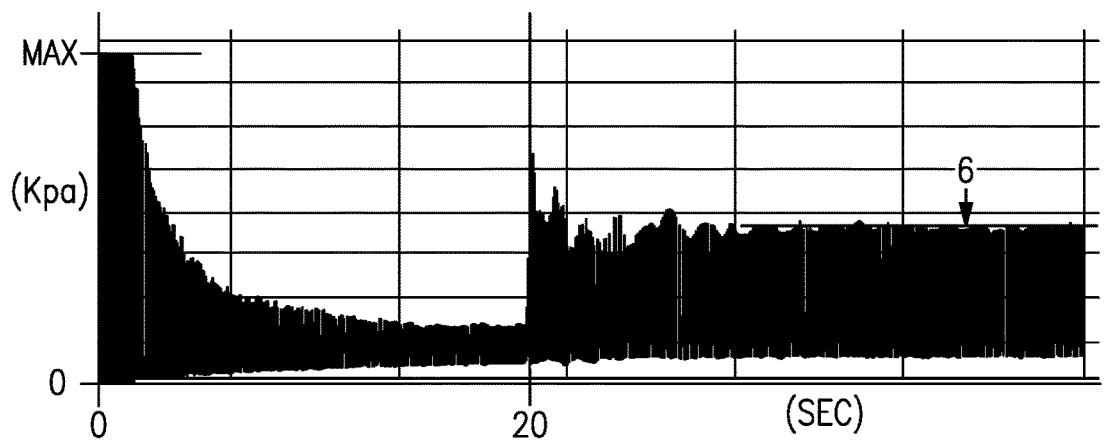
FIG. 14 is a graphical representation of a pressure waveform indicating how ROAR cyclic aspiration action becomes damped over a first period and thereafter how the exemplary embodiments of the aspiration thrombectomy systems herein improve upon and prevent damping.

In addition (or in the alternative or in combination), when the controller 108 determines that the aspiration thrombectomy system 100 is occluded, the controller 108 opens the secondary vent source 110 while pulsed aspiration is active. Opening the secondary vent source 110 continues the energetic action of pulsed aspiration by allowing fluid flow when the vacuum valve 25 opens and subsequent pressure wave generation when the vacuum valve 25 closes. If the system 100 remains occluded with no flow, there is no energetic pulsatile action and the system 100 will be effectively clogged. The waveform of FIG. 12 and waveform in the left half of FIG. 14 illustrate how pulsed aspiration action becomes damped (in approximately 20 seconds). The waveform in the right half of FIG. 14 illustrates what happens to the pressure after opening the secondary vent source 110 in the configurations shown in FIG. 4A, 4B, and FIG. 4C once the action from pulsed aspiration has damped (when applied to the configuration of FIG. 4B, the restored pressure amplitude is even greater than in the configuration of FIG. 4A, while in the configuration of FIG. 4C, the restored pressure amplitude is slightly less, but still significantly greater than when damped). Significantly, after becoming damped, when the secondary vent source 110 (vent valve 114) is opened, and thereafter remains open, pulsed aspiration action does not decay in an occluded state of the catheter 18. The lack of decay is illustrated in FIG. 14 with the horizontal line 6 showing that a maximum pressure of pulsed aspiration remains stable and approximately constant. Notably, the inventors discovered that, in some embodiments, when the secondary vent source 110 is opened at the commencement of pulsed aspiration and is left open, pressure oscillations remain effective for up to, but not limited to, one (1) minute. Similar results have been obtained with the single vent valve configuration of FIG. 5.

In some secondary vent source embodiments of the controller 108:
  the controller 108 determines if the catheter 18 is occluded;
  the controller 108 transitions to a clot removal routine and the secondary vent source 110 introduces secondary vent fluid 116 simultaneously;
  the controller 108 detects open flow; and
  the controller 108 transitions to the blood saving routine.

In some embodiments for operating the aspiration thrombectomy systems 100:
  the operator navigates the catheter 18 to the area of the thrombus 2;
  the COBRA™ system 100 is turned on and enters a blood saving routine;
  the operator moves the catheter 18 back and forth in the vessel 1 in an attempt to interface with the obstructing clot 2;
  the COBRA™ system 100 recognizes that the catheter 18 is in contact with clot 2 and begins a clot removal routine; and
  once the material of the clot 2 is ingested, the controller 108 reverts back to a blood saving routine and alerts the operator.

Figure 15:
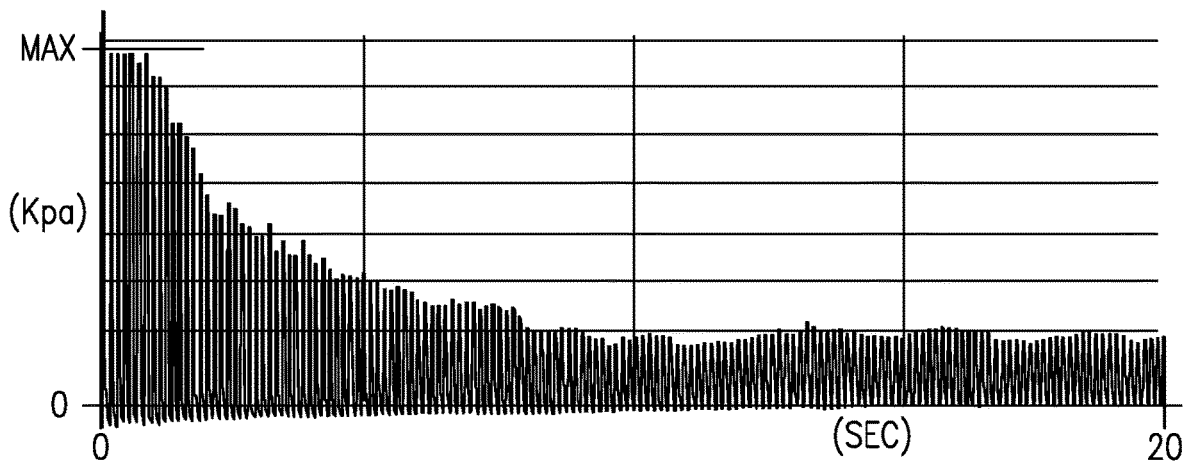
FIG. 15 is a graphical representation of a pressure waveform from measurements taken with a sensor in the system configuration of FIG. 2 experiencing ROAR cyclic aspiration.
Figure 16:
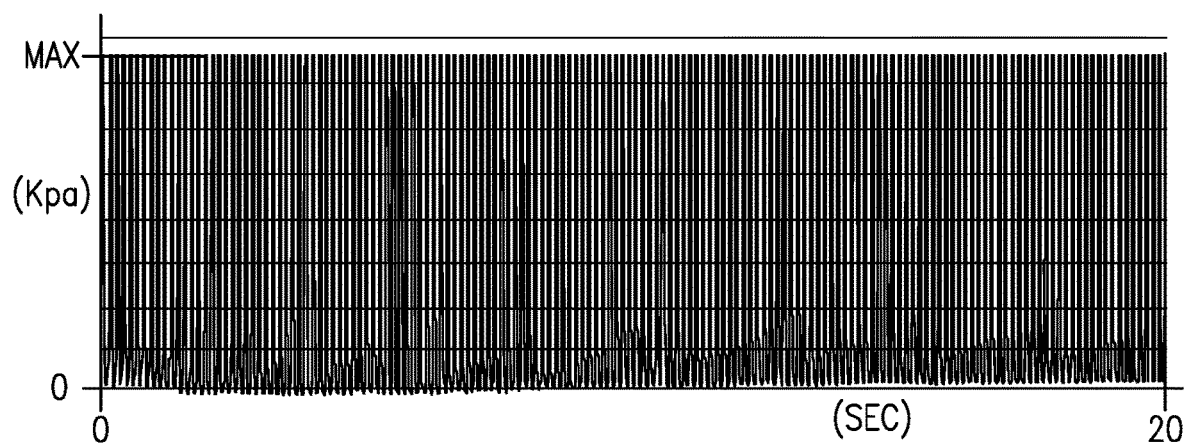
FIG. 16 is a graphical representation of a pressure waveform from measurements taken with a sensor in the system configuration of FIG. 4 experiencing ROAR cyclic aspiration in a fully occluded state.

The waveform of FIG. 15 illustrates pressure data taken with a sensor in a system such as depicted in FIG. 2 with a vent source disposed in the manifold 16 and without the secondary vent source 110 shown in FIGS. 4A-4C. FIG. 15 shows that, in a fully occluded state, large pressure pulses associated with effective pulsed aspiration action deteriorate over time. The deterioration can be attributed to the inability to replace a substantial amount of degassed fluid that exists after full occlusion with cyclic aspiration. The waveform of FIG. 16, in contrast, depicts pulsed aspiration pressure data taken with the sensor 102 in configurations of the aspiration thrombectomy systems 100 in FIGS. 4A-4C having and applying the secondary vent source 110. FIG. 16 illustrates that, in an occluded state, if the secondary vent fluid 116 is introduced at the catheter-extension line junction 112 through the flushing tube 119 of the secondary vent source 110 continuously while pulsed aspiration is active, pressure oscillations are preserved for much longer. With the configuration of FIG. 4A, cyclic aspiration is effective for at least one (1) minute. In some exemplary embodiments, the secondary vent source 110 can be utilized at the onset of cyclic aspiration. In some exemplary embodiments, instead of waiting for cyclic aspiration to damp, the secondary vent source 110 is used continuously for maximum performance. To put this another way, when a catheter is in a clogged state in systems with a vent source disposed in the manifold and without the secondary vent source 110, pulsed aspiration may be effective for a limited period of about twenty seconds (20 s); however, in a clogged state with the configurations shown in FIGS. 4A-4C, if the secondary vent source 110 is opened at the commencement of pulsed aspiration and is left open throughout the duration of pulsed aspiration, pressure oscillations are effective for much longer and decay at a much slower rate.

Use of the herein-described system states is not limited to merely prolonging pulsed aspiration effectiveness in a condition where the aspiration thrombectomy systems 100 are occluded. In a situation where the user wants to ensure that the aspiration thrombectomy system 100 is primed fully with a non-degassed fluid, one of the herein described states can be entered directly. Entering one of these states also can be used to rid the system 100 of clot debris, which also damps wave propagation in the operable lumen along with clearing any clot debris that may be interfering with pressure sensors. The states can also be entered independently of data from the pressure measurement device(s) by applying the state(s) in a pre-determined operating frequency. An exemplary embodiment of such logic includes:

the user engages pulsed aspiration;
pulsed aspiration action occurs for a period (e.g., between approximately 500 ms and 30 s, particularly, between approximately 1 s and 25 s, more particularly, between approximately 1 s and approximately 20 s, more particularly, between approximately 5 s and approximately 20 s, more particularly, between approximately 10 s and approximately 20 s;
the vent state is entered for a period between approximately 100 ms to approximately 5000 ms, particularly, between approximately 250 ms to approximately 4000 ms, more particularly, between approximately 300 ms and 3000 ms, more particularly, between approximately 350 ms and 2000 ms, more particularly, between approximately 375 ms and 1000 ms, more particularly, between approximately 350 ms and 500 ms; and
return to pulsed aspiration.

This logic can be used in a blood loss mitigation process with the aspiration thrombectomy systems 100 that remove less blood from the patient during a procedure without having to reduce an amount of time that action from pulsed aspiration occurs.

Thrombus detection and blood-saving algorithms rely on pressure and/or flow changes; pressure measurement is preferable because the sensors are inexpensive, disposable, out of the flow stream, tiny, and reliable. Inexpensive flow sensors exist, but they rely on a rotating wheel within the flow stream (i.e., flow contact) causing potential clogging problems. Non-flow-contact sensors exist (optical, etc.) but they can be expensive and bulky.

In some exemplary embodiments of operating the aspiration thrombectomy systems 100 and 100', the vacuum valve 25 is opened in short intervals and a pressure measurement is taken at a prescribed moment in time after the vacuum valve actuator has closed the vacuum valve 25. In some exemplary embodiments, clot detection and transitions are made while the vacuum valve 25 is opening. To accomplish this, the vacuum valve 25 slowly opens to a relatively small cross-sectional area (preferably following a sinusoidal motion profile, but not limited to this). The opening is approximately to 25% of the aspiration tubing, in other embodiments, to 30%, to 33.33%, to 37.5%, to 50%, to 62.5%, to 66.66%, to 75%, or to 87.5%. A servo motor or linear servo motor or linear voice coil actuator are capable of this type of control. There is a benefit provided by detecting clots and making transitions while the vacuum valve 25 is opening. With some exemplary embodiments of the methods for operating the aspiration thrombectomy systems 100 and 100', clot detection is more efficient because there is no need to preserve a pressure zone between the closed actuator and clot—after closing the vacuum valve, because the clot 2 is no longer exposed to the vacuum source 12, the clot could fall off the distal end 19 of the catheter 18. In order for the clot 2 to remain caught at the tip 19 of the catheter 18, the material of the clot must be sufficient to create a seal there. In contrast, detecting a clot while opening the vacuum valve 25 has little or no risk of the clot 2 falling off when the controller 108 transitions from an idle routine to a clot ingesting routine.

Figure 17:
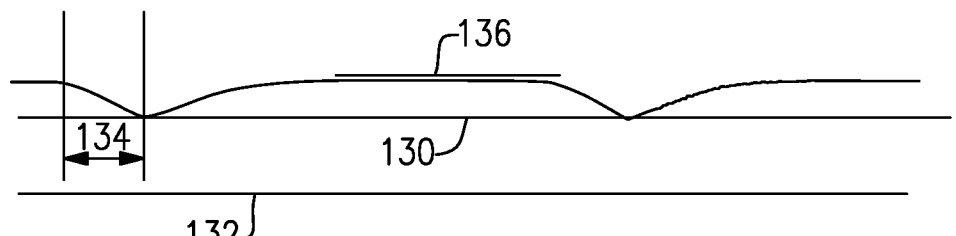
FIG. 17 is a graph of an exemplary embodiment of a waveform of an idle routine triggering based upon a level of vacuum.

The graph of FIG. 17 assists in determining how to create a threshold 130 for triggering the idle routine for the aspiration thrombectomy systems 100 of FIGS. 4A-4C and 5. Knowing that the catheter 18 experiences hemodynamic pressure 136 when in a vessel, a trigger can be defined as a value that is at a pre-defined distance from hemodynamic pressure 136. In the idle state, detection starts by slowly opening the vacuum valve 25 to a reduced amount (a smaller area than 100% open). In an exemplary embodiment, the vacuum valve 25 opens to a smaller area than that of the aspiration tube existing between the manifold 16 and the vacuum source 12 (e.g., having a 0.125" inner diameter). As opening of the vacuum valve 25 occurs, if there is no obstruction in the lumen of the catheter 18, then pressure measured in the catheter 18 is at or close to hemodynamic pressure. As material of the clot 2 impedes or occludes the lumen, any measured pressure will be lower than hemodynamic pressure 136. From this, a threshold 130 for triggering the idle routine and transferring to an aspiration routine is defined. In some exemplary embodiments, it is assumed that the greatest hemodynamic pressure 136 is 16 PSI absolute and the lowest is 11 PSI Absolute. Thus, 11 PSI Absolute is defined at the threshold 130. From this, when the vacuum valve 25 is partially opened to this reduced cross-sectional area for pressure measurement, if a pressure reading is below 11 PSI Absolute, then the controller 108 is triggered to turn the idle routine off and to turn the aspiration on (standard or pulsed). With this idle routine triggering process, pressure measurements are taken during the period starting after the vacuum valve 25 begins to open and ending when the vacuum valve 25 is open to its maximum reduced area for the idle routine that does not include vent fluid or when the vacuum and vent valves 25 and/or 26 are open to their maximum reduced areas for an idle routine that does include vent fluid. In the idle mode, if clot material is drawn to the tip 19 of the catheter 18, the sensor 102, 104, 106, 107 will detect a pressure that is below the threshold (e.g., 11 PSI Absolute). Because the pressure reading is below the pre-defined threshold 130, the controller 108 transitions from the idle routine.

This triggering process is depicted in the graph of FIG. 17, where the level of vacuum is on the Y-axis with full vacuum 132 at the bottom of the graph. During a measurement period 134, a falling edge of pressure is detected and the controller 108 determines if the detected pressure is below the threshold 130. If the determination is negative, which it is because the pressure value is above the threshold 130, detection for triggering the idle routine continues, as is shown in FIG. 17 in two instances. In contrast, if the determination is positive, in other words, yes, the pressure is below the threshold 130 (which is not illustrated in FIG. 17), then the idle routine is triggered off and cyclic aspiration begins.

This is an improvement over checking pressure after the valves 25 and/or 26 have closed, where, in that case, there needs to be a preserved a negative pressure zone between the closed valves 25 and/or 26 and the tip 19 of the catheter 18. The problem with checking pressure after the valves 25 and/or 26 have closed is that, if the clot falls off of the tip 18 of the catheter 18 once the actuators close, no negative pressure zone is preserved and, therefore, the transition to the clot removal routine is never made.

In some process embodiments where the system is not occluded, measurement taken with the sensors 102 and/or 106 reads a current state of venous hemodynamic pressure. During the time that the hemodynamic pressure is being measured without occlusion, the controller 108 continues the blood-saving/clot-detecting algorithm(s). The actions of the controller 108 during these states is defined as an "idle routine" or "idle routines." If the hemodynamic pressure measurement falls below the configured or pre-determined threshold, signifying contact with the thrombus 2, the controller 108 is programmed to begin pulsed aspiration or the controller 108 can indicate clot detection to the operator for manual initiation of pulsed aspiration. A transition back to an idle routine can be determined through various methods.

A first exemplary idle routine transition method includes:
pulsed aspiration active for a given period (e.g., between approximately 1 and 10 seconds, approximately 1 and 5 seconds, approximately 2 and 3 seconds, in particular, approximately 3 seconds);
close the vacuum and vent valves;
[optionally, wait for fluid dynamics to settle to ensure reliable sensor reading (e.g., up to approximately 500 ms, between approximately 10 ms and approximately 500 ms, between approximately 80 ms and approximately 150 ms, in particular, approximately 250 ms)]; and
take measurement (e.g., pressure) and:
if that measurement is above a given threshold (signifying open flow, e.g., slightly less than hemodynamic pressure), then return to an idle routine;
the system determines these threshold values by recording pressure before starting routines; if the value is below, continue pulsed aspiration, if the value is above or equal, return to Idle (put another way, if the value is lower than hemodynamic pressure when both valves are closed, an occlusion must be present); and
if not, then continue pulsed aspiration.

When a transition to pulsed aspiration is made, a second exemplary idle routine transition method includes:
begin a real-time waveform analysis using data from the first sensor 102; and
if the waveform indicates an occlusion is no longer present, return to idle.

Figure 6:
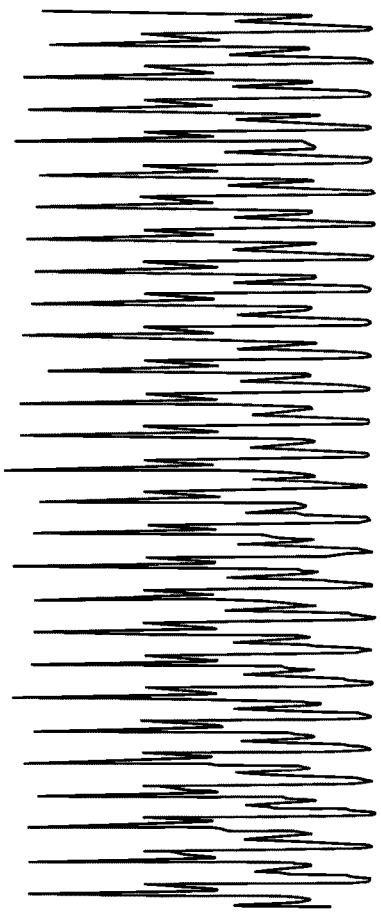
FIG. 6 is a graphical representation of a pressure waveform from a cyclic aspiration with no occlusion.
Figure 7:
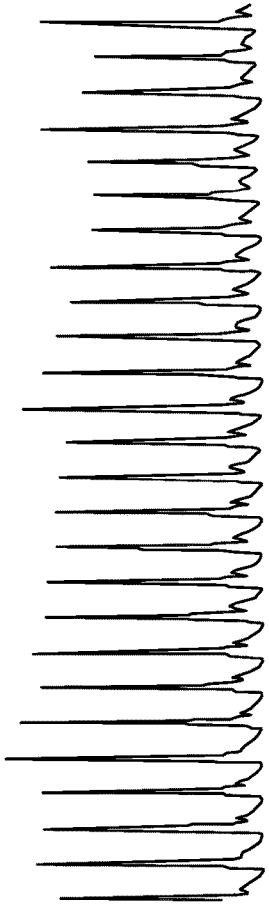
FIG. 7 is a graphical representation of a pressure waveform from a cyclic aspiration with a catheter occlusion.

A graphical representation of the pulsed aspiration waveform where there is no occlusion is shown in FIG. 6 and the pulsed aspiration waveform when an occlusion exists is shown in FIG. 7. Then, when the transition to pulsed aspiration is made, the routine being carried out by the controller 108 begins the real-time waveform analysis using data from the second sensor 104 if the secondary vent source is used or a combination of the sensors 102, 104, 106, 107 can be used. If the secondary vent source is not used, then the sensors 102 and/or 104 can be used. The waveform data taken at a location proximal to the vent valve 26 during the pulsed aspiration varies from when the system is occluded to when it is no longer occluded. This variance is attributed to a drop in pressure within the vent line 23. The drop in pressure is a result of the catheter 18 being occluded and suction force increasing at a path of least resistance, which, in this situation, is the vent fluid path. A graphical representation of the pulsed aspiration waveform during this change from not occluded to occluded is shown FIG. 8.

With the controller 108 associated with the aspiration thrombectomy systems 100, it becomes possible to determine a degree of the thrombectomy procedure's success. A sensor fluidically associated with the distal end 19 of the catheter 18 (for example, the sensors 102, 106) can be used to determine the current state of venous hemodynamic pressure at a location proximal to the thrombus 2 prior to starting the thrombectomy. At the conclusion of the thrombectomy procedure, the user returns the distal end 19 of the catheter 18 to approximately the same position with respect to the former thrombus site and a second pressure measurement is taken of the state of venous hemodynamic pressure. The controller 108 is programmed to compare these two pressure measurements and, from this comparison, the program can cause the controller 108 to determine a relative value of how well the surgeon returned patency to the vessel 1. This method is beneficial in thrombectomy procedures where an angiogram does not clearly show a length of the thrombus 2.

In some embodiments with a configuration for experienced users of the aspiration thrombectomy systems 100 or 100', real-time pressure waveforms, such as those in FIGS. 6 to 16, are displayed to the operator/surgeon. By watching the real-time behavior of that waveform, the operator is able to maximize efficiency and utilize pulsed aspiration action with greater effectiveness. For example, after a period of time in an occluded state, drastic changes in pressure associated with pulsed aspiration action start to diminish, which reduction is able to be represented in a waveform that is displayed by the controller 108 on a fluoroscopy monitor or a user interface, such as a visual display 109 (e.g., a computer screen shown in FIGS. 4A-4C). When that deterioration starts to occur, the surgeon can retract the aspiration catheter 18 distally (e.g., a few millimeters) within the vessel 1 to allow reciprocating flow into the distal tip 19 of the catheter 18. After repeated use of the aspiration thrombectomy systems 100 or 100', the surgeon will intuitively associate certain behavior of displayed waveforms to particular procedural outcomes. As the surgeon is more familiar with the systems 100 or 100', an increase in thrombectomy efficacy can occur.

The point in the thrombus aspiration cycle that a pressure measurement is taken becomes significant. Due to pulsing of the vacuum and vent valves, pressure waves are created in the catheter fluid column. While advantageous when removing a thrombus, the pressure waves can be problematic when determining a state of the catheter 18. When the vacuum valve 25 is closed, a pressure wave bounces back and forth (rings) along the length of the fluid column, losing energy until it is finally exhausted. The time for wave expiration can take tens of milliseconds. If the pressure measurement is taken before the pressure pulses have decreased sufficiently, an erroneous measurement will result. It is therefore necessary to characterize the catheter 18 and its particular waveform to determine when the pressure measurement should be taken and/or to perform real-time, pressure-wave analysis, such as fast Fourier transform (FFT) to determine when the amplitude of the ringing waveform is sufficiently low to allow a meaningful measurement of pressure to be taken. In some embodiments of the aspiration thrombectomy systems 100 and 100', the pressure wave pulses (ringing) can be mitigated by closing the vacuum valve 25 smoothly as opposed to "slamming it shut." Smooth closure, however, increases an amount of delay time before a pressure measurement can be taken. From this, it was discovered that a sinusoidal valve closing profile, or similar non-linear closing profile, such as exponential, is preferable and further decreases the amount of blood loss during the procedure.

As discussed previously, an idle routine is a behavior that is active when the aspiration thrombectomy system 100 or 100' is not occluded and is removing as little blood as possible. Along with this, exemplary idle routines are used in some exemplary processes to hunt for catheter contact with thrombi 2 and look to transition to another routine that is tailored specifically for removal of a thrombus 2. In its most basic configuration, an idle routine can be described as opening the vacuum valve 25 for a brief period (for example, for approximately 100 ms at approximately 0.6 Hz, which yields a period of 1800 ms where the vacuum valve opens at 0 ms and the vacuum valve closes at 100 ms, the vacuum valve remaining closed for the rest of the period (e.g., approximately 1700 ms), checking the pressure in the catheter, and determining if the system is occluded. In some embodiments, an idle routine could also include vent valve timing with a period of 1800 ms, with both vacuum and vent valves open at 0 ms and closed at 100 ms. The vacuum valve open time can be up to 1000 ms if opened slowly to a small percentage of the area of the vacuum tube. If the pinch valves only close and open fully, sampling should be done in sub-1-second intervals (to prevent loss of too much blood in an idle/sampling routine). This can induce unnecessary dynamics into the system, which could lead to faulty pressure reading and/or projecting clot material too far from distal tip. In some embodiments, the idle routine timing range is between approximately 0.4 Hz to 1 Hz, but it is not limited to this range. In some embodiments, the idle routine has the vacuum valve on for 100 ms and off for 1250 ms. In some embodiments, the idle routines remove between approximately 1 cc/min and less than 10 cc/min and do so with the actuators of the vacuum valve open partially (not fully) and vent valve 26 at least partially to fully open. In such embodiments, the vacuum valve may be partially open for the entire duration of the idle state; with the vent valve 26 being fully open, or only partially open during the entire duration of the idle state. Some exemplary embodiments of the method for carrying out an idle routine with the aspiration thrombectomy systems 100 include:

opening the vacuum valve 25;
  drawing thrombus matter to the tip 19 of the catheter 18;
  thrombus matter creating an occlusion at the distal end 19 of the catheter 18;
  closing the vacuum valve;
  checking pressure within the operable lumen with the controller 108;
  if a negative pressure zone has been preserved after the vacuum valve has closed, an occlusion must be present and, therefore, transition to a thrombus removal routine; and
  if a negative pressure zone has not been preserved after the vacuum valve has closed, return to idle routine.

Figure 9:
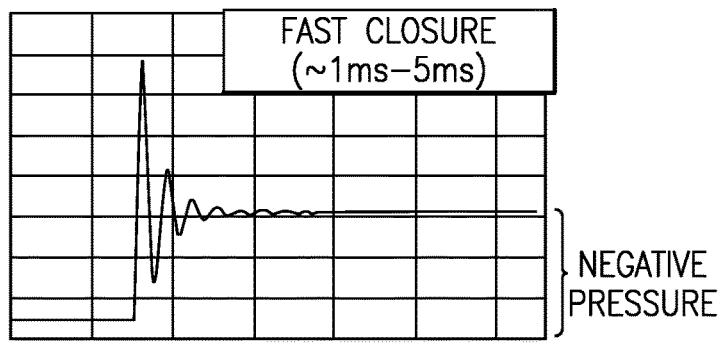
FIG. 9 is a graphical representation of pressure oscillations after a relatively fast close of a vacuum valve.
Figure 10:
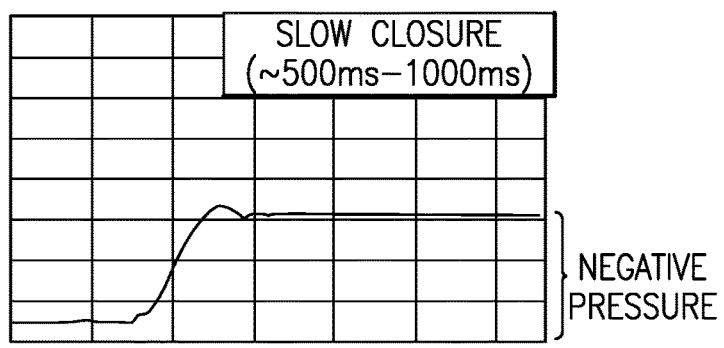
FIG. 10 is a graphical representation of pressure oscillations after a relatively slow close of a vacuum valve.

As a result of closing the vacuum valve 25, pressure oscillations (also known as water-hammer) emerge and can be present in the operable lumen for up to three seconds. FIG. 9, for example, is a waveform of pressure oscillation when the vacuum valve 25 closes over a period of between approximately 1 ms and approximately 5 ms. FIG. 10, in contrast, is a waveform of pressure oscillation when the vacuum valve 25 closes over a period of between approximately 500 ms and approximately 1000 ms. Oscillation requires a delay to be incorporated into data acquisition logic so that a false reading is not obtained. In conjunction, if a clot is detected in an idle routine and gets drawn against and partially or fully occluding the tip of the catheter 18, the pressure pulse associated with closing the vacuum valve quickly could dislodge the clot from the distal end 19 of the catheter 18. In such a theoretical case, the controller 108 would never transition into a clot removing routine because a negative pressure zone must be present between the occlusion (clot at the distal tip) and the closed vacuum valve. To decrease the time from when the clot is detected to when pulsed aspiration starts, and to mitigate any risk associated with dislodging the clot once it has been ingested into the distal end 19 of the catheter 18, a method of mitigating water-hammer is provided. To mitigate the water-hammer effect, the vacuum valve 25 is closed at a slower rate following a sinusoidal profile (when opening slowly, clot detection can be made by increasing the overall time-to-close). The pressure oscillations caused by the inertia of quickly interrupting a large volume of fluid moving at high velocity is diminished as shown in FIG. 10. Furthermore, opening the vacuum valve 25 to a smaller cross-sectional area than the rest of the aspiration tubing will also mitigate the water-hammer effect and will contribute to mitigating blood loss when in a state for running an idle routine (in other words, an idle state).

In some exemplary embodiments of an idle routine configuration, the controller 108 causes the vacuum valve 25 to be always partially open. The controller 108 maintains a low flow rate until a clot 2 is detected, an exemplary embodiment of low flow rate being approximately 10 cc/min to approximately 100 cc/min, between approximately 30 cc/min to approximately 50 cc/min, between approximately 20 cc/min to approximately 40 cc/min, in particular, between approximately 10 cc/min and 30 cc/min. Greater flow rates may be associated with vent valve 26 being at least partially open. The low flow rate is controlled by the controller 108. The controller 108 then adjusts the vacuum valve 25 to present a small orifice (a percentage of full open) and continues to maintain a constant flow rate depending on pressure measurements as determined from a look up table specific to the catheter, for example. In this process, clot detection can happen almost instantaneously. This behavior can be described as a "low flow" or "trickle flow" and falls under the herein-described category of an "idle routine."

Figure 8:
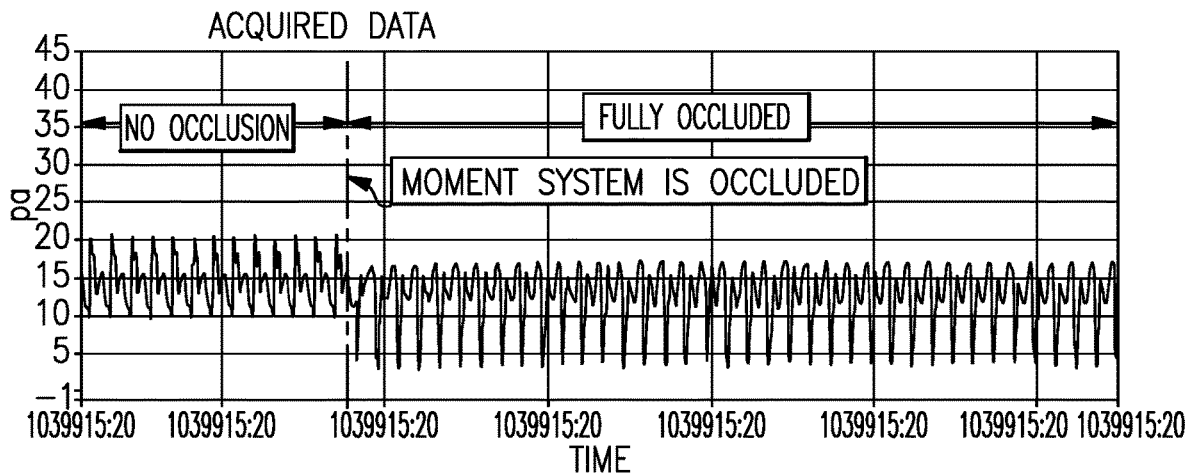
FIG. 8 is a graphical representation of a pressure waveform from a cyclic aspiration with a transition between open flow and a catheter occlusion taken with a pressure sensor located in the vent line.

In some exemplary embodiments, data acquisition by the controller 108 occurs constantly. The prescribed flow rate is associated with a pressure above a triggering threshold (the moment when the system transitions to the clot removing routine as shown in FIG. 8). Because there is a continual suction force, thrombus matter is consistently drawn to the distal tip 19 of the catheter 18. Once the thrombus 2 reaches the distal tip 19 of the catheter 18 and occludes or clogs the operable lumen, there is an almost immediate drop in pressure. At this point, the controller 108 is programmed to transition to the thrombus removal routine. Some exemplary embodiments of this process include:
 the controller 108 causing the vacuum source to draw blood from the patient at a low flow rate;
 visualizing small amounts of blood trickling into the collection canister 14;
 drawing clot matter to the distal tip 19 of the catheter 18 and occluding the opening; and
 detecting with the controller 108 that pressure is below the configured threshold and transitioning to a clot removing routine.

When transitioning to the clot removing routine, the controller 108 opens the vacuum valve 25 fully to apply a maximum suction force to the thrombus 2 that is occluding the distal end 19 of the catheter 18. To summarize this idle routine, almost no suction occurs at the distal tip 19 of the catheter 18 when in an idle state, thereby pulling the least amount of blood as possible and, when the thrombus is detected, the controller 108 applies a full suction force.

In some exemplary configurations, the aspiration thrombectomy systems 100 (and 100'?) transition back and forth between routines without ingesting any more fluid than is necessary and start pulsed aspiration almost instantaneously when an occlusion is detected distal of the sensor 102, 104, 106, 107 that is present in either the catheter (e.g., intermediately or at the distal tip) or the extension line or the manifold.

One issue with "pressure-based" thrombus detection methods is that fluid must be removed from the patient in order to detect a change in pressure. While in a clot-detecting state, according to some exemplary embodiments, the suction force used to remove blood from the patient can be mitigated without increasing vacuum pressure. This can be accomplished by drawing fluid 24 from the vent source 22 in conjunction with drawing blood from the patient. In such embodiments, suction force is not removing fluid primarily from the catheter 18 (and, thus, the patient), instead, fluid removal is shared with the vent source 22. A result of this is a higher vacuum pressure (less suction) at the distal tip 19, which means less blood is drawn from a patient when executing the idle routine. Fluid still moves through the system 100, therefore, an occlusion is still detectable through data received by the controller 108 through the sensors 102, 104 or by other measurement devices present elsewhere in the system.

In configurations of the aspiration thrombectomy systems 100 or 100' where clot detection utilizes vent fluid 24, sensors located on the vacuum line and/or the vent line 23 can be used. In the case where an occlusion is present at the distal tip 19 of the catheter 18, flow is stopped in the catheter 18 and, thus, flow increases in the vent line 23. This increased flow in the vent line 23 causes a lower pressure to be sensed by sensor 104. This change is detectable and can be acted upon by the controller 108, for example, when the sensor 104 in the vent line 23 detects a decrease in pressure, this means that there is an occlusion at the catheter 19 (see, e.g., FIG. 8). In this situation, if pressure data at the vent line 23 falls below a predetermined threshold 130 (see, e.g., FIG. 17), the controller 108 starts the clot removing routine (e.g., pulsed aspiration). The controller 108 is programmed to determine if the aspiration thrombectomy system 100, 100' is not occluded based on pressure data from, for example, one or more of the sensors 102, 104, 106, 107. A pressure waveform in the occluded state and the not-occluded state are distinctly different and are detected by waveform analysis done by the controller 108.

It is possible for a condition to exist where the catheter 18 is experiencing open flow (measured by one or more of the sensors 102, 104, 106, 107) and cyclic aspiration is active but it is ineffective. In such a condition, there is no net flow moving through operable lumen and only vent fluid is being aspirated. This condition is referred to as a full vent idle aspiration. Even in the full vent idle aspiration condition, in some embodiments, the controller 108 is able to detect changes from this state, such as a partial or full occlusion at the distal end 19 and, when such a change is detected, the controller 108 changes the open/close timing of the cyclic aspiration on the fly to change from the condition to an effective cyclic aspiration that permits clot ingestion. For example, the timing of opening of the vacuum valve 25 can increase or decrease and/or the timing of opening of the vent valve 26 can increase or decrease.

Clogging Prevention

Catheter clogging herein refers to a situation where cyclic aspiration cannot clear an occlusion from the catheter lumen and requires manual intervention. Catheter clogging is a significant problem in current state of the art large clot aspiration. Because large volumes of thrombus matter are being removed during the procedure, especially in the peripheral vasculature, it is possible for the aspiration systems to become clogged. Some embodiments of the catheter systems can be configured specifically to mitigate the possibility of clogging.

In some exemplary embodiments of an aspiration thrombectomy system 100 with a pressure sensor only upstream of the vacuum valve 25, the controller 108 would determine that the catheter 18 was on a clot and continue with the clot removing cycle, or routine, even though the system was clogged and ineffective. By monitoring pressure in the vent line 23 of some exemplary embodiments herein, useful additional information about the state of the system 100 can be gained. A pressure wave in the vent line during pulsatile clot removal is distinctly different than the pressure wave in a clogged system 100, as is shown in FIG. 8. This figure illustrates a waveform where, to the left of the vertical dash-dotted line, a pressure transducer located in the vent source 110 proximal to the vent valve 26 measures no occlusion. At the moment when the system 100 is occluded, the waveform changes significantly. Analysis of this vent line waveform by the controller 108 is used to initiate a clog-clearing routine or, at a minimum, to warn the user that the aspiration thrombectomy system 100 is clogged and needs to be cleared, for example, manually by the surgeon.

The catheter and aspiration tubing set can be configured to mitigate a clogged state as well. In some exemplary embodiments of the aspiration thrombectomy systems 100, the catheter and aspiration tubing set can be configured so that there are no decreases in diameter from the catheter tip to the aspiration collection canister. Smooth transitions within and between the tubing and fittings ensure that no constrictions exist to block the passage of clot material. Alternatively and/or additionally, the diameter of the operable lumen can increase from distal to proximal to the collection canister. Furthermore, the aspiration thrombectomy systems 100 can be configured so that the connectors and fittings (Luer, etc.) connect without interruptions that create gaps and steps on which clot material could get caught. Clots are gelatinous structures that are compressible. When the clot 2 is pulled into the tip of the catheter 18, it is compressed slightly. The clot 2 tries to expand but is constrained by the catheter interior diameter. Self-expansion increases friction of the clot 2 upon the interior surface of the catheter 18. By necking down the distal tip 19 of the catheter 18 slightly such that its internal diameter is slightly less than (approximately 5% to approximately 25%) the internal diameter of at least the next lumen portion of the catheter 18 (or less than the remainder of the catheter lumen), the clot 2 that enters the tip will fit less snugly in the body of the catheter 18, thus reducing friction and the possibility of clogging. The internal diameter of the catheter 18 can be treated with friction modifying coatings (for example, hydrophilic or hyper-hydrophobic) to reduce the possibility of clogging. Hydrophilic coatings produce a very slick surface and decrease the friction of the clot against the internal surface of the catheter. A hyper-hydrophobic coating can be used as well to prevent the clot from wetting and sticking to the internal surface of the catheter. Such a coating has a further advantage of reducing the friction of fluid flow and, thus, enhancing the pulsatile action of pulsed aspiration. In some exemplary embodiments, a surface modification to the inner diameter of the catheter 18, such as a pebbly surface or longitudinal rails, helps to reduce the wetting and friction of clot material as it passes through the lumen.

To combat clogging of thrombus material in the catheter 18, the secondary vent source 110 can have a distal end fluidically connected adjacent the distal end 19 of the catheter 18 to form a flushing subassembly 118 of the aspiration thrombectomy system 100 shown in FIG. 4B. This flushing subassembly 118 does not connect to the hub of the catheter 18 as shown in FIG. 4A, but, rather, extends the vent line approximately to the distal tip 19 of the catheter 18. Introducing vent fluid 24 at the distal end 19 accomplishes two goals: one being to completely flush the system 100 without having to remove too much blood and the other being to prolong pulsatile aspiration effectiveness. During pulsatile aspiration, this third actuator/valve 114 can be open all the time or opened intermittently or periodically.

Unclogging herein refers to a situation where cyclic aspiration cannot clear an occlusion and requires manual intervention. This condition is referred to herein as a "clog" and the appropriate state the system 100 or 100' enters to clear the occlusion is referred to herein as "clog clearing." A purpose of the "clog clearing" routine carried out by the controller 108 is to introduce positive pressure into the lumen of the catheter 18 until the static friction force between lumen's inner wall and the clot 2 is overcome. Once the static friction force is overcome (e.g., validated through pressure sensing) the cyclic aspiration routine resumes. Some exemplary embodiments of logic for carrying out the clog clearing routine is set forth in Table 1 below.

TABLE 1

| Situation | State |
| --- | --- |
| Catheter in Open Flow | Idle State Active |
| Catheter Tip Contacts Clot | Cyclic Aspiration |

TABLE 1-continued

| Situation | State |
| --- | --- |
| Aspiration Insufficient to Clear Occlusion, Heavy Clot Burden/ Hard Clot Clogs Lumen | (e.g., ROAR) Begins Unclogging Routine Begins |
| Lumen Cleared of Clog | Cyclic Aspiration Begins |
| Catheter in Open Flow | Idle State Active |

Clogging can occur from ingesting large amounts of clot, regardless of hardness. As the volume of clot material increases, the force required to remove clot increases proportionally. In a case where clogging occurs in a system utilizing standard/static aspiration, the friction force between lumen inner wall and clot are greater than that of the suction force applied by the vacuum pump.

Figure 27:
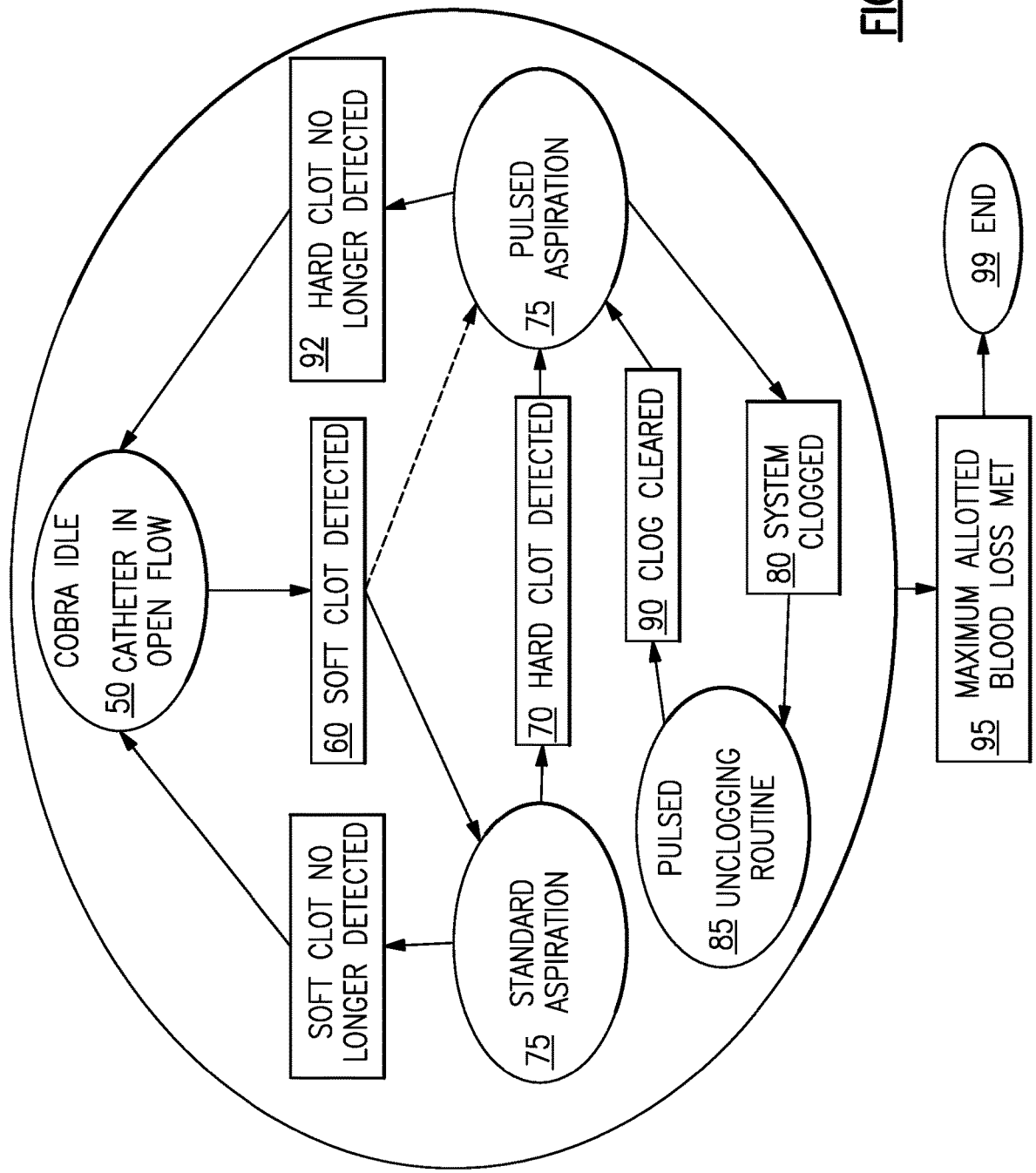
FIG. 27 is a diagram of an exemplary embodiment of a state machine for any of the herein described aspiration thrombectomy systems with pressure sensing capabilities.

When aspirating a soft clot, both non-cyclic (e.g., standard) aspiration and cyclic aspiration (e.g., pulsed) are effective. The example state machine diagram in FIG. 27 shows standard aspiration after a soft clot is detected in State 60; another possibility is to start cyclic aspiration in State 75 depicted as a dashed arrow. Due to the nature of cyclic aspiration, the clot 2 is ingested in "bites," as a result, cyclic aspiration consumes more liquid (i.e., blood) when aspirating a soft clot than non-cyclic aspiration. To optimize blood loss saving, the herein described aspiration thrombectomy systems 100 (the COBRA™ System) or 100' utilize non-cyclic aspiration in conjunction with cyclic aspiration (including ROAR) and idle routines. The idle routines are used when the catheter 18 is not in contact with material of a clot 2, irrespective of whether a soft clot is subsequently detected 60, or whether a hard clot is subsequently detected 70. The purpose of the idle routines is to operate in a state where clots can be detected while removing as little blood as possible. During the idle routines, a practitioner may search to re-engage the clot by maneuvering a distal end of the catheter of the thrombectomy system to re-engage the clot, or re-engage the clot at a different position by repositioning the distal end of the catheter proximally and distally and/or rotating the distal end of the catheter to engage a different portion of the clot.

In accordance with one embodiment of an idle routine, during an idle state, the controller 108 causes the vacuum valve 25 (FIGS. 4A, 4B, 4C, and 5) to be always at least partially open, such that during the idle state, fluid is still drawn into the collection canister 14 via the vacuum valve 25, but at a minimal flow rate, or "low flow" or "trickle flow" as noted previously. This low flow rate may be maintained until a clot 2 is detected, and may be approximately 10 cc/min to approximately 100 cc/min, between approximately 30 cc/min to approximately 50 cc/min, between approximately 20 cc/min to approximately 40 cc/min, in particular, between approximately 10 cc/min and 30 cc/min. As previously described, in some embodiments, the idle routine removes less than 10 cc/min and does so with the actuators of the vacuum valve 25 open partially (not fully). In these embodiments, the vent valve 26 or the vent valves 26, 114 may be at least partially, or fully open. By drawing fluid additionally from the vent source 22, suction force is not removing fluid (e.g., blood) primarily from the catheter 18 (and, thus, the patient); instead, fluid removal is at least partially or primarily shared with the vent source 22. A result of this is a higher vacuum pressure (less suction) at the distal tip 19, which means less blood is drawn from a patient when executing the idle routine. Fluid still moves through the system 100, 100', therefore, an occlusion is still detectable through data received by the controller 108 through the sensors 102, 104 or by other measurement devices present elsewhere in the system.

In terms of the degree to which the vacuum valve 25 is open during the exemplary idle state, the vacuum valve 25 is opened to an intermediate point, which limits the flow rate, for example, to 5% open, 10% open, 12.5% open, 15% open, 16.667% open, 20% open, 25% open, 33.33%, 37.5% open, 50% open, 62.5% open, 66.66% open, 75% open, 87.5% open, and so on up to 90% open. During the idle routine, the controller 108 thus adjusts the vacuum valve 25 to present a small orifice (a percentage of full open) and may continue to maintain a constant flow rate depending on pressure measurements as determined from a look up table specific to the catheter, for example. In this process, clot detection can happen almost instantaneously. To summarize this idle routine, almost no suction occurs at the distal tip 19 of the catheter 18 when in an idle state, thereby pulling the least amount of blood as possible and, when the thrombus is detected, the controller 108 applies either a full suction force (e.g., standard aspiration 65) or pulsed suction force (e.g., pulsed aspiration 75).

Some exemplary embodiments have the controller 108 transition between four (4) system states depending on the situation and these processes are set forth in the state machine example of FIG. 27 (other state machine examples are also possible). Procedure circumstances include the catheter in open flow (State 50), the catheter is occluded with a soft clot (State 60), the catheter is occluded with a hard clot or a heavy clot burden (State 70), and the catheter is clogged with hard clot or heavy clot burden (State 80). When a soft clot is detected, non-cyclic aspiration (e.g., standard aspiration) is used so that the soft clot is aspirated with minimal blood loss. When a soft clot is no longer detected and an occlusion must be cleared (State 80), cyclic or pulsed aspiration (e.g., ROAR) is used so that a clot 2 that would normally clog non-cyclic aspiration can be cleared and ingested. And, when pulsed aspiration (e.g., ROAR) is unable to ingest the material of the clot 2 (State 80), a cyclic aspiration clog clearing routine (State 85) is used to overcome any friction preventing the cyclic aspiration from ingesting the clot 2. Some exemplary embodiments for the unclogging routine include:

- detecting an occlusion while in idle (State 60);
- transitioning to static aspiration when occlusion is detected (State 65);
- if static aspiration cannot remove clot because a hard clot is detected (State 70), start pulsed aspiration (State 75);
- if pulsed aspiration cannot ingest clot, the system is clogged (State 80) and the controller enters a clog-clearing routine (pulsed unclogging in State 85);
- once clog is cleared (State 90), pulsed aspiration (State 75) until occlusion is no longer present (State 92); and
- once the maximum allotted blood loss is met (State 95), stop and notify the user (State 99).

In the event of the aspiration thrombectomy systems 100 detecting a clog, the segment of tubing from the catheter 18 to the collection canister 14 can be flushed by closing the vent valve 26, opening the vacuum valve 25, and opening the second vent valve 114 as a flushing valve. This configuration allows vent fluid 24 to flow through and clear any stuck clot that is present between the catheter hub and the collection canister 14 (see FIG. 4A), proximal of the catheter hub and the collection canister 14 (FIG. 4C), or between the distal tip 19 of the catheter 18 and the collection canister 14 (see FIG. 4B). For the aspiration thrombectomy system 100', in the event of clog detection, the segment of tubing from the junction 112 to the collection canister 14 can be flushed by opening the vacuum valve 25 and opening the vent valve 26. As shown diagrammatically in FIG. 4A and FIG. 4C, a pump 111 may be added to the second vent valve 114 and/or to the tube 119 leading to the distal end 19 of the catheter 18 to increase flow of the injected flushing fluid 24. A flush cycle such as this can last for a predetermined period (between approximately 10 ms and 5000 ms, between approximately 100 ms and approximately 4000 ms, between approximately 300 ms and approximately 3000 ms, between approximately 400 ms and approximately 2000 ms, between approximately 450 ms and approximately 1000 ms, in particular, 500 ms) and then, one or more of the herein-described clot removal cycles would resume. If the clog remains, the flushing cycle is repeated a prescribed number of times and, thereafter, the problem is elevated to a next level of clog clearing, for example, for a more energetic clog clearing cycle or a manual clog removal by the surgeon or surgical staff. While the exemplary embodiment of FIG. 4A places the flushing tube 119 at the hub of the catheter 18 and the exemplary embodiment of FIG. 4B places the flushing tube 119 at the distal end 19 of the catheter 18, it is understood that the clog-clearing vent fluid 24 can be injected at any point along the length of the operable lumen from the distal tip 19 of the catheter 18 to the manifold 16 as illustrated in FIG. 4C.

The separate second lumen of the flushing line 119 added to the catheter 18 of FIG. 4B (e.g., parallel to the longitudinal extent of the lumen of the catheter 18) can have one or more non-illustrated passages connected to the internal volume of the lumen of the catheter 18. The flushing fluid 24 can be injected from the flushing tube 119 so that a clog anywhere along the length of the catheter 18 and/or the extension line 17 can be cleared. To maintain a low profile of the catheter 18, in some embodiments, the lumen of the flushing tube 119 can be expandable so that, in normal use of the catheter 18, it is flat and not obstructive to the lumen of the catheter 18 and, when flushing fluid 24 is injected therein, the lumen of the flushing tube 119 expands to allow the flow of the flushing fluid. An exemplary material for the flushing tube 119 is a flexible thermoplastic such as a 62 A durometer Urethane derivative (Neusoft, Avient Corp.). In some exemplary embodiments, a clog removal routine or cycle including aggressive on-off valve timing is initiated to free a stuck clot from within the catheter 18. The timing of valve pulsing is configured to shuttle the stuck clot forward and back one or more times before opening the vacuum valve 25 and aspirating the now un-stuck clot into the collection canister 14. Shuttling need not be over a long distance; movement can be between approximately 0.1 mm and approximately 100 mm, more specifically, between approximately 1 mm and approximately 50 mm, in particular, between approximately 5 mm and approximately 15 mm. Exemplary embodiments of the clog-clearing routine includes a triage of pulsing/aspiration cycles each different than the previous and all designed to clear the clog.

In some exemplary embodiments of the aspiration thrombectomy systems 100, once a clog is detected, the controller 108 changes to a clog clearing state. The clog clearing algorithm goes through a series of cycles, the controller 108 checking for the clog after each cycle, until the clog is cleared. The first of these series of cycles for example, can be slightly more energetic (e.g., higher pressure delta, larger fluid displacement, etc.) than the pulse cycle that was running when the clog occurred. This change is achieved by adjusting valve on/off durations, relative on/off times, and on/off frequency. After a period of this cycle (for example, between approximately 100 ms and 5000 ms, between approximately 500 ms and 3000 ms, between approximately 750 ms and 1000 ms), the aspiration thrombectomy system 100 is checked for a clog. If the clog is cleared, the controller 108 returns to its normal sequence of operations. If the clog is still detected, a slightly more energetic cycle than the previous is entered for a given period (e.g., between approximately 10 ms and 10,000 ms, between approximately 25 ms and 9,000 ms, between approximately 40 ms and 8,000 ms, between approximately 60 ms and 9,000 ms, between approximately 70 ms and 8,000 ms, between approximately 80 ms and 7,000 ms, between approximately 90 ms and 6,000 ms, in particular, between approximately 100 ms and approximately 5,000 ms). Again, by adjusting the valve timing and frequency, more energetic pulses are created. This process continues until the most energetic cycle fails, or until the clot is cleared. If the most energetic cycle fails, the operator is alerted and the catheter 18 can be removed from the patient to be cleared.

When the force of suction or of cyclic aspiration is not enough to clear a clog, a positive pressure pulse can be added to the aspiration thrombectomy system 100 or 100' to get the material causing the clog to move. The static friction of the clog is greater than its kinetic friction. By breaking the static friction and getting the material causing the clog to move, it is more likely to be ingested through the system 100 and into the collection canister 14. The following cycle describes some exemplary methods of introducing a positive pulse to clear a clogged state:

close the vacuum and vent valves;
introduce a positive pressure pulse to the operable lumen;
wait a period of time (e.g., between approximately 1 ms and 5,000 ms, between approximately 2 ms and 4,000 ms, between approximately 4 ms and 2,000 ms, between approximately 6 ms and 1,000 ms, between approximately 8 ms and 500 ms, in particular, between approximately 10 ms to 100 ms);
open the vacuum valve or start pulsed aspiration for a period of time (e.g., approximately 10 ms and 10,000 ms, between approximately 25 ms and 9,000 ms, between approximately 40 ms and 8,000 ms, between approximately 60 ms and 9,000 ms, between approximately 70 ms and 8,000 ms, between approximately 80 ms and 7,000 ms, between approximately 90 ms and 6,000 ms, in particular, between approximately 100 ms and approximately 5,000 ms);
check for the clog; and
repeat until the clog is cleared or until a pre-programmed time-out is met.

Figure 18:
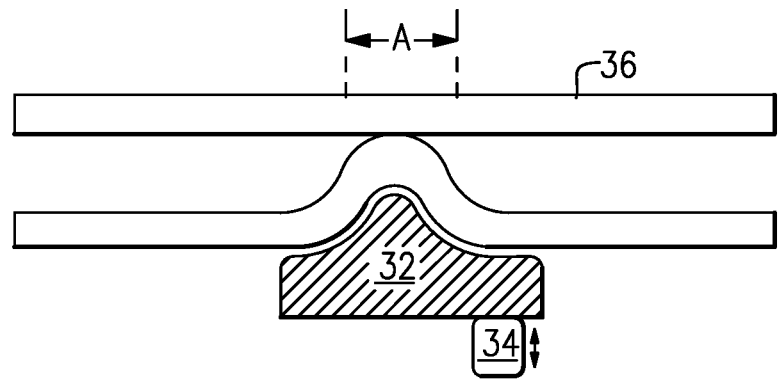
FIG. 18 is a fragmentary, enlarged, cross-sectional view of an exemplary embodiment of a blunt-knife pinch valve for the configurations of any of the aspiration thrombectomy systems of FIGS. 1 to 5.
Figure 19:
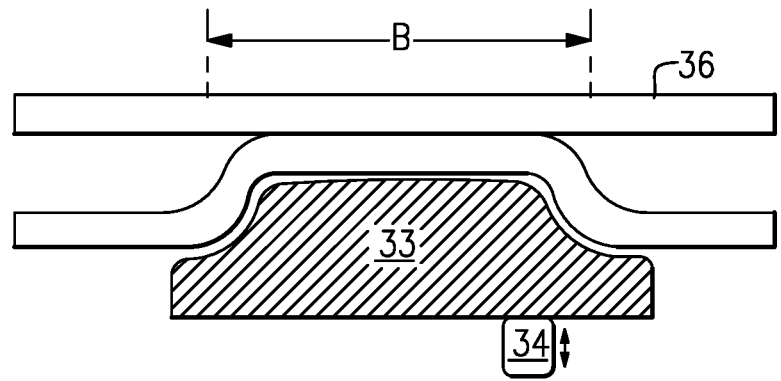
FIG. 19 is a fragmentary, enlarged, cross-sectional view of an exemplary embodiment of a plateau pinch valve for the configurations of any of the aspiration thrombectomy systems of FIGS. 1 to 5.

The positive pressure pulse can be created by a piston (e.g., syringe) connected to an actuator (solenoid, motor, linear actuator), a peristaltic pump, a centrifugal pump, etc. The positive pressure pulse can also be manually actuated by an operator (for example, with a syringe, a squeeze bladder, a squeeze bar, etc.). In some exemplary embodiments, the positive pressure pulse is created by an end effector 32, 33 connected to an actuator 34, which are shown diagrammatically in FIGS. 18 and 19. FIG. 18 depicts an end effector 32 having a "blunt knife" edge with a relatively small area of the tubing 36 used for the positive pressure pulse (defining a longitudinal pinch length A of the end effector 32 along the tubing 36) and FIG. 19 depicts an end effector 32 having a "plateau" edge with a relatively large area of the tubing 36 used for the positive pressure pulse (defining a longitudinal pinch length B of the end effector 33 along the tubing 36).

When actuated, the end effector 32, 33 contacts a length of vent-fluid-filled flexible tubing 36 fluidically connected to the operable lumen. The shape of the end effector 32, 33, the cross-sectional area of the tubing 36, and the distance of travel of the actuator 34 control the volume of fluid and, thus, the pressure delivered to the operable lumen. This pulse could eject the clot 2 from the catheter 18 if the system 100 or 100' did not respond by applying negative pressure to the operable lumen a short period of time (e.g., between approximately 10 ms and approximately 1000 ms or between approximately 10 ms and approximately 500 ms or between approximately 10 ms and approximately 100 ms) after introduction of the pressure pulse. The negative pressure, either static vacuum or cyclic aspiration, will reverse the direction of the material causing the clog and continue to move it toward the collection canister 14. Some exemplary embodiments of the COBRA™ systems 100 use pinch valves for the vacuum and vent valves 25, 26 to control the vent and vacuum sources 22, 12, examples of which are shown in FIGS. 18 and 19. A length of flexible tubing 36 is pinched closed by the inverted V-shaped end effector 32 in FIG. 18, for example. The V-shaped end effector 32 has a range of between approximately 0.01 mL and 0.05 mL. The end effectors 32 is configured to displace a very small amount (e.g., between approximately 0.1 mL and approximately 0.2 mL, in particular, less than 0.2 ml) of fluid when each of the valves 25, 26 are closed. In some embodiments, a larger end effector range intended for displacing a significant amount of fluid is between approximately 0.1 mL to 0.2 mL. An end effector 32, 33 that contacts a longer length of this tubing (e.g., between approximately 1 mm and approximately 100 mm, between approximately 5 mm and approximately 20 mm, in particular, between approximately 1 mm and approximately 10 mm) could displace the volume of fluid needed to raise the pressure in the operable lumen and cause the clot 2 to move. The aspiration thrombectomy systems 100 monitor this pressure and limit it by stopping the actuator 34, reversing the actuator 34, and/or opening the vacuum valve 25. This limiting prevents the system 100 from over-pressurizing and becoming damaged. Real time pressure monitoring can be used to determine when the clot 2 is moving. The pressure rises until the clot 2 begins to move. When the clot 2 moves, the pressure either plateaus, drops, or the slope of the rise is decreased. When movement is detected, the controller 108 opens the vacuum valve 25 or starts the cyclic aspiration cycle.

Clots vary in their firmness. An acute clot has a consistency like jelly and is relatively easy to aspirate; in contrast, a chronic clot has a consistency as firm as warm gummy candy and is, therefore, much more difficult to aspirate. Pulsed aspiration is most effective when the fluid column within the catheter is in motion. It is the change of momentum of the fluid column during pulsed aspiration that causes pressure waves and, thus, the energy needed to dislodge and break up the clot. When the tip of the catheter is in contact with a clot that is firm enough that it does not fracture, motion of the fluid column begins to stall and the energy of the pulses are diminished. At a full stall, the energy imparted to the clot is comparable to static aspiration. To keep the fluid column moving, and thus energize the pulses, the vent fluid system 22, 24, 26, 114, 116, 118, 119 is used. The controller 108 monitors pressure in the vacuum line while the catheter 18 is against a clot 2. The controller 108 detects that the pulses are beginning to diminish. At a predefined stall threshold (e.g., between approximately 5% and 95%, between approximately 20% and 95%, more specifically, between approximately 50% and 80% in particular, approximately 75%) of the non-stalled amplitude, the algorithm being executed by the controller 108 changes timing of the valves 25 and/or 26 so that more vent fluid 24 is allowed to flow for each pulse. Extension of the time period in which vent fluid flows restores energy of the aspiration pulses. The controller 108 then changes the aspiration process back to a clot removal routine. This method is repeated as needed to maintain energy of the pulses.

In general, the catheters used to treat DVT range in size from about 6 French (3 mm) to about 12 French (6 mm). The internal diameters of the vessels in which DVT is present range from about 5 mm to about 20 mm. Such a large difference in diameters between the catheter and the vessel makes it difficult to remove the entirety of a DVT clot. As the catheter 18 is advanced through the clot 2, the tip of the catheter 18 creates a tunnel at the clot's point of least resistance. When the catheter 18 is retracted and re-advanced, the tip tends to follow the previous path. To combat this inefficient duplication, the catheters 18 are formed with an angled tip, so that when rotated by the surgeon, the tip sweeps an arc in the vessel. This helps the surgeon in relocating the tip of the catheter 18 to create a new, different clot channel. By rotating the catheter incrementally with each pass of the thrombus 2, multiple channels can be created to remove as much of the clot as possible. Positioning the catheter tip to change a channel path is aided by the surgeon using fluoroscopy during the procedure. In some exemplary embodiments, the catheter 18 is provided with markings on the shaft of the catheter 18 that the surgeon uses to, quickly and accurately, rotate the catheter 18 to a new position before extending through the clot 2. These markings may take various forms, for example, numbers, percentages, colors, etc., to intuitively indicate the next position to a surgeon. In some exemplary embodiments illustrated diagrammatically in FIG. 4A, the indexing and advancing procedure is mechanized with at least one motor 120 (also referred to as an advancement/indexing drive unit) that rotates and extends the catheter 18. The motor 120 is actuated by the controller 108 and, therefore, can be automated. The motor 120 can be, for example, two separate motors, each performing one function, or one motor performing both rotation and extension/retraction. Thus, the aspiration thrombectomy systems 100 become a clot-sucking robot, taking feedback from the controller 108 to know when to advance and retract. Feedback is provided by the controller 108 analyzing data from the sensors 102, 104, 106, 107. Along with these features, the robot can be equipped with load cells that can determine insertion, retraction, and rotational forces. In some exemplary embodiments, a force sensor 122 is added to the mechanized pusher (of the pusher/rotator) to control an amount of forward force applied while advancing the catheter 18. In a case where the sensor(s) 122 detects force greater than a pre-determined value, the controller 108 causes the motor 120 to retract the catheter 18 slightly, to index the catheter 18 slightly, and to re-advance the catheter 18. Position sensors 122 on the advancement/indexing drive unit 120 provide position feedback to the control algorithm carried out by the controller 108. The pressure and flow sensing capabilities of the controller 108 supply further feedback to the algorithm to respond appropriately when the catheter 18 is on a clot or when the catheter 18 is in open flow.

While a thrombectomy is taking place, the algorithms of the controller 108 are acting on real time data, such as static pressure and dynamic pressure waveform analysis, from the various sensors placed in the operable lumen. These data inform the controller 108 of the state of the procedure, such as the clot 2 is being removed effectively, the catheter 18 is clogged, the catheter 18 is in open flow, etc. In some embodiments of the aspiration thrombectomy systems 100 or 100', these data and catheter states can be captured and uploaded to a central database within the controller 108, associated with the controller 108, or resident on the internet cloud with communication by the controller 108 to/from the cloud occurring by direct or wireless data transfer. The database is analyzed for statistics, such as procedure time, how many times the catheter clogged, the time spent removing a clot, the amount of blood loss, the time spent removing clogs, etc. These data have research as well as commercial value. The data is used to alter and enhance the algorithms carried out by the controller 108. Desired changes are uploaded from the database to the controller 108 through periodic updates. The results of these updates are monitored to see if effectiveness improved or not. This feedback loop or machine learning (e.g., artificial intelligence) eventually refines and optimizes the algorithms utilized by the controller 108. Procedural techniques vary between surgeons and institutions. Data sets from each institution, or each surgeon, are analyzed separately and custom tailored algorithms are uploaded back to the institution/surgeon.

Clot samples obtained from open surgery are used in the laboratory to record pressure waveforms during in vitro pulsed aspiration. Clots of differing firmness are used to generate a spectrum of waveforms representing soft to hard clots. These waveforms are pre-loaded into the controller 108 and compared to real time data during a procedure to determine which algorithm would be most effective.

As mentioned herein, the aspiration thrombectomy systems 100 or 100' can be used with different catheters 18. For customized operation with each catheter type, an RFID chip is housed at the hub of the catheter 18 and transmits data to the controller 108 (see, e.g., Deville 683). Parameters of the catheter 18, such as physical characteristics (e.g., diameter and length), cycle timing variables, or desired performance characteristics, for example, are used by the controller 108 to select the proper algorithm to use during operation.

Unclogging Mechanically

In a static aspiration procedure a secondary mechanical device can be introduced into the catheter lumen to help clear a clog. The devices can be a guidewire having a small ovoid bead attached near its distal tip. The ovoid is shaped to just clear the internal diameter of the catheter. By moving the ovoid in and out of the tip, or completely through the lumen of the catheter, a clot can be cleared from the lumen. With the wire in the operable lumen, the wire occludes the lumen partially and increases the likelihood of a clot becoming entangled with the wire. If the device fails in removing the clot, the catheter/wire system must be removed entirely from the patient and flushed.

Figure 20:
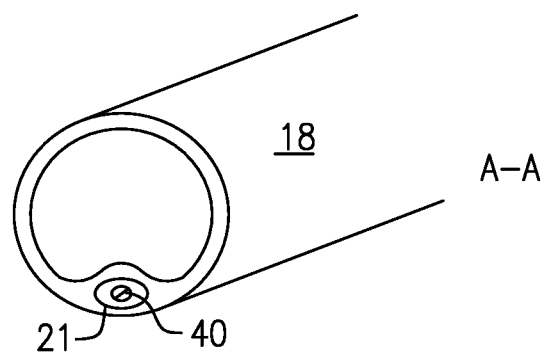
FIG. 20 is an enlarged, cross-sectional perspective view of an exemplary embodiment of an aspiration catheter (across section line A-A in FIG. 21) having a secondary lumen in which is a micro wire.

In an extreme case where large amounts of clot have occluded the aspiration thrombectomy system 100 or 100' and the clot clearing routines/aspirations (e.g., cyclic or pulsed aspiration) have been exhausted, methods of mechanically clearing the catheter without having to remove it from patient and without having to introduce a guidewire into the operable lumen, are provided. In some exemplary embodiments, shown in FIGS. 20 and 21, the aspiration catheter 18 contains an extra (secondary) lumen 21 in which is pre-installed a micro wire 40. In some exemplary embodiments, the micro wire 40 is made from a super-elastic material such as Nitinol. The distal tip 42 of the wire 40 is pre-shaped as shown in the examples of FIGS. 21 to 26. The wire 40 can be retracted into the extra lumen 21 so that the wire 40 does not impede the flow of the clot 2 in the operable lumen. When needed to help clear a clot 2 from the operable lumen, the wire 40 is advanced from the secondary lumen 21 transforming to its pre-set shape. The wire 40 is then manipulated by the surgeon longitudinally and/or rotationally to clear the clot 2. When not needed, the wire 40 is retracted into the secondary lumen 21. A first stop 44 is provided on the wire 40 and a second stop 46 (or set of stops) is/are provided adjacent the secondary lumen 21 to prevent the wire 40 from being advanced beyond the exit of the distal tip 19 of the catheter 18. The two-part stop subassembly prevents the distal tip 42 of the wire 40 from entering the lumen of the vessel and causing trauma. In some exemplary embodiments that are not illustrated, a micro wire is anchored at a proximal end of the catheter 18 and runs along the inside of the catheter until just before the distal end. Pressure oscillations associated with pulsed aspiration, for example, causes the micro wire 40 to vibrate, macerating any clot 2 that is occluding the catheter 18.

Figure 21:
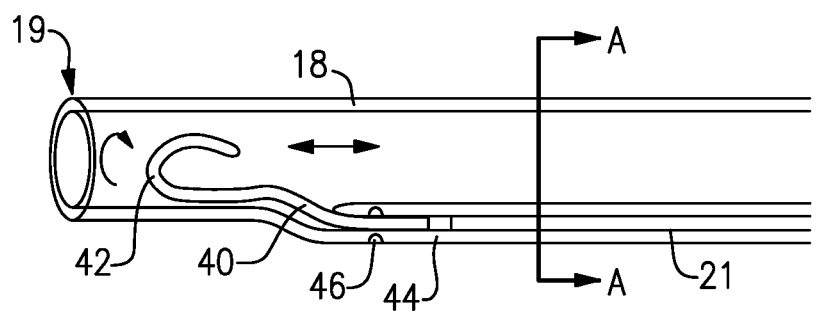
FIG. 21 is an enlarged, longitudinally cross-sectional view of a distal portion of the aspiration catheter of FIG. 20 with the micro wire in the secondary lumen having a hooked distal end.
Figure 22:
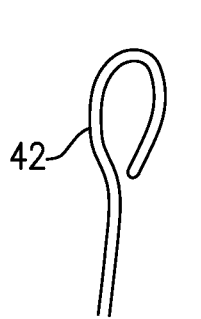
FIG. 22 is a fragmentary, enlarged elevational view of the micro wire of FIG. 20 having a looped distal end.
Figure 23:
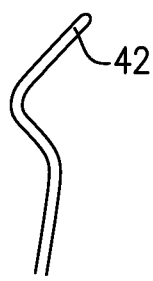
FIG. 23 is a fragmentary, enlarged elevational view of the micro wire of FIG. 20 having a bi-angled distal end.
Figure 24:
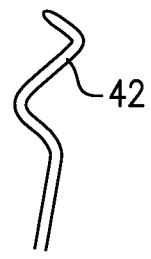
FIG. 24 is a fragmentary, enlarged elevational view of the micro wire of FIG. 20 having a Z-shaped distal end.
Figure 25:
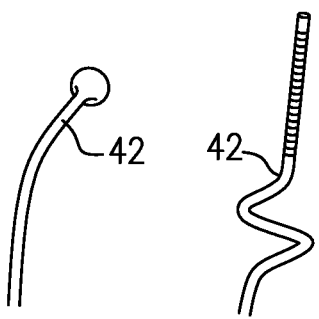
FIG. 25 is a fragmentary, enlarged elevational view of the micro wire of FIG. 20 having a curved distal portion with a ball-shaped distal end.
Figure 26:
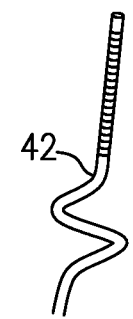
FIG. 26 is a fragmentary, enlarged elevational view of the micro wire of FIG. 20 having a Z-shaped distal portion proximal of the guidewire tip.

The micro wire 40 in FIG. 21 has a distal tip 42 having a hook shape. The distal tip or end 42 of the micro wire 40 can take other shapes, such as those distal tips 42 shown in FIG. 22 (loop shape), FIG. 23 (S-bend shape), FIG. 24 (Z-bend shape, FIG. 25, (curved and rounded tip), and FIG. 26 (Z-bend with textured end). These distal shapes substantially straighten when retracted in the secondary lumen and expand when advanced into lumen of the catheter 18.

Figure 28:
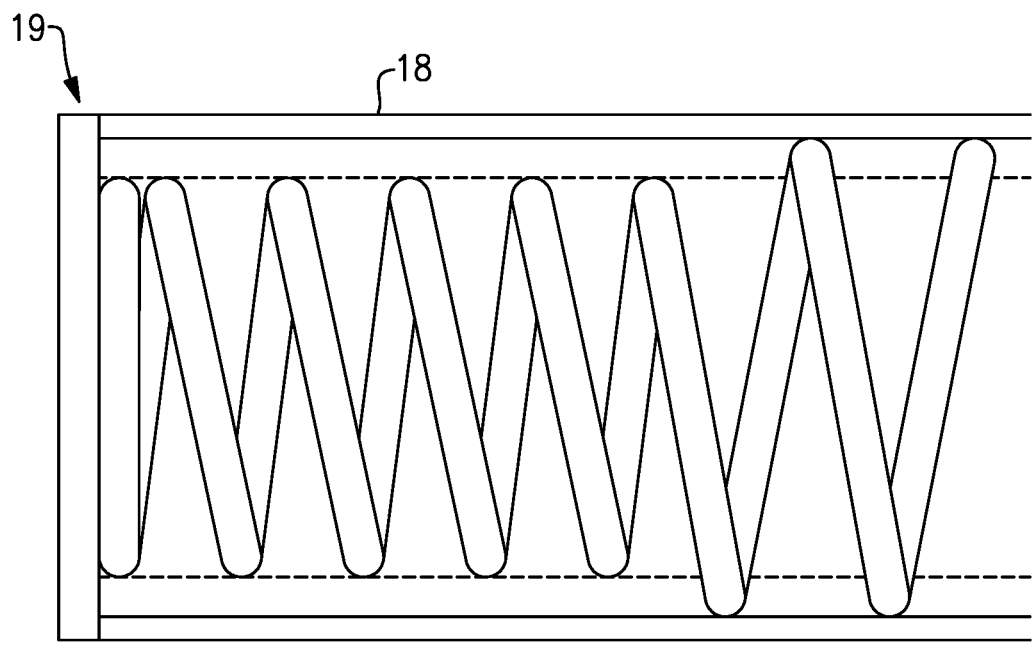
FIG. 28 is an enlarged, fragmentary, longitudinally cross-sectional view of a distal end of an exemplary embodiment of an aspiration catheter having a distal, oscillating maceration mechanism in an expanded state.
Figure 29:
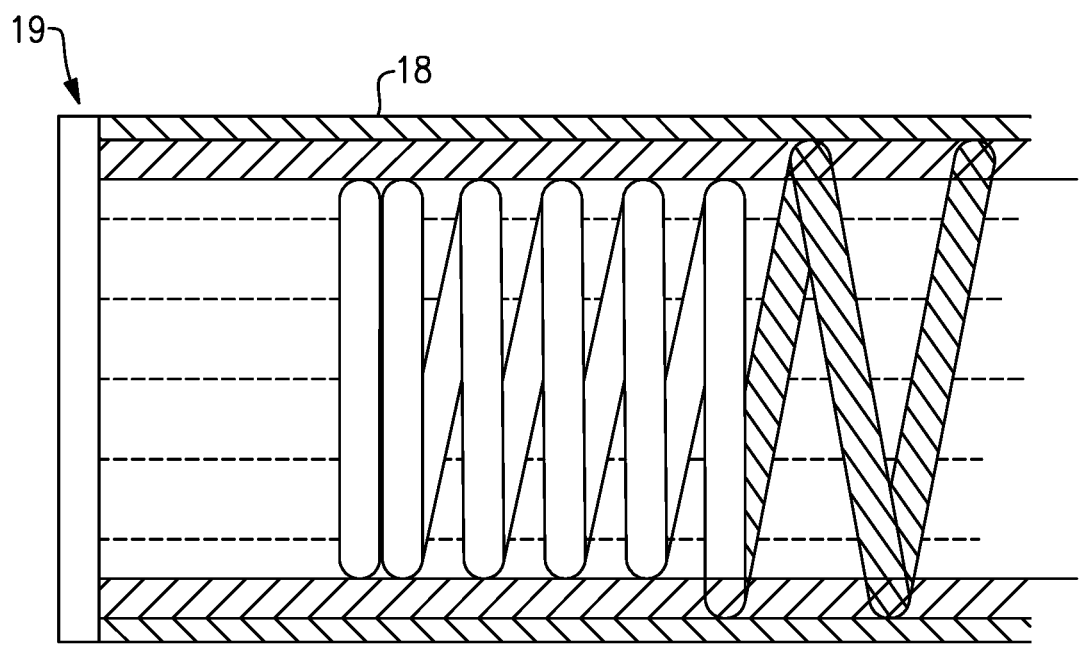
FIG. 29 is an enlarged, fragmentary, longitudinally cross-sectional view of the distal end of the aspiration catheter of FIG. 28 having the distal, oscillating maceration mechanism in an contracted state.

In some exemplary embodiments, an oscillating mechanism 11 is present at the distal tip 19 of the catheter 18. One exemplary embodiment of the oscillating mechanism 11 is a spring shown in FIGS. 28 and 29. Pressure oscillations associated with pulsatile aspiration, for example, ROAR aspiration, can cause the mechanism 11 to expand and contract or oscillate, macerating any clot material that is present at the distal tip 19. The macerating mechanism 11 uses energy provided by mechanics and/or hydrodynamics in the aspiration thrombectomy system 100 caused by the pulsatile aspiration action to fragment the clot at the distal end 19, mitigating the likelihood of clogging.

Interrogation Routine

In some exemplary embodiments of the aspiration thrombectomy systems 100, the controller 108 is programmed to conduct an interrogation routine to determine a quality of the fluid column. Quality is determined by analyzing propagating pressure waves. These pressure waves can be initiated by rapidly opening and closing the vacuum valve 25—referred to as "pinging" the system 100 or 100'. This behavior is similar to that of sonar, where a pulse is generated and the returning waveform is analyzed and compared to a known waveform. This waveform analysis may include FFT analysis and filtering. These pressure waves can be initiated through a variety of measures:

opening the vacuum valve 25 and closing it abruptly;
opening and closing the vent valve 26; and/or
opening and closing both the vent valve 26 and the vacuum valve 25.

Figure 30:
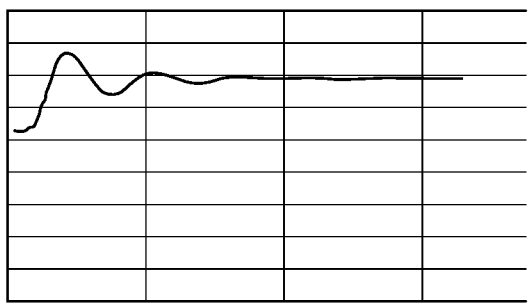
FIG. 30 is a graph of a waveform measured by the herein described aspiration thrombectomy systems where compressible matter is not present in a fluid column.
Figure 31:
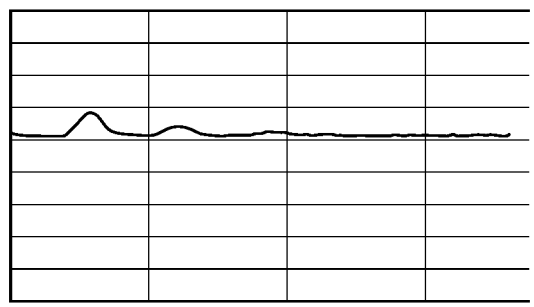
FIG. 31 is a graph of a waveform measured by the herein described aspiration thrombectomy systems where compressible matter is present in the fluid column.

The returning waveforms are analyzed to determine whether the aspiration thrombectomy system 100 or 100' has any compressible matter, such as air or a clot, within the fluid column in which the waveforms are propagating. In a state where there is no compressible matter in the fluid column, the propagating waves have a greater pressure delta and smaller period, as shown in FIG. 30. In a state where compressible matter is present in the fluid column, the propagating waves have a different pressure delta and a different period, an example of which is shown in FIG. 31. For optimal pulsatile performance, the aspiration thrombectomy systems 100 or 100' may be purged of air prior to starting the procedure. In some exemplary embodiments, the pinging routine can be used as a verification to the aspiration thrombectomy system 100 or 100' and to the user that the purging process was adequate. The pinging routine can be used periodically throughout the procedure to verify that the system 100 or 100' is performing optimally or within an acceptable range(s). In the case of an unacceptable reading, the controller 108 attempts to purge the system 100 or 100' by introducing supplementary vent fluid 24, for example. In the case of failing to restore adequate pulsatile performance, the controller 108 can alert the user of the problem.

Figure 32A:
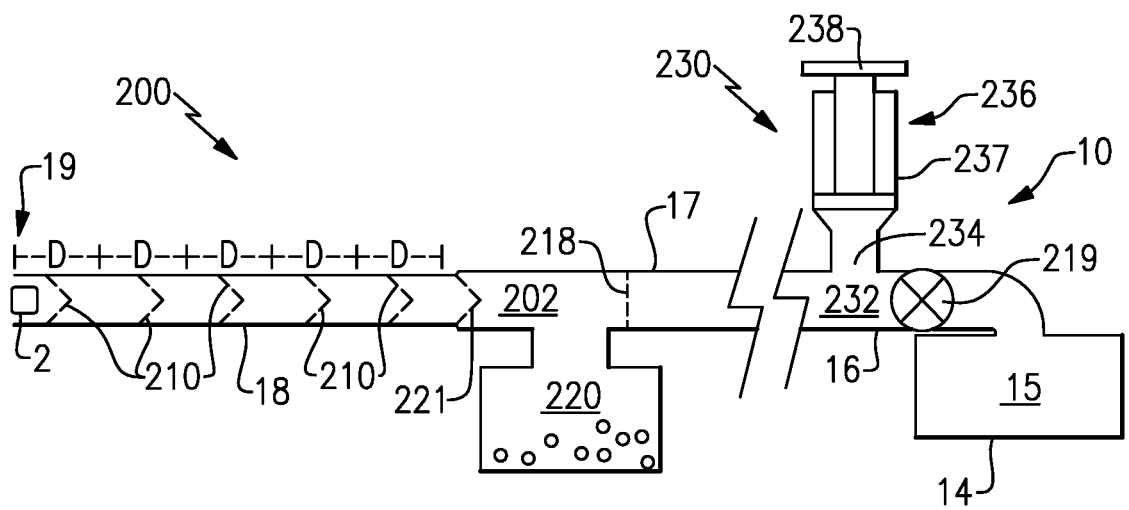
FIG. 32A is a fragmentary, longitudinally cross-sectional view of a further exemplary embodiment of an aspiration thrombectomy system having an aspiration control blood-loss mitigation assembly with a manual vacuum in an inserted or pushed-in position, with check valves in a closed state, and with a gravity-assisted thrombus collection.
Figure 32B:
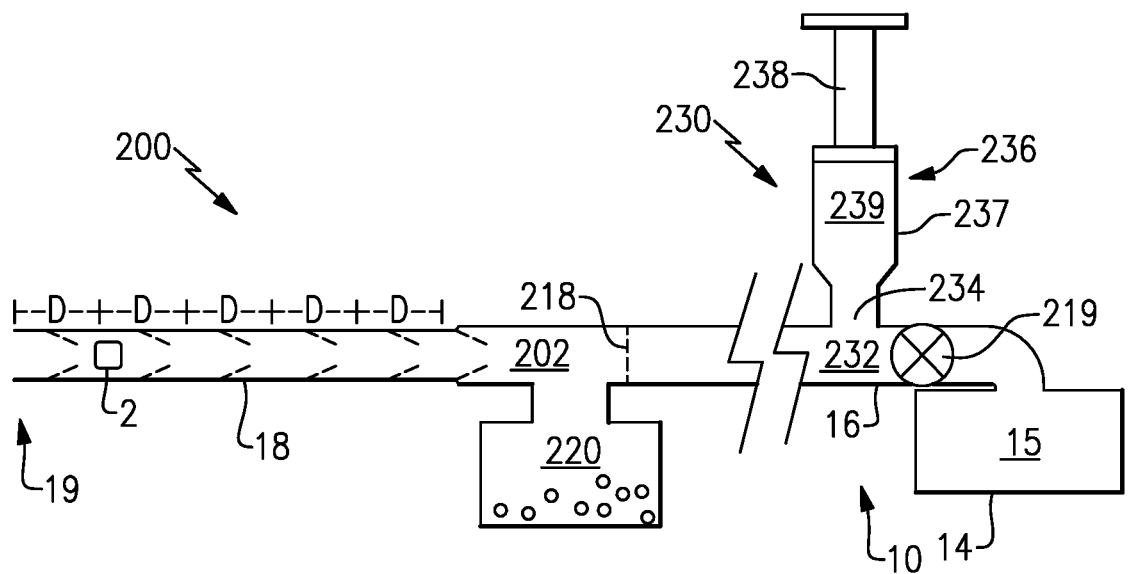
FIG. 32B is a fragmentary, longitudinally cross-sectional view of the aspiration thrombectomy system of FIG. 32A with the manual vacuum in an extended or pulled back position and with check valves in an open state.
Figure 33:
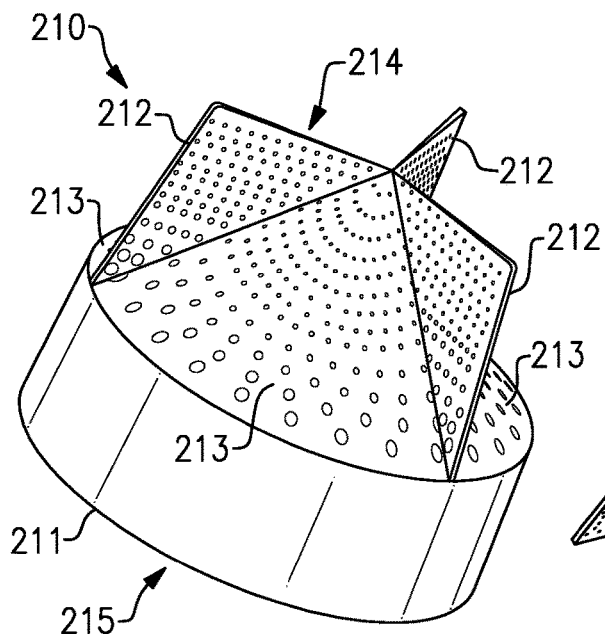
FIG. 33 is a perspective side view of an exemplary embodiment of a check valve for an aspiration thrombectomy system.
Figure 34:
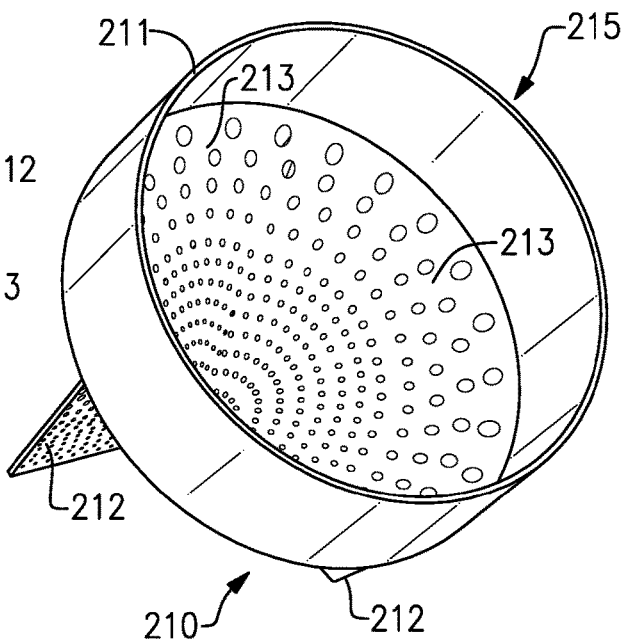
FIG. 34 is a perspective view of an upstream opening of the check valve of FIG. 33.

FIGS. 32A and 32B illustrate another exemplary embodiment of a blood-loss mitigation assembly 200 for a thrombectomy system 10. The blood-loss mitigation assembly 200 is able to remove substantially no blood from the patient during a thrombectomy and only removes clot material. The blood-loss mitigation assembly 200 includes a series of "selective" catheter check valves 210 within the lumen of the catheter 18. In a desirable configuration, at least one tube check valve 218 is disposed within the lumen of the extension line 17. Capture of the aspirated thrombus 2 (in whole or in parts) is performed by a collector 220, described in further detail below and which, in some exemplary embodiments, is fluidically downstream of the proximal end of the catheter 18 (here, the direction of the stream is from the distal end 19 of the catheter 18 towards the proximal end and, therefore, upstream is distal and downstream is proximal). Further downstream of the tube check valve 218 in the extension line 16 is an aspirator subassembly 230, which is fluidically connected to the lumen of the extension line 17 and, thereby, to the inner lumen of the catheter 18. If a distal collection/prime canister 14 is present, then the aspirator subassembly 230 is also fluidically connected to the interior 15 of the canister 14. The fluidic path including the inner lumen of the catheter 18, the inner lumen of the extension line 17, the inner volume of the collector 220, the inner volume of the aspirator subassembly 230, and, if present, the inner volume of the prime canister 14 is referred to herein as an operable lumen 202 of these exemplary embodiments.

The check valves 210 are not traditional check valves, permitting flow in one direction and prohibiting flow in the opposite direction. These novel check valves 210 perform two primary functions, first, they permit material of the thrombus 2 to pass proximally therethrough, but they prohibit the material of the thrombus 2 from passing distally back through—one-way thrombus travel. Second, the check valves 210 permit liquid (e.g., blood) to pass therethrough in both directions, proximally and distally—two-way blood travel. Stated another way, the check valves 210 are occlusive to passing thrombus 2 matter distally while simultaneously being open to pass fluid therethrough both proximally and distally. In some exemplary embodiments, the check valves 210 are uni-leaflet, duck-bill, or tri-leaflet valves, the latter being shown in FIGS. 33 to 36. The tri-leaflet form is especially advantageous because of the ease in manufacturing. A sheet of blood-porous material (e.g., Polyester, Nitinol mesh, PTFE, PVDF, Nylon, Cellulose Acetate, Cellulose Nitrate, Polypropylene) is rolled and secured into a cylinder that is sized to slide within the inner diameter of the catheter 18 (which can be from 8 French to 24 French).

Figure 35:
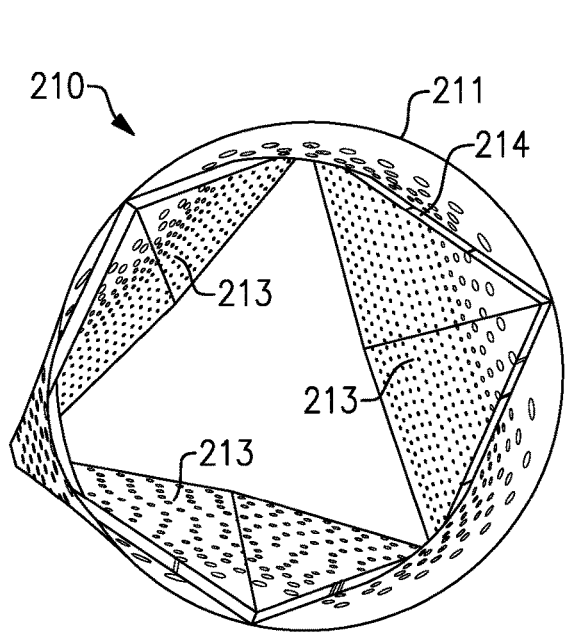
FIG. 35 is a perspective view of a downstream opening of the check valve of FIG. 33 in a partially open state.
Figure 36:
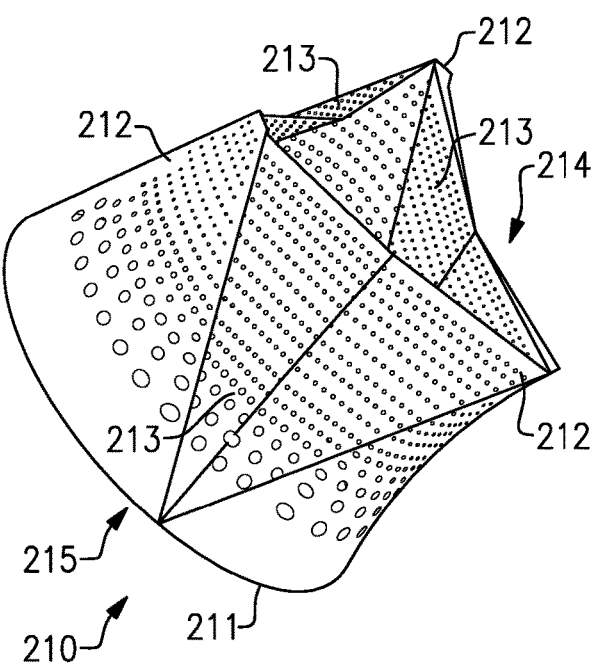
FIG. 36 is a perspective view of the downstream opening of the check valve of FIG. 33 in a substantially closed state.

When placed in the desired longitudinal position, the upstream circumference 211 is secured (e.g., heat-welded or glued) to the inner surface of the lumen and pinched in to define three leaflets, shown in FIGS. 33 to 36. Three spaced apart longitudinal outer surface lines 212 (e.g., equally spaced at 1200 between each leaflet) are also secured (e.g., heat-welded) to the inner surface of the lumen of the catheter 18. These securement lines 212 are shown on the check valves 210 of FIGS. 33 and 34. Such a check valve configuration is Y-shaped having three leaflets 213 (like an aortic valve, for example), which is shown in FIGS. 35 and 36. The check valves 210 are disposed within the lumen of the catheter 18 with the leaflet end 214 on the proximal side of each check valve 210. In this manner, downstream blood flow from the circumferential end 215 to the leaflet end 214 will be unimpeded. Upstream blood flow would be prevented if the material of the check valve 210 is non-porous, but upstream blood flow is desired in some exemplary embodiments. Accordingly, to provide two-way flow of blood and one-way flow of thrombus material, the material making up the check valve 210 is porous sufficiently to permit substantially free flow of blood in the upstream/distal direction. A fluid-flow length of the valve can be adjusted from that exemplary embodiment depicted. As the length increases, the size of the leaflet increases to form pockets in the reverse flow direction. These pockets are able to catch thrombus material that has already passed through the 210 during a previous cycle and the size of the leaflets still permit further thrombus material to pass through even when the pocket is partially filled. In some embodiments of a non-illustrated uni-leaflet configuration, the shape of the valve is similar to a duck-bill design but only half of the circular valve is free to flap; the other half is secured to the inner surface of the catheter lumen. This configuration creates a pocket for clot material to be temporarily stored. In this way, the longitudinal length of the check valve 210 can be adjusted; the longer the valve is made longitudinally, the deeper the pockets are in which ingested clot material can sit with blood still being able to pass by. If the valve 210 is made short, then clot material could block the opening of the valve 210. Therefore, the check valve 210 is configured to create a well in which clot material can stop. The tri-leaflet configuration works well because a path length of the closed position is approximately equal to one third of the circumference. Also, because a duck bill cannot be allowed to close flat by reverse moving clot material, the above-mentioned single-leaflet version allows half of the circumference to be turned inside out or folded back on itself to form a cavity or pouch, thereby giving a large pocket that does not impede reverse flow. The leaflet is configured to not be so long that it retains any thrombus material within the leaflet on the next pulse.

Some exemplary embodiments provide the blood-loss mitigation assembly 200 with an aspirator subassembly 230 replacing a vacuum pump 12 contained within standard thrombectomy systems 10. Operation of a vacuum pump 12 either applies no vacuum when switched off or applies a vacuum when switched on. In the on state, the vacuum pump 12 continually draws a non-finite amount of liquid (e.g., blood or air) through the extension line 17 and does not allow that drawn liquid to return to the extension line 17, for example, blood is removed from the patient and is stored externally in the collection canister 14 for later disposal, not for return to the patient. The aspirator subassembly 230, in contrast, does not remove blood into an external location. Instead, the aspirator subassembly 230 draws a predefined amount of fluid in and then ejects that predefined amount of fluid back into the aspiration lumen, thereby returning substantially all of the fluid that was drawn out back into the patient. The aspirator subassembly 230 is explained in further detail below. In some exemplary embodiments of the blood-loss mitigation assembly 200, a collection canister 14 is present optionally. More specifically, a collection canister 14 can be, instead, a saline reservoir that allows the interior lumen of the extension line 17, the catheter 18, the collector 220, and the aspirator subassembly 230 to be primed before a procedure for removal of air in the system 200. For example, the saline reservoir can be a saline IV bag raised above the blood-loss mitigation assembly 200.

Some exemplary embodiments of the aspirator subassembly 230 include a plenum 232 that is located at the extension line 17; the plenum 232 is proximal of the catheter 18 to enable connection of any standard catheter 18 to the distal end of the extension line 17, for example, through a Luer fitting. The plenum 232 fluidically communicates with the inner lumen of the extension line 17 and defines a plenum orifice 234. The aspirator subassembly 230 also includes a fluid volume displacer 236. The fluid volume displacer 236 has a hollow displacer body 237 and a piston 238 movably disposed and fluid-tightly sealed within the displacer body 237. Together, the displacer body 237 and the piston 238 define a fluid displacement chamber 239 that is fluidically connected to the inner lumen of the extension line 17 through the plenum orifice 234. In the exemplary embodiment of FIGS. 32A and 32B, the fluid volume displacer 236 is a syringe. The syringe is a manual device but can be replaced by any mechanical system that forces the displacement of fluid (e.g., pneumatic, hydraulic, acoustic, ultrasonic, peristaltic) with a powered plunger that moves manually or automatically or it can powered by a version of the fluid displacement shown in Deville 683.

With such exemplary configurations, with the non-degassed fluid replacement volume 30 filled with fluid (e.g., a water column of saline or blood), the blood-loss mitigation assembly 200 can be employed to remove a thrombus 2 with the catheter 18 as illustrated with FIGS. 32A and 32B and the progression of FIGS. 37 through 47. As shown in FIGS. 32A and 32B, removal of the thrombus 2 starts with the thrombus 2 located at the distal end 19 of the catheter 18. The piston 238 starts in an inserted (pushed-in) position within the displacer body 237 with the fluid displacement chamber 239 approximately at its smallest volume. The piston 238 is drawn to an extended position within the displacer body 237 (pulled back) expanding the fluid displacement chamber 239 to approximately its largest volume. This drawn back movement of the piston 238 causes a predefined amount of fluid to enter the fluid displacement chamber 239 from the plenum 232 and extension line 17 through the plenum orifice 234. Because the extension line 17, the catheter 18, the collector 220, and the prime canister 14 (if present) are filled with fluid (e.g., saline at the beginning of a procedure), the place from which fluid can translate into the operable lumen is proximally through the distal end 19 of the catheter 18. The predefined amount of fluid, as used herein, is an amount of fluid caused to be drawn into the lumen of the catheter 18 by withdrawal of the piston 238 within the displacer body 237. The predefined amount of fluid corresponds to translation of the thrombus from the distal end 19 of the catheter 18 over a distance D to a first proximal position within the lumen of the catheter 18, diagrammatically illustrated in FIGS. 32A and 32B (see also FIGS. 37 and 39). The distance D is correlated to the volume drawn into the fluid displacement chamber 239 and defines a proximal-most position in the catheter 18 at which a first of the check valves 210 should not be secured. (It is noted that this distance D changes based upon a change in the volume displaced by the particular fluid volume displacer 236 that is used.) In a thrombectomy, blood will fill a distal portion of the inner lumen of the catheter 18 up to the proximal-most position. Once this distance D is determined with a particular combination, for example, of a catheter 18, an extension line 17, and an aspirator subassembly 230, placement of the location for a first check valve 210 can be determined. With that combination, the first check valve 210 is secured in the catheter 18 at a point distal of that proximal-most position (upstream of the proximal-most position); to put another way, the first check valve 210 is placed in the inner lumen at a distance from the distal end that is less than the distance D. A series of additional check valves 210 are positioned successively in the lumen of the catheter 18 (in the proximal direction), each at a proximal distance from the previous check valve 210 that is less than the distance D, a diagrammatic example of which is shown in FIGS. 32A and 32B. If desirable, a tube valve 219 may be disposed in the extension line 17 or the plenum 232. The tube valve 219 is open to prime the operable lumen before a procedure and is closed during a procedure.

Operation of such a blood-loss mitigation assembly 200 begins with placement of the distal end 19 of the catheter at the thrombus 2 (shown in FIGS. 32A and 32B). The aspirator subassembly 230 is actuated to withdraw the piston 238 from the inserted position and to move the piston 238 to the extended position. This action moves the thrombus 2 into and through the distal end of the inner lumen of the catheter 18. Further actuation in the distal direction of the piston 238 moves it to the inserted position, thereby displacing fluid out from the fluid displacement chamber 239 and into the lumens of the extension line 17 and the catheter 18. The material of the first check valve 210 permits blood to move back in the distal direction but simultaneously prevents thrombus material from moving distally past the first check valve 210. Repetition of this piston movement causes the fluid in the lumens of the extension line 17 and the catheter 18 to shuttle back and forth, with some blood from the patient entering the catheter 18 and with any material in the blood (e.g., the thrombus) moving proximally, step-by-step through the catheter 18, into the extension line 17, and, ultimately, into the collector 220. In some exemplary embodiments, speed of the piston 238 drawing fluid in is relatively fast to create the most momentum as the clot hits the distal end 19 of the catheter 18 as well as insuring that the leaflet(s) of the check valves 238 fully open, and speed of the piston 238 pushing fluid out is relatively slower to allow the blood to move through the column of blood and the filters of the check valves 210 as the check valves have greater hydrodynamic resistance to the distal motion of fluid; in other words, there is a high velocity draw and a low velocity expulsion.

Figure 37:
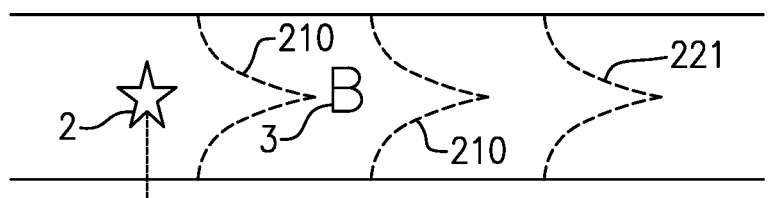
FIG. 37 is a fragmentary, enlarged, diagrammatic, longitudinally cross-sectional view of a portion of an exemplary embodiment of an aspiration catheter with blood-loss mitigation having check valves in a first step of thrombus material transfer.
Figure 38:
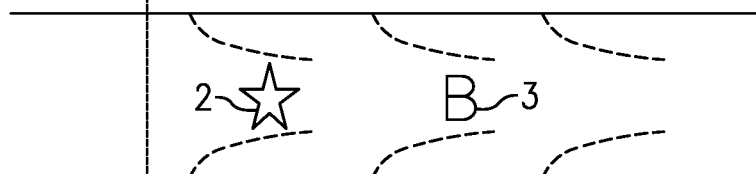
FIG. 38 is a fragmentary, enlarged, diagrammatic, longitudinally cross-sectional view of the portion of the aspiration catheter of FIG. 37 in a second step of thrombus material transfer.
Figure 39:
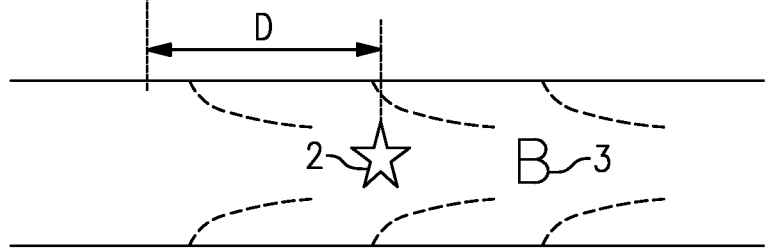
FIG. 39 is a fragmentary, enlarged, diagrammatic, longitudinally cross-sectional view of the portion of the aspiration catheter of FIG. 37 in a third step of thrombus material transfer.

FIGS. 37 to 47 illustrate an example of how such periodic movement of the aspirator subassembly 230 causes removal of the thrombus 2 from the vessel of the patient and transfer of the thrombus through the catheter 18 and into the collector 220. FIG. 37 starts the thrombus transfer process with a star shape indicating the thrombus 2 and the letter designation B indicating a volume of blood and/or priming fluid. In FIG. 37, the thrombus 2 is upstream of a first example of a catheter check valve 210 (this can be the first check valve 210 or it can be one of the check valves 210 that are proximal to the first check valve 210). The volume of blood B is illustrated as being present between the first and second check valves 210. The piston 238 is withdrawn from the inserted position to the extended position, opening the check valves 210, 221 and moving both the thrombus 2 and the blood volume B in a proximal direction over a distance D, so that thrombus material is translated from distal of the first check valve 210 to proximal of the first check valve 210. The volume of blood B moves similarly in this illustrating example because it is assumed that the fluid moves in a steady flow and the check valves 210 are porous to the blood B and permit such flow in both directions. As such, both the thrombus 2 and the blood B move as shown in the progression from FIG. 37 to FIG. 39. At this point, the piston 238 is translated distally back to the inserted position to complete an aspirator subassembly pulse. The check valves 210, 221 immediately close, thereby trapping the thrombus 2 between the first and second check valve 210 but permitting the blood B to move distally through the second check valve 210 approximately back to the position where it was in the previous aspirator subassembly pulse, these positions being illustrated in FIG. 40.

Figure 40:
FIG. 40 is a fragmentary, enlarged, diagrammatic, longitudinally cross-sectional view of the portion of the aspiration catheter of FIG. 37 in a fourth step of thrombus material transfer.
Figure 41:
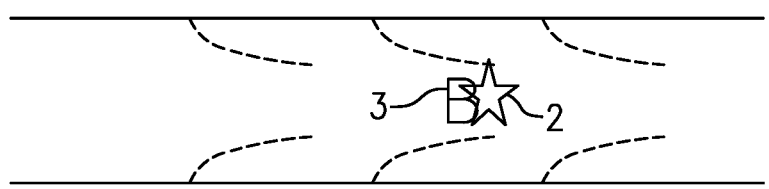
FIG. 41 is a fragmentary, enlarged, diagrammatic, longitudinally cross-sectional view of the portion of the aspiration catheter of FIG. 37 in a fifth step of thrombus material transfer.
Figure 42:
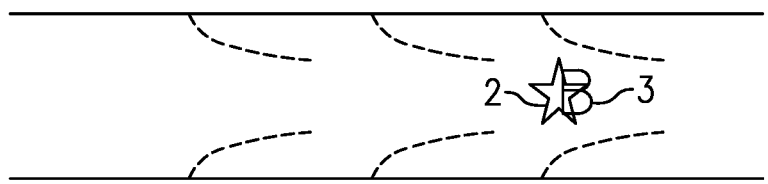
FIG. 42 is a fragmentary, enlarged, diagrammatic, longitudinally cross-sectional view of the portion of the aspiration catheter of FIG. 37 in a sixth step of thrombus material transfer.
Figure 43:
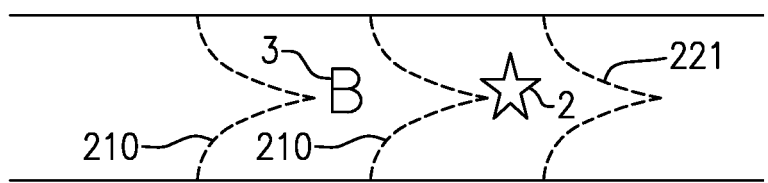
FIG. 43 is a fragmentary, enlarged, diagrammatic, longitudinally cross-sectional view of the portion of the aspiration catheter of FIG. 37 in a seventh step of thrombus material transfer.

With the thrombus 2 positioned immediately upstream of the second check valve 210, the piston 238 is withdrawn again from the inserted position and moved to the extended position, thereby opening the check valves 210, 221 and moving the thrombus 2 and the blood B proximally through the second check valve 210 together over the distance D as shown in the progression from FIG. 40 to FIG. 42. Now, the thrombus material is positioned between the second check valve 210 and the last check valve 221 as shown in FIGS. 42 and 43. The piston 238 is translated distally back to the inserted position to complete a second aspirator subassembly pulse. The check valves 210, 221 immediately close, thereby trapping the thrombus 2 between the second check valve 210 and the last check valve 221 but permitting the blood B to move distally through the second check valve 210 approximately back to the position where it was in the previous aspirator subassembly pulse, these positions being illustrated in FIG. 43.

Figure 44:
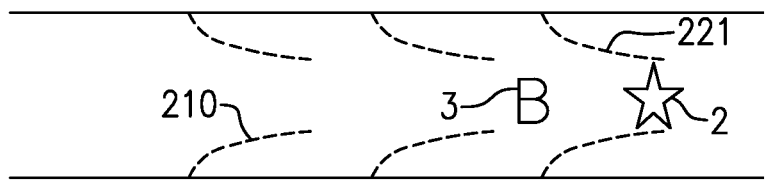
FIG. 44 is a fragmentary, enlarged, diagrammatic, longitudinally cross-sectional view of the portion of the aspiration catheter of FIG. 37 in a eighth step of thrombus material transfer.
Figure 45:
FIG. 45 is a fragmentary, enlarged, diagrammatic, longitudinally cross-sectional view of the portion of the aspiration catheter of FIG. 37 in a ninth step of thrombus material transfer.
Figure 46:
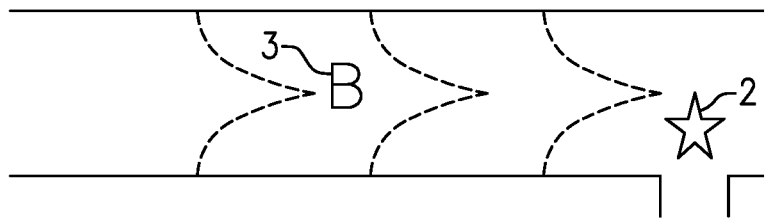
FIG. 46 is a fragmentary, enlarged, diagrammatic, longitudinally cross-sectional view of the portion of the aspiration catheter of FIG. 37 in a tenth step of thrombus material transfer.
Figure 47:
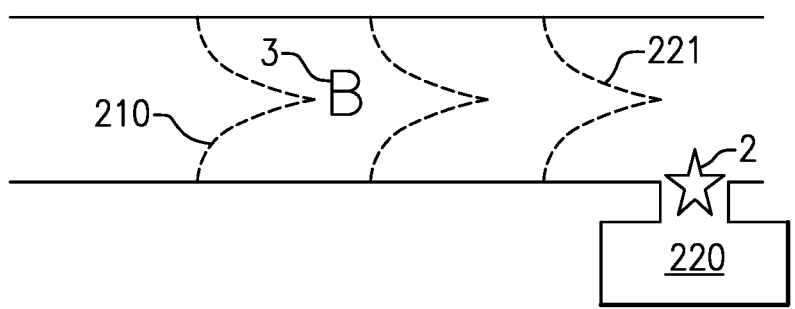
FIG. 47 is a fragmentary, enlarged, diagrammatic, longitudinally cross-sectional view of the portion of the aspiration catheter of FIG. 37 in a eleventh step of thrombus material transfer.

With the thrombus 2 positioned immediately upstream of the second check valve 210, the piston 238 is withdrawn again from the inserted position and moved to the extended position, thereby opening the check valves 210, 221 and simultaneously moving the thrombus 2 over the distance D through the last check valve 221 and the blood B over the distance D proximally through the second check valve 210, which is shown in FIGS. 44 and 45. Now, the thrombus material is positioned proximal of the last check valve 221 as shown in FIG. 45. The piston 238 is translated distally back to the inserted position to complete a third aspirator subassembly pulse. The check valves 210, 221 immediately close, thereby trapping the thrombus 2 proximal of the last check valve 221 but permitting the blood B to move distally again through the second check valve 210, approximately back to the position where it was in the previous aspirator subassembly pulse, these positions being illustrated in FIGS. 46 and 47. The last check valve 221, like the other check valves 210, is porous to blood. Accordingly, the thrombus 2 is trapped proximal of the last check valve 221. With gravity and further aspirator subassembly pulses, the thrombus 2 enters the collector 220. If desired, a feedback fluid flow can be provided between the collector 220 and the space between any two check valves 210 and/or between the check valve 210 and the last check valve 221. This proximal most check valve 221 can be a single, flat, body flap valve to help direct the material of the thrombus 2 downward into the collector 220.

Figure 48:
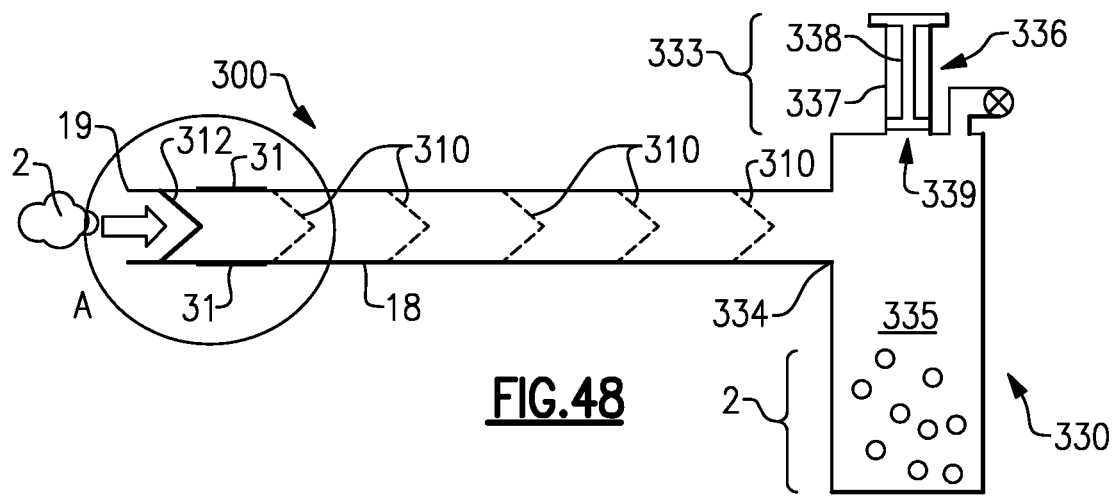
FIG. 48 is a fragmentary, enlarged, longitudinally cross-sectional view of a further exemplary embodiment of an aspiration thrombectomy system having an aspiration control blood-loss mitigation assembly with a manual vacuum and gravity-assisted thrombus collection.
Figure 49:
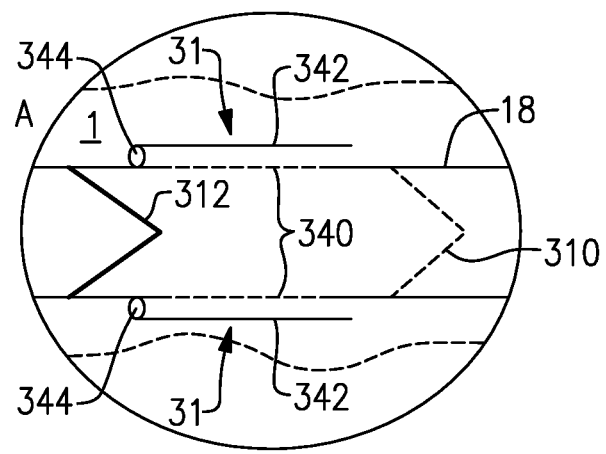
FIG. 49 is a fragmentary, enlarged cross-sectional view of a distal portion A of the system of FIG. 48 with perforations and side vents.

Some exemplary embodiments of a blood-loss mitigation assembly 300 are shown in FIG. 48. Here, the extension tube is eliminated and the aspirator subassembly is integral with the collector. More particularly, the aspirator subassembly 330 has a displacement portion 333 and a collection portion 335, in which material of a thrombus 2 is collected. An intermediate catheter orifice 334 is disposed between the displacement portion 333 and the collection portion 335 and fluidically connects the lumen at the proximal end of the catheter 18 to the interior of the collection portion 335. As in other exemplary embodiments, an extension line 17 can be connected between the catheter 18 and the catheter orifice 334 of the fluid volume displacer 336. The displacement portion 333 comprises a fluid volume displacer 336 comprising a hollow displacer and collection body 337 in which a piston 338 is fluid-tightly and movably disposed. As the collection portion 335 is much larger in diameter in this exemplary embodiment, a velocity of fluid motion is slower for the same overall flow rate. Accordingly, motion of the clot 2 is slowed after entering the collection portion 335, thereby allowing the clot 2 to be gravity separated. The changing of velocity of the fluid can also cause a separation of what is rising out. In an exemplary non-illustrated embodiment having conical fluid dynamic shapes utilized in the DYSON® series of household vacuums but with the cones reversed, the fluid velocity changes by slowing down (not speeding up) and, therefore, a separation of particles will rise out. In some exemplary embodiments for slowing down the movement of liquid to separate clot particles, the size of the piston (e.g., the inner diameter of the body 337) can be greater than the inner diameter of the catheter 18. Having a larger diameter of the piston 338 in the body 337 gives the particles of the clot 2 time to settle out so that they are not pushed back into the catheter 18. Alternatively, the diameter of the piston 338 can be much smaller than a diameter of the collection portion 335 (as shown in FIG. 48), allowing the fluid in the collection portion 335 to slow sufficiently to permit particle separation. The catheter orifice 334 is proximal of the catheter 18 and is configured to enable connection of any standard catheter 18 to the distal end of the extension line 17, for example, through a Luer fitting adapter. The features of the blood-loss mitigation assembly 200 are applicable to the blood-loss mitigation assembly 300 and are incorporated herein by reference and vice versa. Some alternative exemplary features are included. For example, the lumen of the catheter 18 includes a number of check valves 310 made of the same material and configured as the check valves 210. A first check valve 312, however, is non-porous to the liquid (e.g., blood B). The catheter 18 is provided with one or more side vents 31 downstream of the first check valve 312 and is/are open to the blood vessel 1 to create a circulation or re-circulation zone within the blood vessel 1 in which the catheter 18 is inserted. In some exemplary embodiments, the side vents 31 can be simple, traditional check valves that allow fluid to exit but are fully occlusive to flow entering into the catheter 18. In some exemplary embodiments, the side vents 31 can be formed from an elastomeric rubber-like sheet that is allowed to stretch and expand, thereby creating open channels for fluid exit. It is understood that any thrombus 2 (also referred to herein as a clot 2) that is brought up to or into the distal end of the catheter 18 should not be dislodged and inclusion of the side vents 31 substantially prevents dislodgement. In some exemplary embodiments, therefore, the first check valve 312 is a standard one-way check valve but the side vents 31 are "selective" valves, meaning that they are porous to the liquid (e.g., blood B). One exemplary embodiment of the side vents 31 is shown in the enlarged cut-away view A of FIG. 49 and includes one or more perforation(s) 340 in the side(s) of the catheter 18 surrounded by an elastomeric tube 342 (e.g., stretchable polyurethane) that is secured 344 around the catheter 18 at one of the end circumferences thereof. In some exemplary embodiments, e.g., FIG. 49, the distal circumference of the tube 342 is secured to the catheter 18 (the one closer to the distal tip 19 of the catheter 18) so the blood B that is ejected proximally and still does not disturb the clot 2. Increased pressure between the first check valve 312 and second check valve 310 causes the material of the side vents 31 to stretch and direct the blood B in a U-turn with the side vents 31 facing proximally. Thus, the material of the clot 2 between the first check valve 312 and the second check valve 310 is pressed against the back side of the first check valve 312 away from the vents 31. The perforation(s) 340 of the side vents 312 are small holes that are sized to allow only the exit of blood B. This configuration creates a very low profile check valve between these two distal-most check valves 312, 310. As above, the filling and emptying of the fluid displacement chamber 339 with repeated movement of the piston 338 causes the thrombus 2 to exit the patient and be transported into the collection portion 335 with minimal to no blood loss. Operation of the blood-loss mitigation assembly 300 is conducted similarly to the blood-loss mitigation assembly 200.

Figure 50:
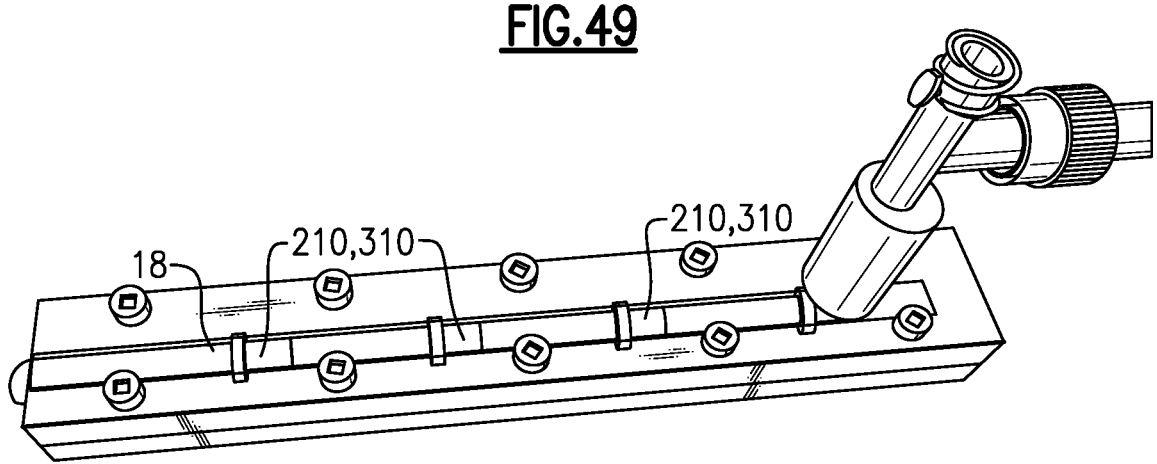
FIG. 50 is a photograph of a further exemplary embodiment of a check valve assembly for an aspiration thrombectomy system having an aspiration control blood-loss mitigation.

FIG. 50 is an exemplary embodiment of a block representing a portion of a catheter 18 having a set of check valves 210, 310 shown and described in the various exemplary embodiments of FIGS. 32A through 49.

As set forth above, the volume of the fluid displacement chamber 239, 339 and the diameter of the operable lumen upstream of the orifice 234, 334 will determine the distance D. If, for example, the distance to shift the fluid column 1.5" in the catheter 18 is needed to move material from distal of a given check valve to proximal of that check valve, then, e.g., the check valves can be spaced apart at 1" intervals. Each successive aspirator subassembly pulse, therefore, will shift thrombus material proximally past the next proximal valve. This movement is analogous to a pawl in a mechanical system that allows progress in one direction and progress is limited to the length of one tooth (e.g., a clock pawl/gear) and, based on this, the aspirator subassembly 230, 330, the collector 220, and the extension line 17 can be referred to as a thrombus ratchet.

Mitigation of blood loss occurs because the fluid column is not moved continuously as in prior art aspiration systems. Instead, the blood-loss mitigation assembly 200 shakes the fluid column back and forth to ratchet the thrombus 2 proximally without doing the same to the blood in which the thrombus 2 floats. Control of the aspirator subassembly pulses can be simply periodic or, for example, the control can be carried out using the ROAR system described in patent family including Deville '683. A significant benefit to some exemplary embodiments described herein is that the simple modification of adding check valves to the catheter not only can be added to small-sized catheters (e.g., 8 to 10 French) but, because blood is no longer removed in any substantial way, the design can also be used in larger catheters (e.g., 16 to 24 French) that are, for example, used in peripheral procedures.

The inner catheter surface can be a forest of bristles that create much the same effect. The bristles can be angled proximally so that it is easier for large clot material to move proximally. A length of the bristles determines the stiffness: shorter is stiffer and longer is flexible. With such bristles, the displacement distance for each pulse is significantly shorter.

It is noted that various individual features of the inventive processes and systems may be described only in one exemplary embodiment herein. The particular choice for description herein with regard to a single exemplary embodiment is not to be taken as a limitation that the particular feature is only applicable to the embodiment in which it is described. All features described herein are equally applicable to, additive, or interchangeable with any or all of the other exemplary embodiments described herein and in any combination or grouping or arrangement. In particular, use of a single reference numeral herein to illustrate, define, or describe a particular feature does not mean that the feature cannot be associated or equated to another feature in another drawing figure or description. Further, where two or more reference numerals are used in the figures or in the drawings, this should not be construed as being limited to only those embodiments or features, they are equally applicable to similar features or not a reference numeral is used or another reference numeral is omitted.

The foregoing description and accompanying drawings illustrate the principles, exemplary embodiments, and modes of operation of the systems, apparatuses, and methods. However, the systems, apparatuses, and methods should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the systems, apparatuses, and methods as defined by the following claims.

The invention claimed is:

1. An aspiration thrombectomy system, comprising:
   a vacuum source;
   a catheter including a catheter lumen having a proximal end and a distal end;
   a manifold having a manifold input fluidically connected to the proximal end of the catheter lumen and a manifold output;
   a sensor to detect flow through the manifold and produce a signal indicative of the detected flow;
   a vacuum valve having a vacuum valve input fluidically connected to the manifold output and a vacuum valve output fluidically connected to the vacuum source; and
   a controller to receive the signal indicative of the detected flow and modulate the vacuum valve based on the signal, the controller having a plurality of states including an idle state in which the vacuum valve is held only partially open for a period of time and at least one aspiration state in which the vacuum valve is fully open;
   wherein the controller is in the idle state in response to the signal indicating the detected flow is open flow, and wherein the controller transitions from the idle state to an aspiration state of the at least one aspiration state in response to the signal indicating a clot or thrombus is detected.

2. The aspiration thrombectomy system of claim 1, wherein the period of time in which the vacuum valve is held only partially open comprises a duration of the idle state.

3. The aspiration thrombectomy system of claim 2, wherein a first of the at least one aspiration state includes a pulsed aspiration state in which the vacuum valve is pulsed fully open and closed.

4. The aspiration thrombectomy system of claim 3, wherein the controller transitions from the idle state to the first aspiration state in response to the signal indicating that a hard clot or thrombus is detected.

5. The aspiration thrombectomy system of claim 2, wherein a first of the at least one aspiration state includes a standard aspiration state in which the vacuum valve is held fully open.

6. The aspiration thrombectomy system of claim 5, wherein the controller transitions from the idle state to the first aspiration state in response to the signal indicating that a soft clot or thrombus is detected.

7. The aspiration thrombectomy system of claim 6, wherein a second of the at least one aspiration state includes a pulsed aspiration state in which the vacuum valve is pulsed fully open and closed, and wherein the controller transitions from the idle state to the second aspiration state in response to the signal indicating that a hard clot or thrombus is detected.

8. The aspiration thrombectomy system of claim 7 further comprising:
   a vent source; and
   a vent valve having a vent valve input fluidically coupled to the vent source and a vent valve output fluidically coupled to the catheter at a position distal of the manifold.

9. The aspiration thrombectomy system of claim 8, wherein during the pulsed aspiration state, the vent valve is at least partially open to prolong an energy of pulsed aspiration and the energy of pulsed aspiration is maintained for greater than 30 seconds.

10. The aspiration thrombectomy system of claim 5, wherein a second of the at least one aspiration state includes a pulsed aspiration state in which the vacuum valve is pulsed fully open and closed.

11. The aspiration thrombectomy system of claim 10, wherein the plurality of states further includes a clogged state in which the controller initiates an unclogging routine, wherein the controller transitions from the pulsed aspiration state to the clogged state in response to the signal indicating the clot or thrombus has not been cleared.

12. The aspiration thrombectomy system of claim 11, wherein during the unclogging routine, between 100 microliters and 200 microliters of fluid in the catheter is displaced distally.

13. The aspiration thrombectomy system of claim 10, wherein responsive to the signal indicating the detected clot or thrombus is cleared, the controller transitions from the one of the first or second aspiration states back to the idle state.

14. The aspiration thrombectomy system of claim 2, wherein during the idle state, the vacuum valve is at least 5% open.

15. The aspiration thrombectomy system of claim 2, wherein during the idle state, the vacuum valve is between at least 5% open and 20% open.

16. The aspiration thrombectomy system of claim 2, wherein during the idle state, a flow of fluid through the manifold is less than 10 cc/min.

17. The aspiration thrombectomy system of claim 2, wherein the sensor is a single pressure sensor disposed in the manifold distal of the vacuum valve.

18. The aspiration thrombectomy system of claim 17, wherein the signal indicating the detected flow is open flow is a pressure greater than approximately 11 PSI absolute and wherein the signal indicating the clot or thrombus is detected is a pressure less than approximately 11 PSI absolute.

19. The aspiration thrombectomy system of claim 2, further comprising:
   a vent source; and
   a vent valve having a vent valve input fluidically coupled to the vent source and a vent valve output fluidically coupled to the catheter at a position distal of the manifold.

20. The aspiration thrombectomy system of claim 19, wherein the plurality of states includes a clogged state in which the controller initiates an unclogging routine wherein between 100 microliters and 200 microliters of fluid in the catheter is displaced distally.

21. The aspiration thrombectomy system of claim 20, wherein during the idle state, a flow of fluid through the manifold is less than 10 cc/min.

22. The aspiration thrombectomy system of claim 21, wherein during the idle state, a majority of the flow of fluid through the manifold is from the vent source.

23. The aspiration thrombectomy system of claim 19, further comprising an extension line having a proximal end fluidly coupled to the manifold inlet and a distal end fluidly coupled to the proximal end of the catheter, wherein the vent valve output is disposed at a coupling between the proximal end of the catheter and the distal end of the extension line.

24. The aspiration thrombectomy system of claim 19, wherein during the idle state, the vent valve is at least partially open.

25. The aspiration thrombectomy system of claim 24, wherein during the idle state, the vent valve is at least partially open for the duration of the idle state.

* * * * *

UNITED STATES PATENT AND TRADEMARK OFFICE
CERTIFICATE OF CORRECTION

| | | |
|---|---|---|
| PATENT NO. | : 12,471,937 B2 | Page 1 of 1 |
| APPLICATION NO. | : 18/420094 | |
| DATED | : November 18, 2025 | |
| INVENTOR(S) | : Alejandro N. Calderon et al. | |

It is certified that error appears in the above-identified patent and that said Letters Patent is hereby corrected as shown below:

In the Specification

Column 44, Line 63, delete "1200" and insert -- 120° --

Signed and Sealed this
Twenty-third Day of December, 2025

John A. Squires
*Director of the United States Patent and Trademark Office*